United States Patent
Nguyen et al.

(10) Patent No.: US 11,587,051 B2
(45) Date of Patent: *Feb. 21, 2023

(54) SUBSCRIPTION AGGREGATION SYSTEM

(71) Applicant: Hint, Inc., Pleasanton, CA (US)

(72) Inventors: Frank Thanh Nguyen, Pleasanton, CA (US); Abraham Benjamin de Waal, Pleasanton, CA (US); Aubrey Eric Rankin, Pleasanton, CA (US)

(73) Assignee: Hint, Inc., Pleasanton, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/434,674

(22) Filed: Jun. 7, 2019

(65) Prior Publication Data
US 2019/0362326 A1    Nov. 28, 2019

Related U.S. Application Data

(63) Continuation of application No. 16/147,236, filed on Sep. 28, 2018, now Pat. No. 10,354,239.

(60) Provisional application No. 62/650,571, filed on Mar. 30, 2018.

(51) Int. Cl.
| | |
|---|---|
| *G06Q 40/00* | (2012.01) |
| *G06Q 20/10* | (2012.01) |
| *G06Q 40/02* | (2023.01) |
| *G06Q 20/08* | (2012.01) |

(52) U.S. Cl.
CPC ...... *G06Q 20/102* (2013.01); *G06Q 20/0855* (2013.01); *G06Q 40/025* (2013.01)

(58) Field of Classification Search
CPC ...... G06Q 20/12; G06Q 20/102; G06Q 30/06; G06Q 20/0855; G06Q 40/025; G06Q 30/0641

USPC .................................................. 705/35–45
See application file for complete search history.

(56) References Cited

U.S. PATENT DOCUMENTS

| | | | |
|---|---|---|---|
| 7,418,426 B1 | 8/2008 | Reunert et al. | |
| 7,467,183 B2 | 12/2008 | Arcuri et al. | |
| 7,596,797 B1 * | 9/2009 | Kapner, III | ........ H04N 21/2221 |
| | | | 725/46 |

(Continued)

OTHER PUBLICATIONS

U.S. Appl. No. 16/147,236, filed Sep. 28, 2018, Data Aggregation and Presentation System.

(Continued)

*Primary Examiner* — Hai Tran
(74) *Attorney, Agent, or Firm* — Schwegman Lundberg & Woessner, P.A.

(57) ABSTRACT

In some embodiments, a method to generate a user interface for a subscription management system may include receiving first order data relating to a first subscription offering, receiving second order data related to a second subscription offering, combining the first and second order data into a subscription data structure that, calculating a combined one-time payment amount for both the first and second subscription offerings based on the quantity data, calculating a combined periodic monthly subscription payment amount for both the first and the second subscription offerings based on the quantity and period data, and/or causing presentation of both the combined one-time payment amount and the combined monthly subscription payment amount in the user interface for the subscription management system.

14 Claims, 43 Drawing Sheets

(56) References Cited

U.S. PATENT DOCUMENTS

| | | | |
|---|---|---|---|
| 7,765,164 B1 | 7/2010 | Robinson et al. | |
| 7,949,558 B2 | 5/2011 | Walker et al. | |
| 8,161,532 B2 | 4/2012 | Sebesta et al. | |
| 8,214,445 B2 | 7/2012 | Bardsley | |
| 8,705,718 B2 | 4/2014 | Baniak et al. | |
| 9,536,207 B2 | 1/2017 | Traupman et al. | |
| 10,354,239 B1 | 7/2019 | Nguyen et al. | |
| 2003/0222892 A1* | 12/2003 | Diamond | H04N 9/31 345/647 |
| 2007/0271114 A1 | 11/2007 | Walker et al. | |
| 2009/0024522 A1 | 1/2009 | Reunert et al. | |
| 2012/0005289 A1 | 1/2012 | Bardsley | |
| 2015/0356533 A1* | 12/2015 | Hazlehurst | G06Q 20/00 705/40 |

OTHER PUBLICATIONS

"U.S. Appl. No. 16/147,236, Examiner Interview Summary dated Mar. 8, 2019", 3 pgs.

"U.S. Appl. No. 16/147,236, Non Final Office Action dated Dec. 20, 2018", 19 pgs.

"U.S. Appl. No. 16/147,236, Notice of Allowance dated May 23, 2019", 10 pgs.

"U.S. Appl. No. 16/147,236, Response filed Mar. 20, 2019 to Non Final Office Action dated Dec. 20, 2018", 17 pgs.

\* cited by examiner

FIG. 22

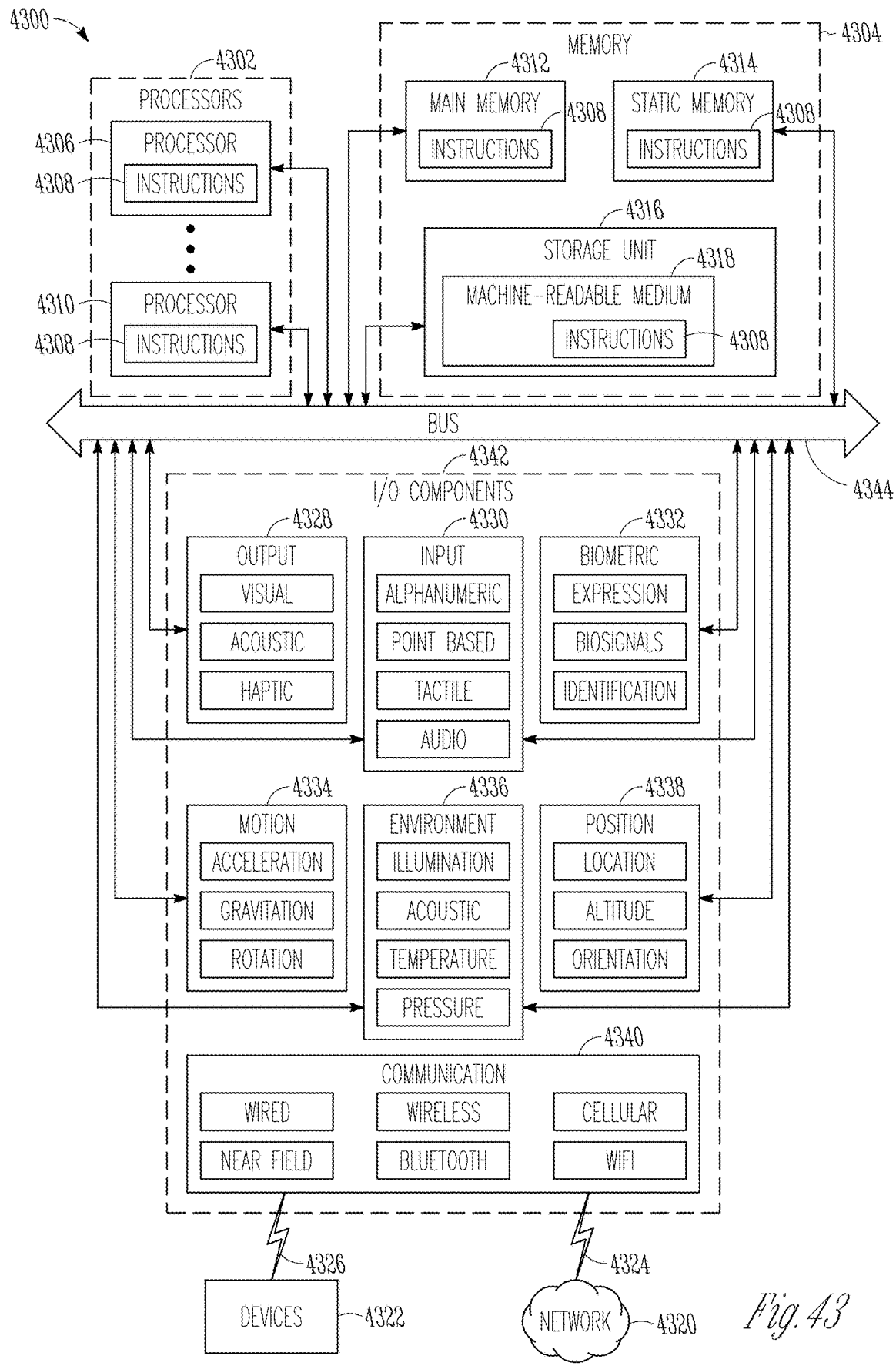

SUBSCRIPTION AGGREGATION SYSTEM

CLAIM OF PRIORITY

This Application is a continuation of U.S. patent application Ser. No. 16/147,236, filed on Sep. 28, 2018, which application claims the benefit of priority to U.S. Provisional Application No. 62/650,571, filed on Mar. 30, 2018, which are hereby incorporated by reference in their entireties.

BACKGROUND

User interfaces and data structures pertaining to the management of subscriptions (e.g., for goods or services), while having advanced in recent years, have not been optimized for use in a cross number of verticals and also for the management of more complicated subscription arrangements between providers and customers.

One prior art system for providing subscriptions to a bundle of services, and more specifically channels from a program guide, is described in U.S. Pat. No. 7,596,797 (the '797 patent). Here, a terminal controller is used to select a bundle of channels based on a subscription matrix of a user. However, the technology described in the '797 patent is inflexible, lacks configurability by a service provider and also provides a limited set of options for an end-user or consumer.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 22:
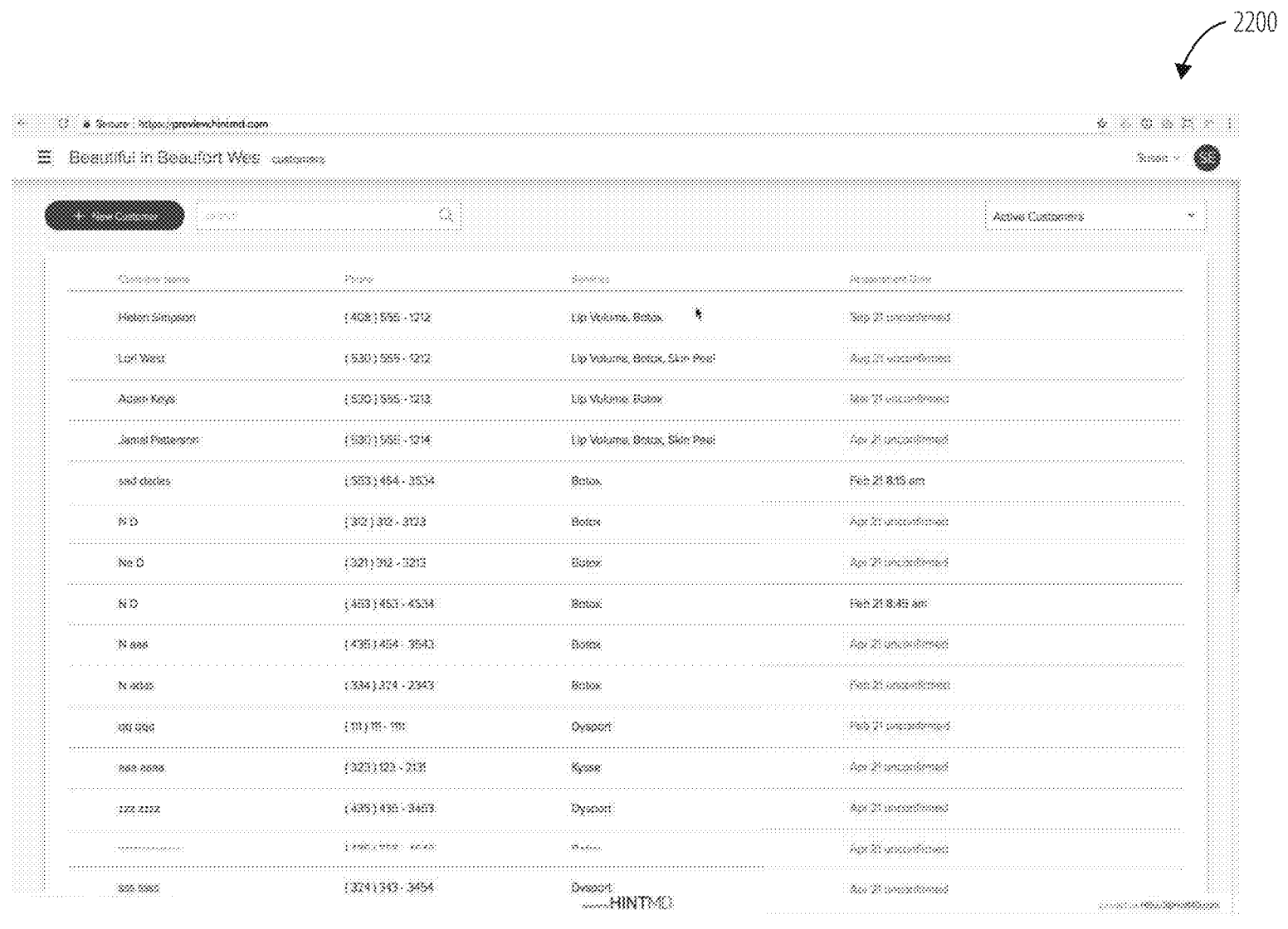

FIG. 22 illustrates a user interface in accordance with one embodiment.

FIG. 43 illustrates a diagrammatic representation of a machine 4300 in the form of a computer system within which a set of instructions may be executed for causing the machine to perform any one or more of the methodologies discussed herein, according to an example embodiment.

DETAILED DESCRIPTION

Introduction

Figure 1:
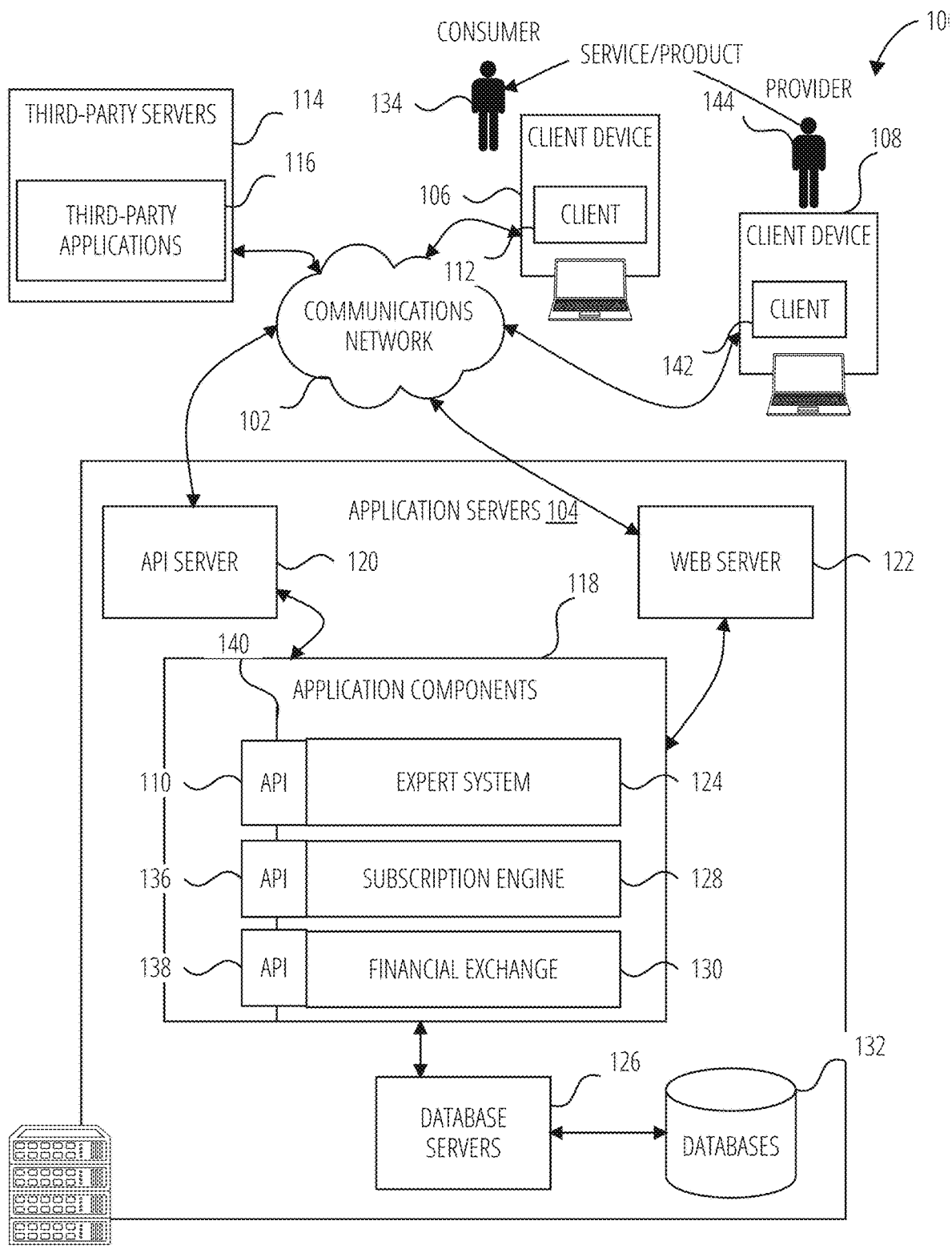
FIG. 1 Illustrates a networked environment in which the described technology, according to some example embodiments, may be deployed

According to some example embodiments, there is provided a subscription management system that generates and uses data structures and interfaces that allow for configurability and flexibility in the creation of a bundle of subscriptions, for a specific consumer, to one or more products or services, which may be delivered in terms of one or more plans.

Each subscription within a bundle of subscriptions can be for a product or service and has a fulfillment price. Further, each subscription has a period in which it may reoccur (e.g., one month, six months, one year, etc.). These recurrence periods may perpetuate indefinitely or may terminate after a set number of occurrences (or cycles).

Each subscription can furthermore be financed by a loan from a third party, or by a service provider. Alternatively, a consumer can pay the full amount for a subscription at one time (e.g., upon initiation of the subscription). The terms of the subscription (both delivery and financial) can be dynamically managed by consumers in some cases (e.g., a consumer may be able to change the. It over which the subscription may reoccur).

Even further, each subscription may be executed independently of other subscriptions in a bundle, while billing for one or more subscriptions within the bundle may be aggregated into a single payment once a month (or on some other periodic basis).

Service plans may, in some embodiments, be made with the assistance of a service delivery expert (e.g., a physician), and may be fulfilled at a place of business of the expert (e.g., a medical practice office of the physician). Product fulfillment, on the other hand, may be performed by shipment.

As noted above, each subscription in a bundle may be financed by a loan from a third party or service provider. In one embodiment, loans may be facilitated in real time. To this end, a subscription engine communicates details of a particular subscription to a financial exchange in near real-time. The details of a particular description include, for example, identification of the products or services being offered, details of the provider, and details of the consumer. Third-party financiers may access the financial exchange, again in near real-time, to accept any number (or none) of the subscriptions being offered via the financial exchange.

In one embodiment, the receipt of subscription details, the offering of subscription financing opportunities to third-party financiers, and the receipt of acceptance/decline of a financing opportunity may occur in near real-time, and while a customer is standing at the checkout counter of a service consumer.

Description

Defining the quantity and frequency of delivery of a product or service offering under subscription plan is tricky and presents technical challenges to a user. This is particularly so where the product or service offering is being subscribed to is part of a bundle of offerings or services included within a single subscription plan. For example, defining the quantity and frequency of delivery requires typing numerical data into appropriate fields and then calculating variables to display a monthly cost (or payment total) of the subscription plan. Because this area of the software is frequently used on a touchscreen tablet device while the customer is watching, now there is a need to have a fast friction free device to enter the data.

In some embodiments, a method to generate a user interface for a subscription management system may include receiving first order data relating to a first subscription offering, receiving second order data related to a second subscription offering, combining the first and second order data into a subscription data structure that, calculating a combined one-time payment amount for both the first and second subscription offerings based on the quantity data, calculating a combined periodic monthly subscription payment amount for both the first and the second subscription offerings based on the quantity and period data, and/or causing presentation of both the combined one-time payment amount and the combined monthly subscription payment amount in the user interface for the subscription management system.

In some embodiments, the first order data may include a first set of attributes relating to the first subscription offering.

In some embodiments, the second order data may include a second set of attributes related to the second subscription offering.

In some embodiments, the combining the first and second order data into a subscription data structure that may include quantity data and period data for each of the first and second subscription offerings.

In some embodiments, the presentation may include the presentation of a first user interface element to present the combined one-time payment amount and a second user element to present the combined monthly subscription payment amount, and presentation of a toggle feature to toggle between the presentations of the first and second user interface elements.

In some embodiments, the method may include receiving third order data relating to a third offering.

In some embodiments, the third offering may include a one-time payment option only.

In some embodiments, the presentation may include a presentation of a one-time payment amount related to the third offering in conjunction with each of the combined one-time payment amount and the combined monthly subscription payment amount.

In some embodiments, each of the first and second set of attributes may include an item identifier associated with at least one of an item or a service included in the offering.

In some embodiments, each of the first and second set of attributes may include a recurring attribute identifying the respective offering as.

In some embodiments, each of the first and second set of attributes may be recurring offering.

In some embodiments, the combining of the first and second order data is performed based on each of the first and second subscription offerings may be identified as recurring offerings.

In some embodiments, the method may include communicating the combined monthly subscription payment amount from subscription management system to a financial exchange system, the financial exchange system operation into present financing options relating to the combined monthly subscription payment amount to financiers.

In some embodiments, the communication of the combined monthly subscription payment amount may include communicating further information pertaining to each of the first and second subscription offerings.

In some embodiments, the further information may include identification information for a provider of the relevant subscription offering, and identification information for a consumer of the relevant subscription offering.

In some embodiments, the method may include receiving, at the financial exchange system, a financing offer related to at least one of the first or the second subscription offerings.

In some embodiments, the financing offer may include financing terms.

In some embodiments, the financing offer may further include communicating the financing offer from the financial exchange system to the subscription management system for presentation to a consumer.

In some embodiments, the financing offer may include both a first financing offer pertaining to the first subscription offering and a second financing offer pertaining to the second subscription offering.

In some embodiments, the subscription management system automatically applies predefined business rules to the first and second financing offers in order to selectively present at least one of the first or second financing offers to the consumer.

DRAWINGS

FIG. 1 illustrates a networked environment 100 in which a communications network 102 communicatively couples application servers 104, a client device 106, a client device 108, and third-party servers 114. The client device 106 is accessed by a consumer 134 and hosts a client 112 (e.g., a browser application). Similarly, the client device 108 is accessed and operated by a provider 144 and hosts a client 142. The third-party servers 114 host third-party applications 116.

The application servers 104 include an API server 120 and a web server 122 which, in turn, facilitate access to several application components 118 that include an expert system 124, a subscription engine 128 and a financial exchange 130. Each of these components is provided with a respective API, namely an API 110, an API 136 and an API 138.

The application components 118 are communicatively coupled to database servers 126 which in turn facilitate access to databases 132.

Further details regarding the operation of the infrastructure are provided with reference subsequent figures.

As will be further described herein, a provider 144 may wish to provide offerings (e.g., products or services) to a consumer 134, either as a once-off/one-time delivery or as part of a plan which has a recurrence. For example, the provider 144 may wish to deliver a product (e.g., pet food) to the consumer 134 on a monthly basis, or may wish to provide cosmetic services to the consumer 134 on a weekly, monthly, quarterly or annual basis. Regardless of whether the delivery of the product or service is a one-time delivery or a recurring delivery, the provider 144 may also wish to provide the consumer 134 with the option of paying for the delivery or provision as a once-off payment, as a subscription payment or as a combination of a once off payment and a subscription payment.

At a high level, the expert system 124 operates to enable an expert in a particular vertical (e.g., the provider 144) to define and manage a plan for the delivery of various products and services to the consumer 134. An expert system 124 is accordingly specifically constructed and programmed for the creation of a plan for the delivery of a specific product or service in a particular product or service vertical.

The subscription engine 128 is responsible for the automated management of a plan (which may or may not include any number of subscriptions to products or services).

The financial exchange 130 is responsible for communicating financing opportunities related to a plan to one or more financiers (e.g., who may operate as a provider 144, or who may be a third party accessing the financial exchange 130 via the third-party applications 116).

Figure 2:
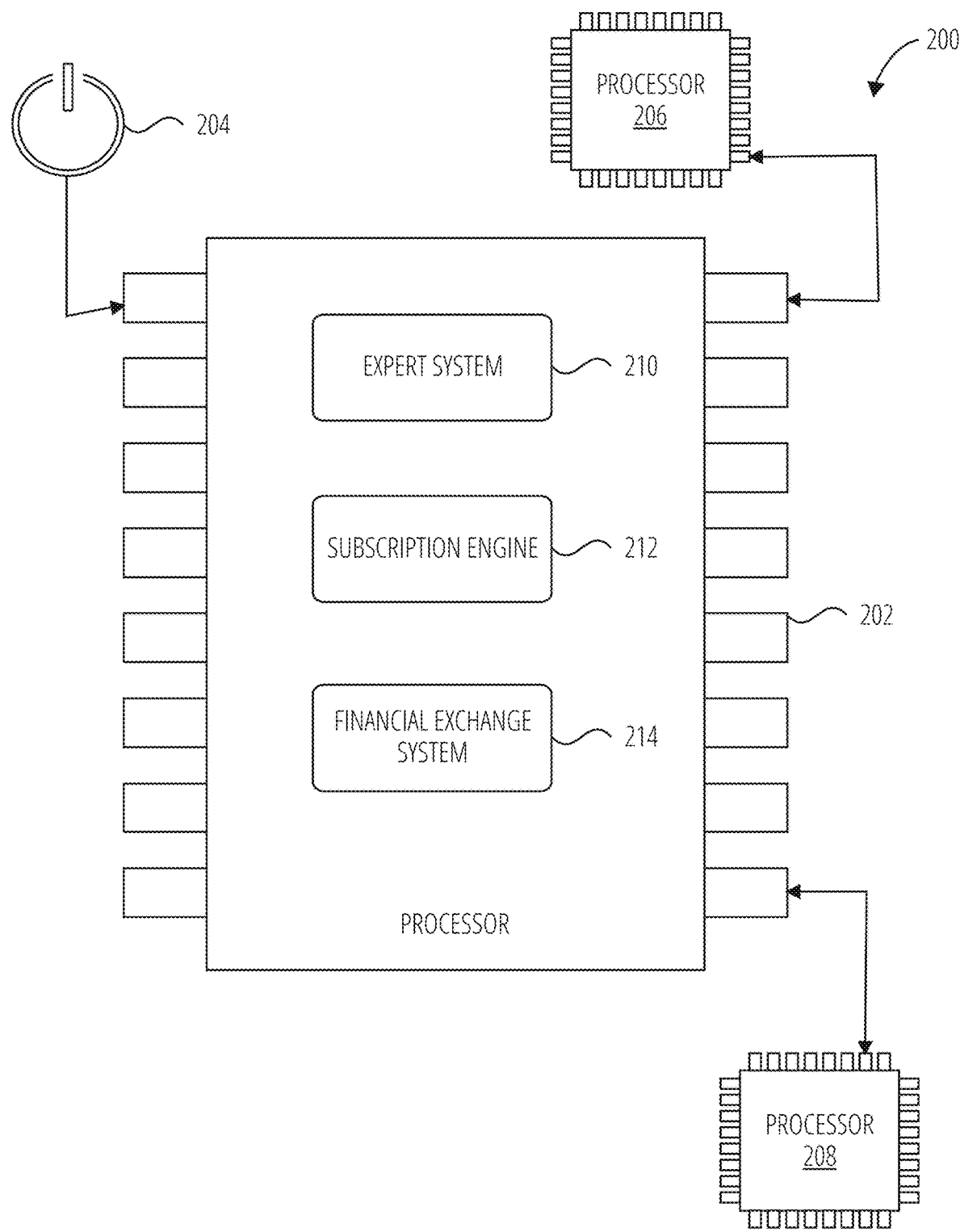
FIG. 2 is a diagrammatic representation of a processing environment, in accordance with one embodiment.

Turning now to FIG. 2, there is shown a diagrammatic representation of a processing environment 200, which includes the processor 206, the processor 208, and a processor 202 (e.g., a GPU, CPU or combination thereof).

The processor 202 is shown to be coupled to a power source 204, and to include (either permanently configured or temporarily instantiated) modules, namely an expert system 210, a subscription engine 212, and a financial exchange system 214. The expert system 210 operationally supports a guided process for the selection of products or services, as well as the attributes of such products and services (e.g., quantity (units), a frequency of delivery and number of deliveries) to include in a subscription.

The subscription engine 212 operationally calculates and presents information relating overall options related to a subscription for bundled purchase, and the financial exchange system 214 operationally allows third parties (e.g., lenders) to view financing opportunities and accept or reject such financing opportunities for subscriptions (or bundles of subscriptions) generated by the subscription engine 112.

As illustrated, the processor 202 is communicatively coupled to both the processor 206 and processor 208 and receives data from the processor 206, as well as data from the processor 208. Each of the processor 202, processor 206 and processor 208 may host one or more of an expert system 210, a subscription engine 212 and a financial exchange system 214.

Figure 3:
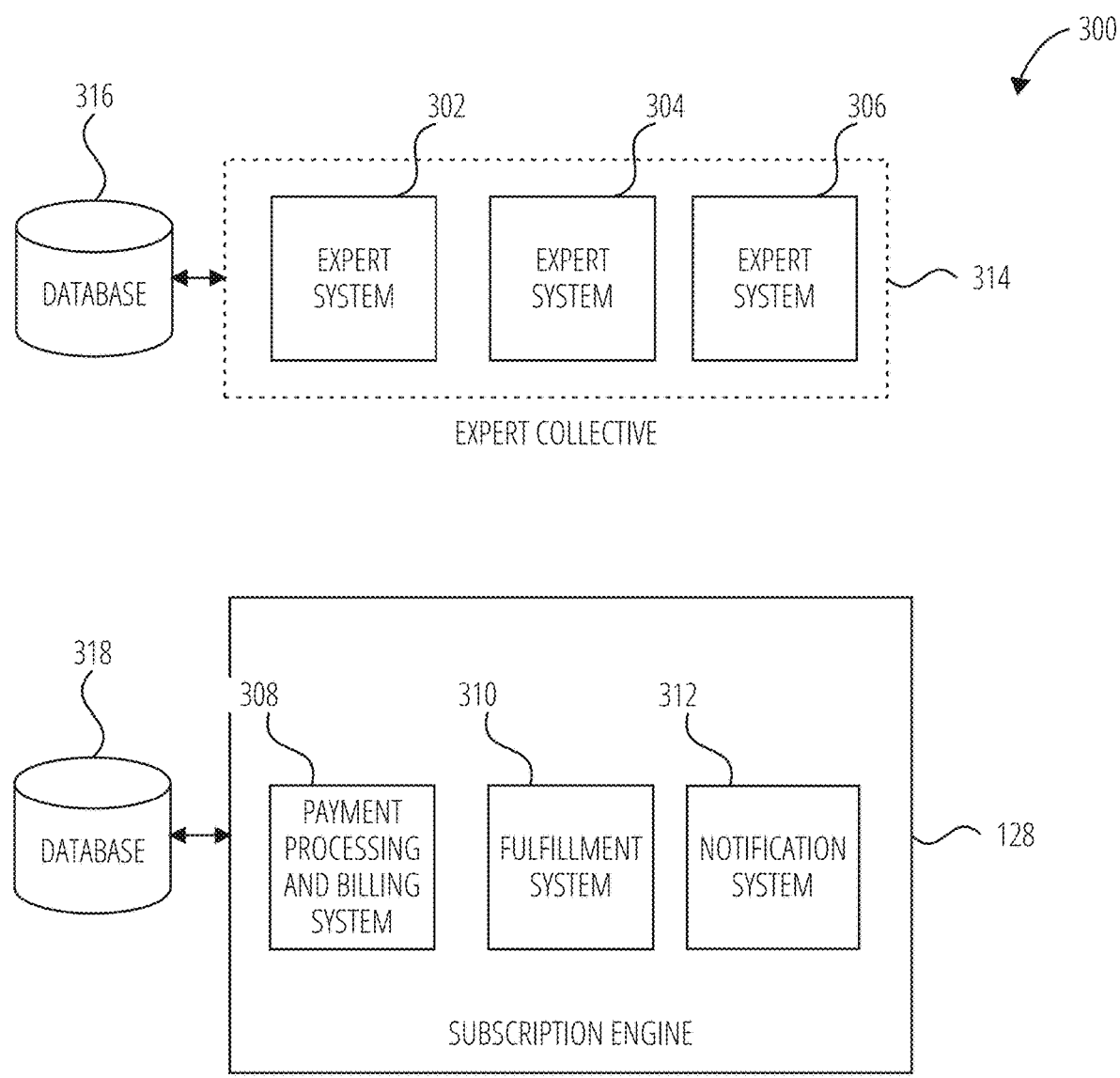
FIG. 3 illustrates further details regarding the subcomponents of a subscription engine, according to some example embodiments.

FIG. 3 illustrates the various sub-components of a subscription engine 128, namely a payment processing and billing system 308, a fulfillment system 310, and a notification system 312. The payment processing and billing system 308 is operationally responsible for the processing of payments and issuing of invoices/bills. The fulfillment system 310 communicates with third parties for the shipping of goods, when appropriate, as well as with service providers to record the delivery of goods and services to a customer. The notification system 312 operationally provides notifications to both customers and service providers regarding upcoming fulfillment events, as well as other delivery-related events.

The subscription engine 128 is also communicatively coupled to a database 318, to both store and retrieve data needed by each of the payment processing and billing system 308, the fulfillment system 310 and the notification system 312. The fulfillment system 310 creates and tracks the fulfillment or delivery of a service or a product. For example, for a service, the fulfillment system 310 records what was rendered or provided (e.g., what, how much, when, value) and uses the notification system 312 to remind users of appointments for a follow-up service. For products, the fulfillment system 310 issues orders, tracks shipping and delivery, in addition to tracking what was rendered and provided.

The notification system 312 is a messaging system that uses different media or messaging channels (e.g., email, text, push notification, etc.) to alert customers, providers (e.g., practices) and operations of different events.

FIG. 3 also illustrates that a subscription system may include an expert collective 314 comprising respective and distinct expert systems, namely an expert system 302, an expert system 304 and an expert system 306. Each of the expert systems may be dedicated to a specific vertical and provide a guided process for the creation of subscription and plans for customers in that vertical. For example, the expert system 302 may be dedicated to a cosmetics and beauty care vertical, the expert system 304 may be dedicated to a bicycle service vertical, and the expert system 306 may be dedicated to a car service vertical. Each of the expert systems within the expert collective 314 may furthermore communicatively coupled, and have access, to a respective database 316.

Figure 4:
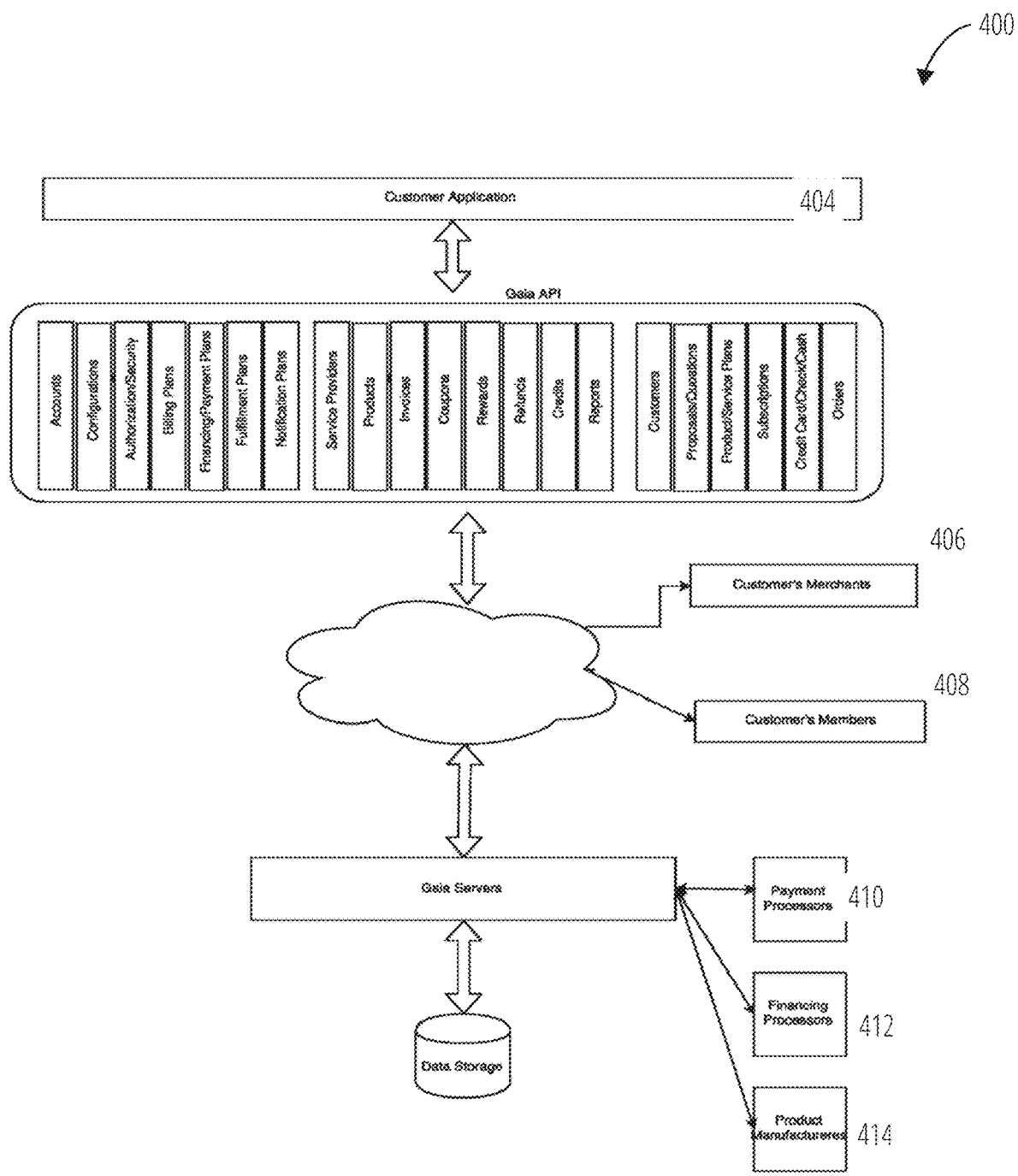
FIG. 4 is a block diagram illustrating further architectural details of a subscription system, according to some example embodiments.

FIG. 4 is a block diagram illustrating a subscription management system 400 and shows further details for a specific example embodiment. The subscription management system 400 includes a customer application 404 that, via the API server 120 and the communications network 102, accesses the application components 118. The API server 120 is shown to support many functions provided by the application components 118, using data store to and retrieved from the databases 132.

The customer application 404, via the API server 120 and the communications network 102, is also able to access customer's merchants 406 and customer's members 408. The application components 118 is also shown to exchange information and data with payment processors 410, financing processors 412 and product manufacturers 414.

The subscription management system 400 is, in one example embodiment, a cloud-based e-commerce solution built for developers to streamline and shorten the time to market of any e-commerce system that implements a variety of subscription models, quotations, recurring billings, electronic payments, order financing, order fulfillment, loyalty program, and notifications. The subscription management system 400 provides a rich set application programming interface (API) for developers to seamlessly integrate with their own systems. Modules and their APIs that developers can use to customize the subscription management system 400 to meet their own needs are as follows:

Accounts: primary account management and authorization.
Billing Plans: billing plan cycle options.
Financing/Payment Plans: members payments and financing options.
Fulfillment Plans: order fulfillment process.
Notification Plans: upcoming product/service notifications.
Service Providers: service providers information and configurations.
Products: products/services configuration.
Invoices: members' invoices and invoice line items.
Refunds: members' refunds management.
Credits: members' credits management.
Reports: analytical data on membership, financials, etc.
Coupons: coupons management.
Rewards: loyalty reward program for membership.
Customers: members management.
Product/service Plans: members' product/service plans management.
Proposals/Quotations: proposals and quotations.
Subscriptions: members' subscription configuration and management.
Credit Card/Check/Cash: member's credit card/check/and cash management.
Sample Data FlowRegister a business account with the subscription management system 400.

AccountResponse account=createAccount(AccountRequest request)Creates a treatment plan for members that all subscribed services are paid on the same date, the same invoice on a monthly basis.

BillingPlanResponse billingPlan=createBillingPlan(BillingPlanRequest request)Create a one-time payment plan for its subscribers.

PaymentPlanResponse paymentPlan=createPaymentPlan(PaymentPlanRequest request)Create a recurring payment plan for its subscribers.Request Ex: {"name: "Monthly Payment", payment_gateway: gateway_id, payment_count: 0, . . . });

Create some fulfillment plans (1 month, 2 month, . . . , 12 months) for providers to useFulfillmentPlanResponse fulfillmentPlan1=createFulfillmentPlan(FulfillmentPlanRequest request)

Create some notification plans for providers to use for any subscription's order.

NotificationPlanResponse notificationPlan1=createNotificationPlan(NotificationPlanRequest request)

Create a providerProviderResponse response=api.createProvider(new ProviderRequest( ))

Create coupons from own product catalog for its members.

CouponRequest couponRequest=new CouponRequestQCreate products for its members.

ProductResponse product=createProduct(ProductRequest request)

Registers a new memberCustomerResponse customerResponse= api.createCustomer(customerRequest);

Add CC to a member
CardResponse cardResponse=api.createCard(cardRequest);String cardId=cardResponse.apiData.card.getCardId ( );

Create a treatment plan for a member.
Sub scriptionPlanRespon se sub scriptionPlanResponse= api.createSubscriptionPlan(subscriptionPlanRequest);

Create different subscriptions for a member.
SubscriptionResponse sub scriptionResponse=api.createSubscription(subscriptionRequest);

Get pending Invoice of a subscription plan.
InvoiceResponse invoiceResponse=api.listInvoices(invoiceRequest); Charge a pending invoice of a subscription plan (Transaction)
TransactionResponse=api.chargeInvoice(transactionRequest);

Get member's upcoming order fulfillment under a subscription planorder list=list_order({"subscription_plan_id": "pla_9473c93", "filter": "pending"}) Updateexpert updates member's order fulfillment; i.e. confirmed, fulfilled, etc.status=update_order({"order_id": "or_9473c93", "status": "completed"}

Figure 5:
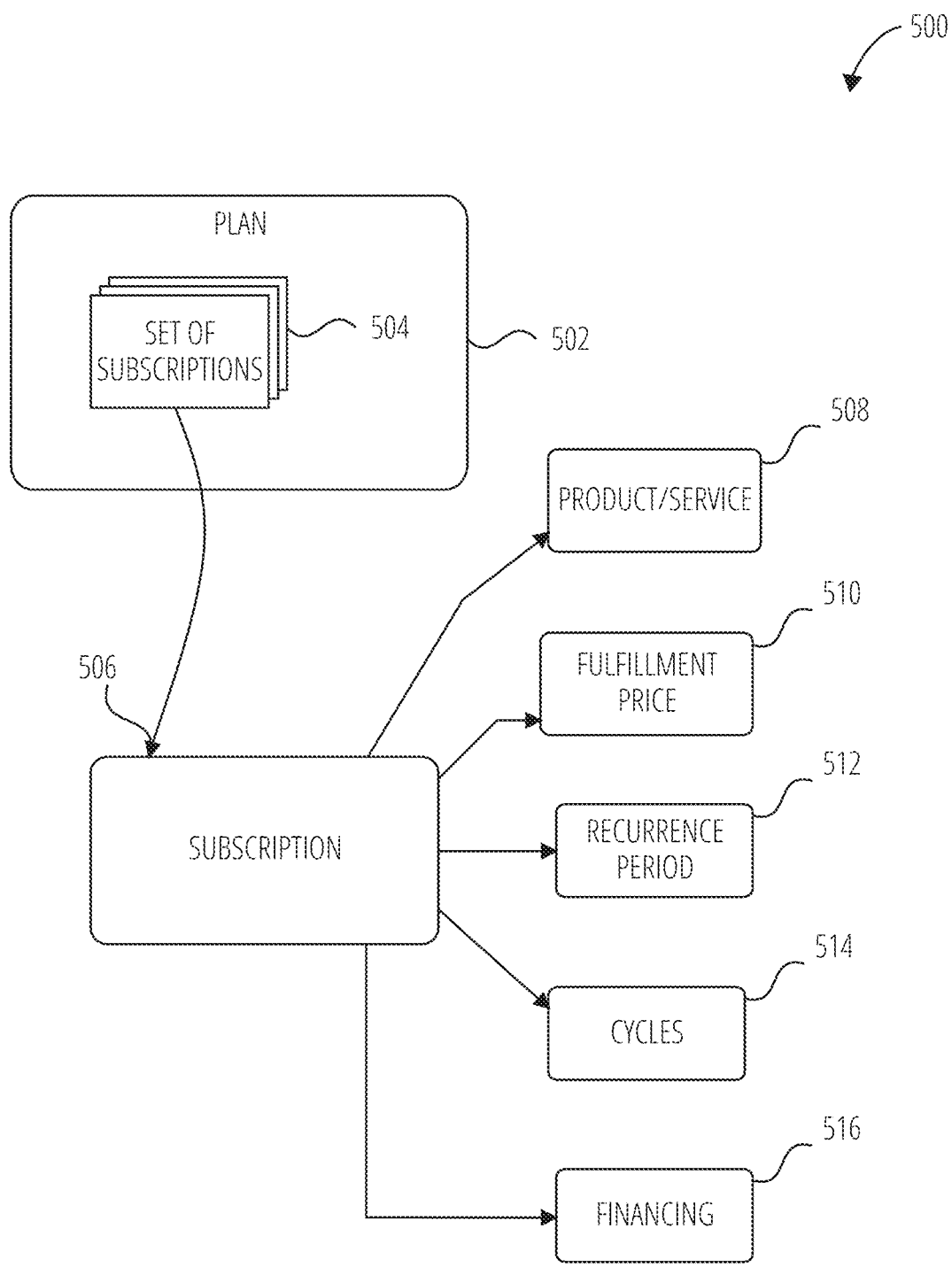
FIG. 5 is a diagrammatic representation of data structures maintained by a subscription service, according to some example embodiments.

FIG. 5 is a diagrammatic representation of a data architecture 500 created using and maintained by the subscription engine 128. A plan 502 includes a set of subscriptions 504. Each subscription 506 of the set of subscriptions 504 is for a product or service and has several attributes, a subset of which is shown in FIG. 5. Specifically, each subscription 506 relates to a specific product/service 508, has a fulfillment price 510, and a recurrence period 512. With respect to the recurrence period 512, a subscription 506 has some time period after which the subscription 506 recurs, e.g., must again be fulfilled. A subscription 506 may furthermore have a specified number of cycles 514 and may occur indefinitely or terminate after the specified number of the cycles 514.

A subscription 506 furthermore has associated financing 516. A subscription 506 may be financed via a loan or via a service provider directly as part of the service provider's subscription business. Alternatively, a subscription 506 may be fulfilled at a time of ordering.

Attributes of the subscription 506 may be managed by customers in some cases. For example, the cycles 514 may be modified or changed by a customer using the client 112 in order to interact with the subscription engine 128.

A specific subscription 506 may furthermore be executed independently of any other subscriptions included in a set of subscriptions 504, with the exception that billing is aggregated to a single payment at predetermined intervals (e.g., once a month).

A plan 502 for the delivery of service may be constructed or defined with the help of an expert (e.g., a physician or doctor) using an appropriate expert system 302, and performance/delivery of a subscription 506 of the plan 502 may be fulfilled at the expert's place of business (e.g., the doctors practice). A plan 502 for the delivery of a product may be fulfilled by shipment from a third party.

To facilitate financing (e.g., a loan as part of the financing 516) in near real-time, the subscription engine 128 is communicatively coupled to financial exchange 130 to enable the subscription engine 128 digitally to communicate details about a particular subscription 506 or set of subscriptions 504 to the financial exchange 130. Financiers then access the financial exchange 130 (e.g., using a third-party application 116) to optionally accept a financing offer relating to a particular set of subscriptions 504 or subscription 506.

This facilitation of financing by a financier happens in near real-time as, in a typical scenario, a customer is physically present at the checkout counter of a service provider. To this end, the financial exchange 130 operationally aggregates accepted financing and rates, refusals and regular recurring subscriptions amounts to create a quote for a total monthly price for all subscriptions within a set of subscriptions 504.

Figure 6:
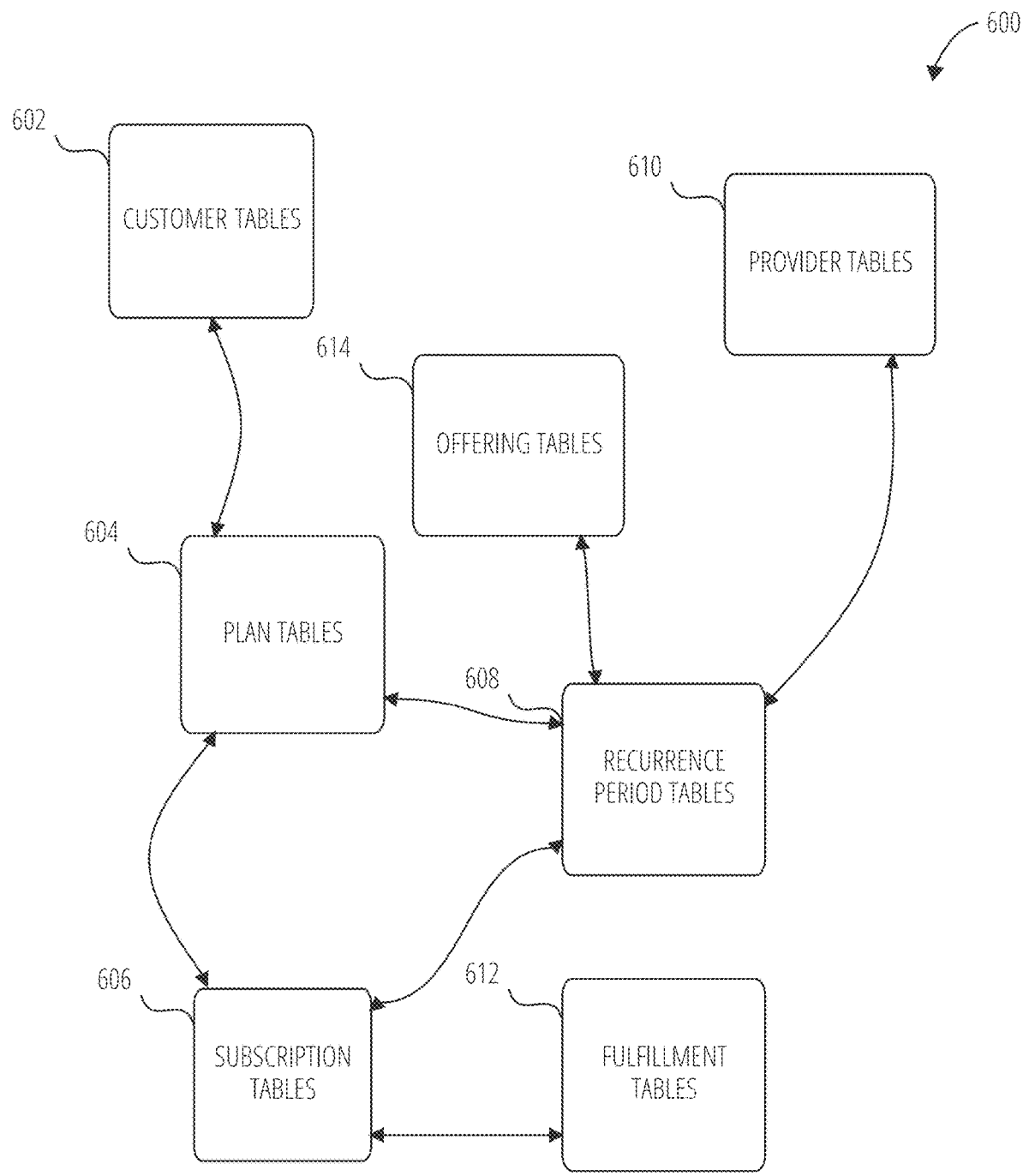
FIG. 6 is a block diagram as for details regarding a data architecture, according to some example embodiments.

FIG. 6 is a block diagram illustrating a data architecture 600, according to some example embodiments. The data architecture 600 is realized and stored within the databases 132. Customer tables 602 store records for customers (e.g., consumer 134) of various service providers, each service provider, in turn, being recorded within provider tables 610. A customer record within the customer tables 602 may be associated with a plan 502 for which a record exists within plan tables 604. Each plan 502 within the plan tables 604 may be associated with a set of subscriptions 504, records for which exist within the subscription tables 606. Offering tables 614 maintain records for each product/service 508 (as examples of offerings), and each subscription 506 has a specified cycle 514 within recurrence period tables 608. A fulfillment price 510 associated with a particular subscription 506 is also stored within respective records of the recurrence period tables 608.

Fulfillment records (e.g., indicating and recording whether a particular subscription 506 has been fulfilled) are stored within fulfillment tables 612.

Figure 7:
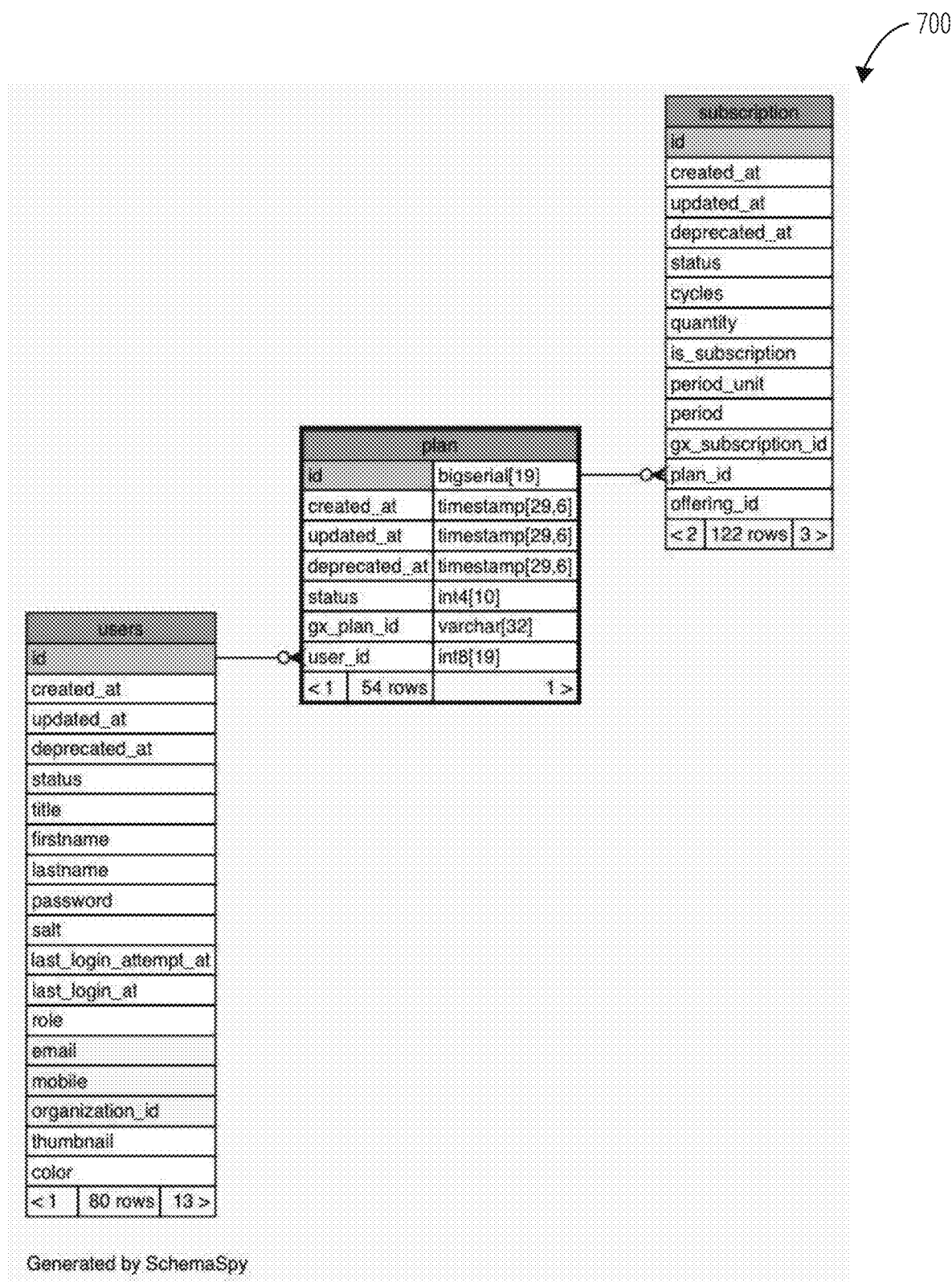
FIG. 7 is a table diagram illustrating further details of data, according to some example embodiments, stored within the various tables discussed above with reference to FIG. 6.

FIG. 7 is a table diagram illustrating further details of data, according to some example embodiments, stored within the various tables discussed above with reference to FIG. 6.

Figure 8:
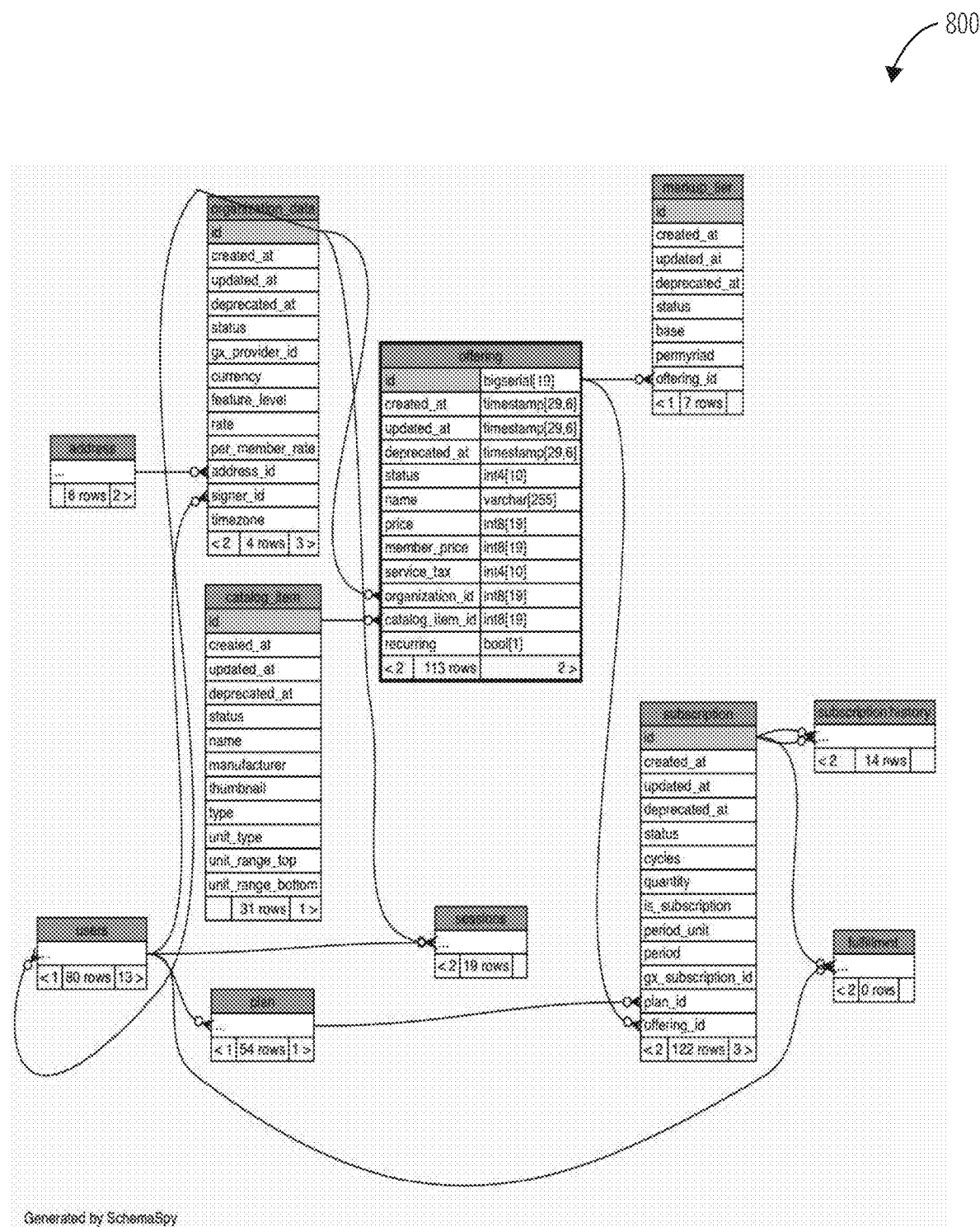
FIG. 8 is a table diagram illustrating further details of data, according to some example embodiments, stored within the various tables discussed above with reference to FIG. 6.

FIG. 8 is a table diagram illustrating further details of data, according to some example embodiments, stored within the various tables discussed above with reference to FIG. 6.

Figure 9:
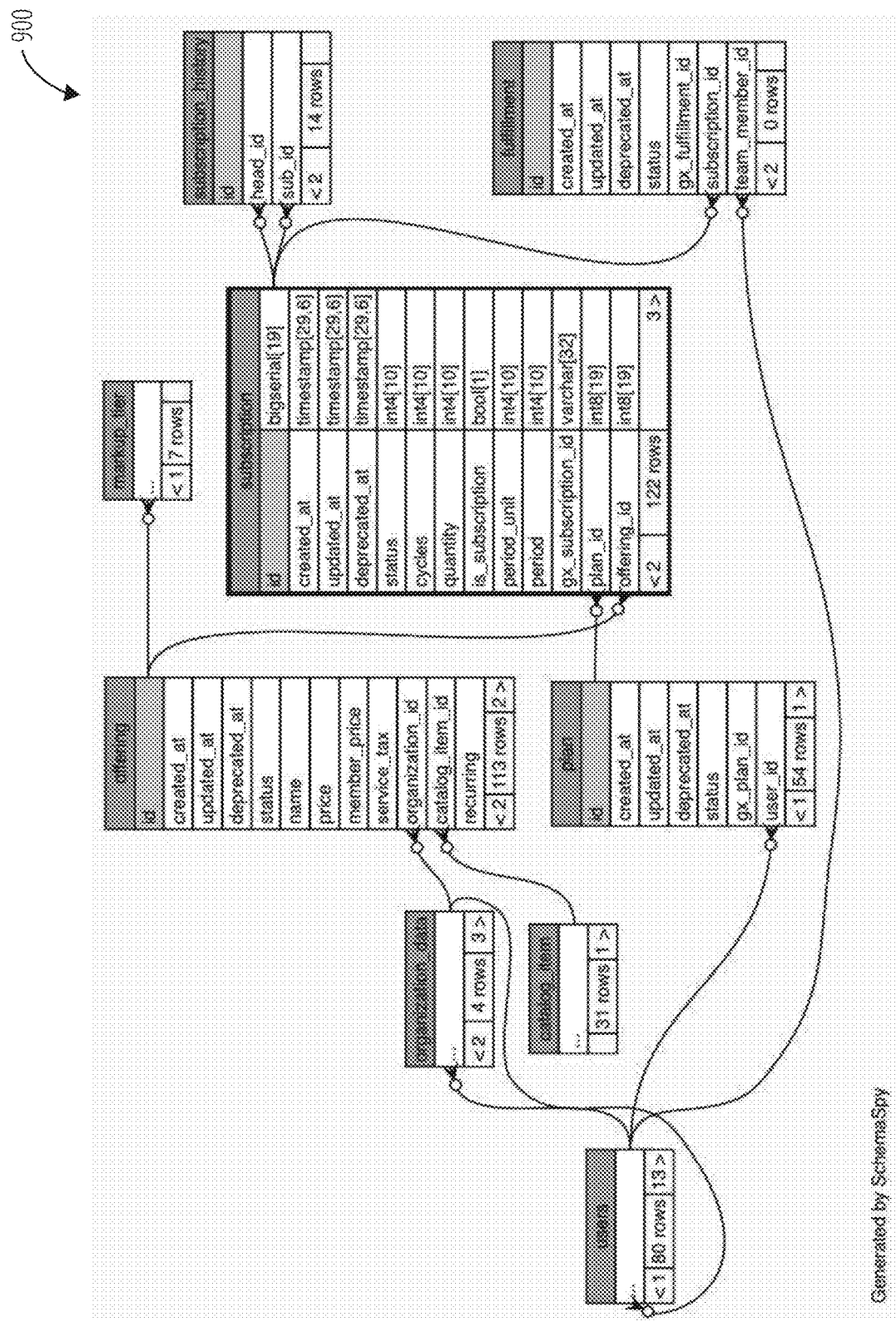
FIG. 9 is a table diagram illustrating further details of data, according to some example embodiments, stored within the various tables discussed above with reference to FIG. 6.
Figure 10:
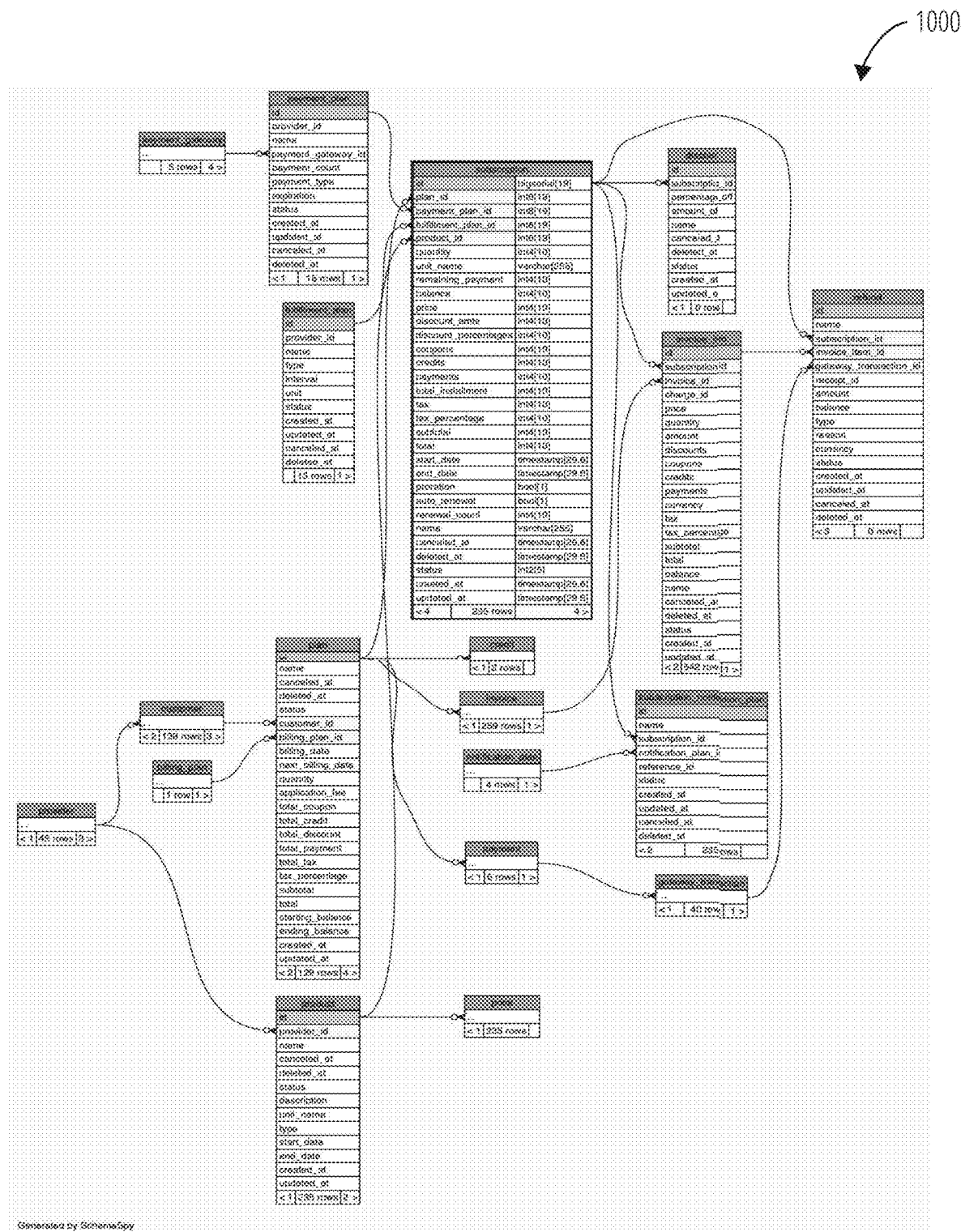
FIG. 10 is a table diagram illustrating further details of data, according to some example embodiments, stored within the various tables discussed above with reference to FIG. 6.

FIG. 9 is a table diagram illustrating further details of data, according to some example embodiments, stored within the various tables discussed above with reference to FIG. 6.

Figure 11:
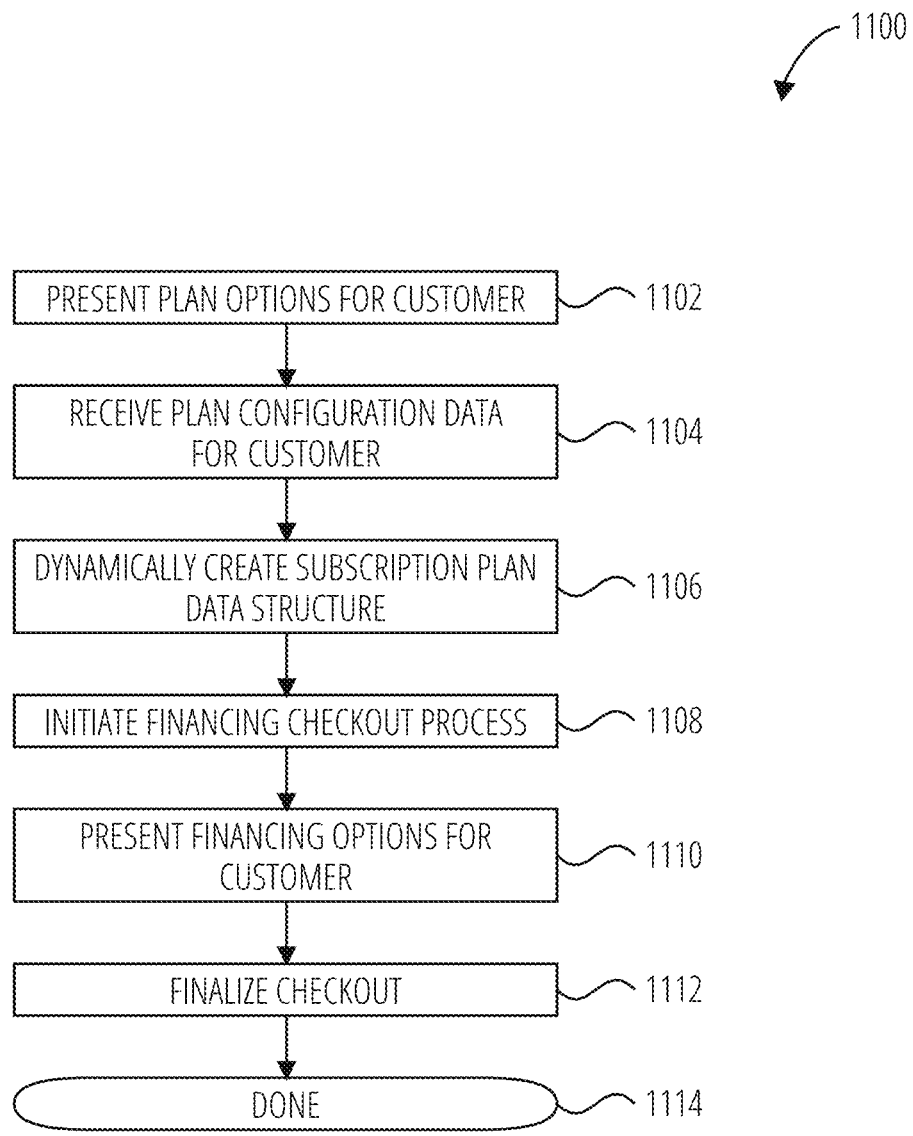
FIG. 11 is a flowchart illustrating a method, according to some example embodiments, to create a subscription plan data structure and to facilitate financing of the subscription plan reflected in the data structure.

FIG. 11 is a flowchart illustrating a method 1100, according to some example embodiments, to create a subscription plan data structure and to facilitate financing of the subscription plan reflected in the data structure.

The method 1100 commences at operation 1102 with the presentation of plan options to a customer. In one embodiment, the presentation may be made via user interfaces on which an expert (e.g., a cosmetic physician) and the customer collaborate. The presentation may accordingly be done via interfaces that are generated and communicated from an appropriate expert system 124, via a web server 122, to a client device 108 being operated by the expert. FIG. 13-FIG. 41 illustrate examples of such user interfaces.

At operation 1104, the subscription engine 128 receives plan configuration data from the expert system 124, the plan configuration data having been received from the customer at operation 1104 and in response to the presentation of plan options at operation 1102. The plan configuration data, in some example embodiments, include the data described above with reference to FIG. 5 through FIG. 10.

At operation 1106, the subscription engine 128 proceeds to automatically and dynamically create a subscription plan data structure, such as that described above with reference to FIG. 5 through FIG. 10.

At operation 1108, the subscription engine 128 initiates a financing checkout process by communicating pertinent details of a particular plan 502 of the financial exchange 130. Specifically, the subscription engine 128 provides the following information to the financial exchange 130:

Information about the service provider (e.g., a medical practice) that provides the services;

Information about the customer (e.g., personal information such as a Social Security number (SSN) or driver's license number (DLN)) and financial history summary of the financial relationship between the customer and the service provider (e.g., including a financial history rating based on experience); and Details of the plan including an array of subscriptions.

The financial exchange 130 responds with a number of financing offers containing:

A list of subscriptions in the offer; and

Terms for the offer (e.g., interest rate, pay-off time, down payment, other financing items)

The subscription engine 128 will consider these and pick zero or more to offer the customer using pre-defined business rules. These business rules may specify:

Finance everything or nothing

Prefer fewer offers

Prefer lower offers

Provider finances unclaimed subscriptions

The financing checkout process is facilitated in real time as a customer may be physically present at the location of an expert (e.g., a physician). As described above, the financial exchange 130 then presents financing options to potential financiers (e.g., various third parties or to the expert or service provider), to enable real-time decision-making by the potential financiers.

At operation 1110, the financial exchange 130, having received acceptances or rejections of financing offers from the potential financiers, communicates these financing options back to the subscription engine 128, which in turn presents them, via the expert system 124 to the customer. The customer, at operation 1112, then elects to accept or reject the financing offers and finalizes the checkout process.

Figure 12:
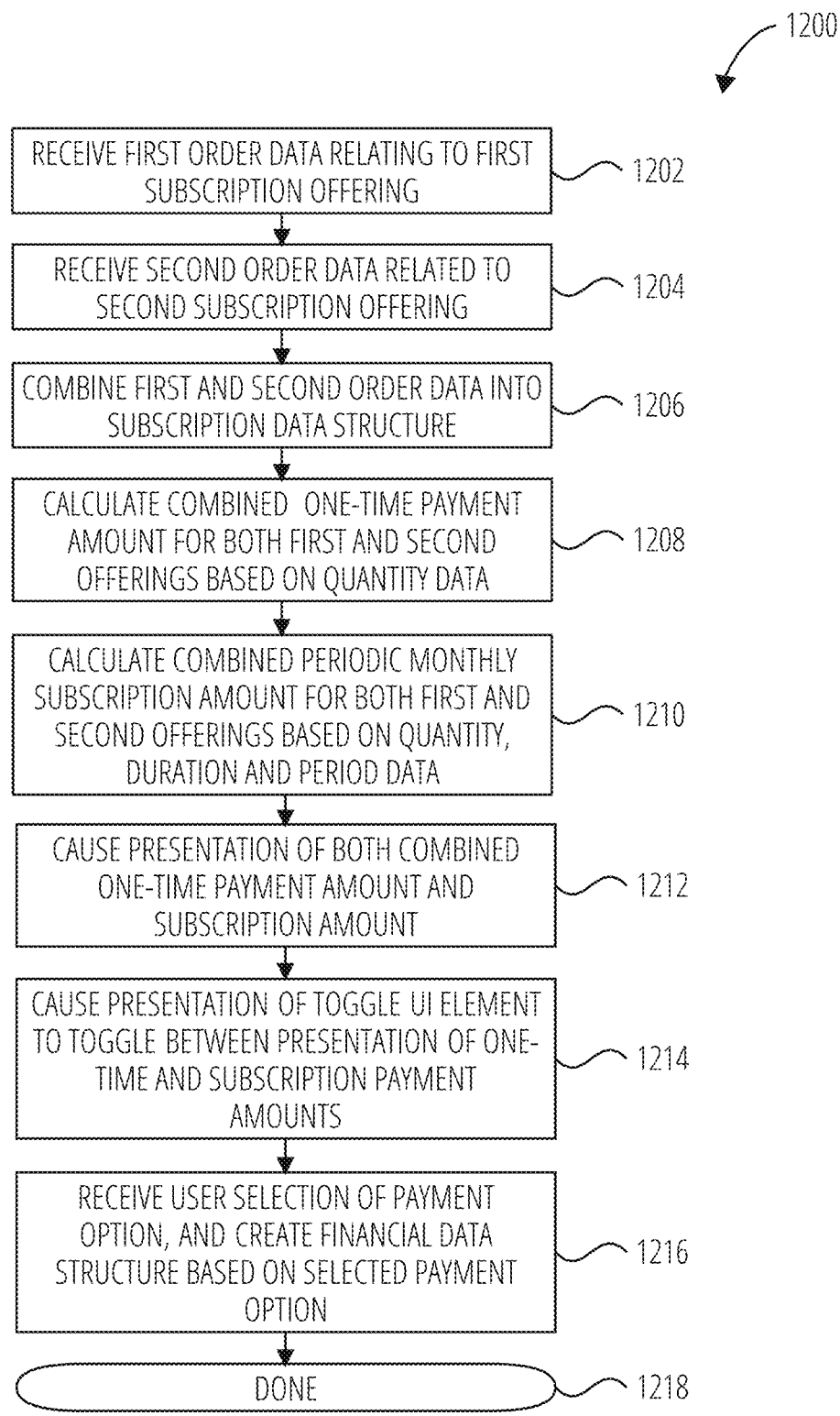
FIG. 12 is a flowchart illustrating a method, according to some example embodiments, of presenting combined one-time payment and subscription payment information to a user on a subscription engine.
Figure 13:
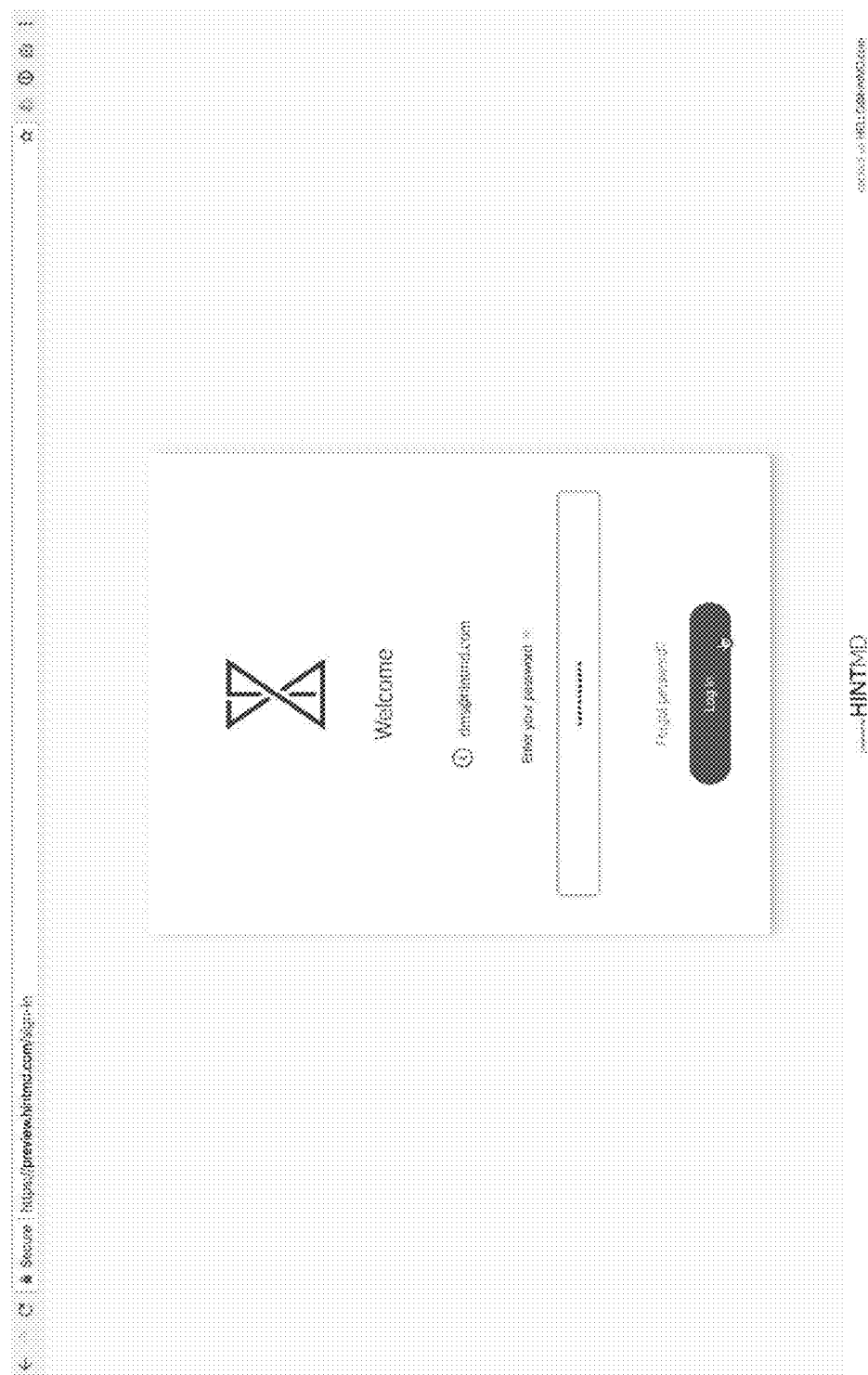
FIG. 13 illustrates a user interface in accordance with one embodiment.
Figure 14:
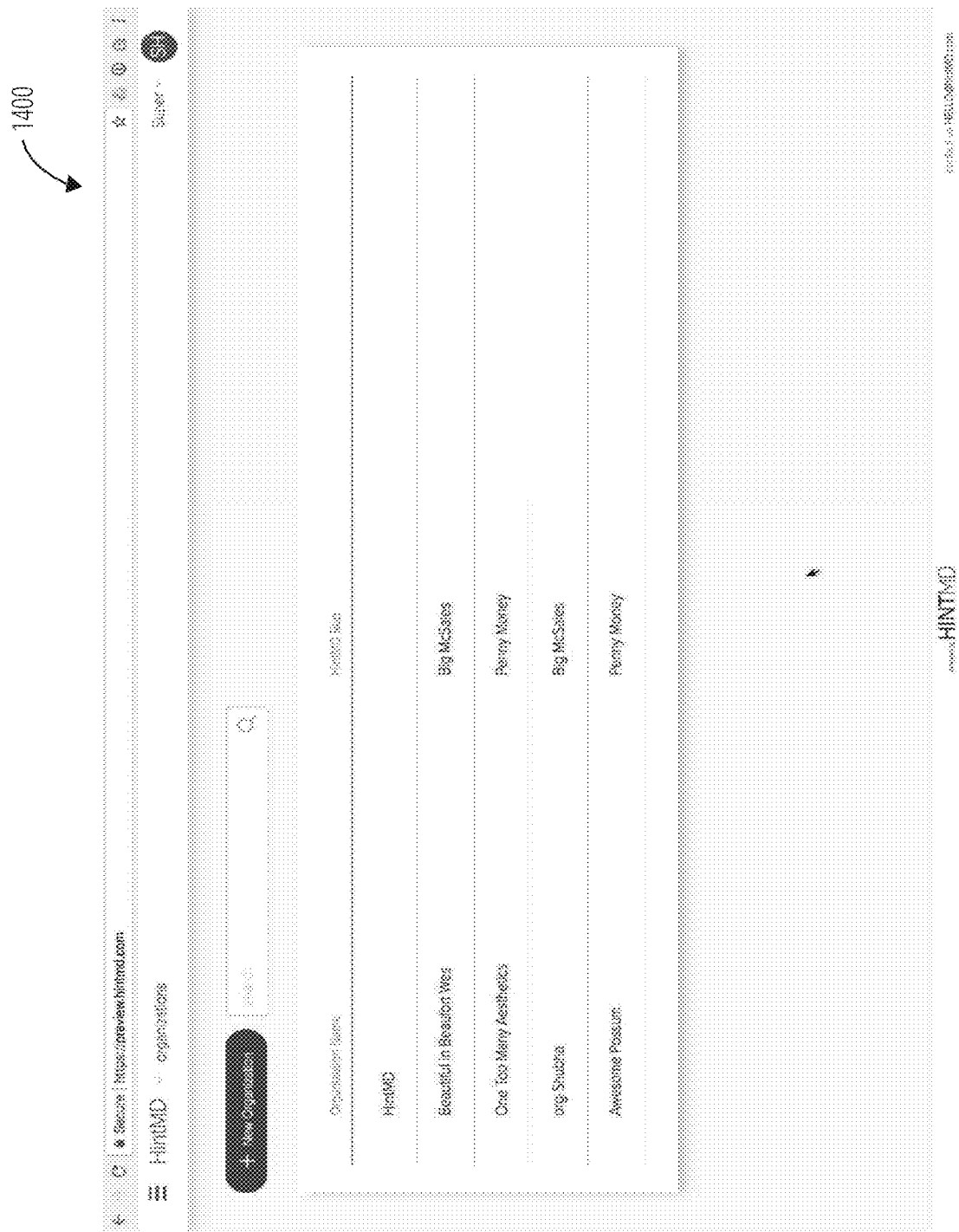
FIG. 14 illustrates a user interface in accordance with one embodiment.
Figure 15:
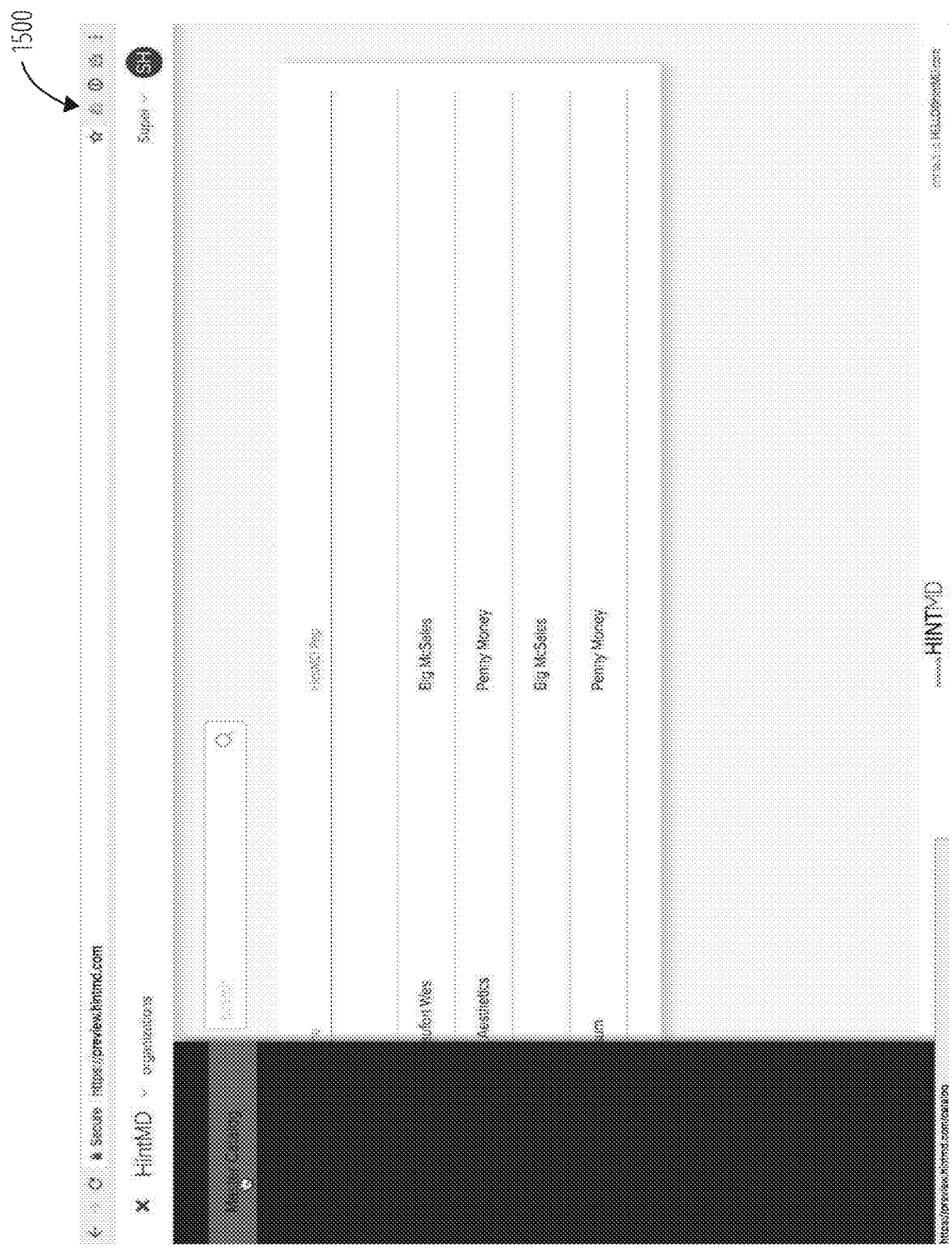
FIG. 15 illustrates a user interface in accordance with one embodiment.
Figure 16:
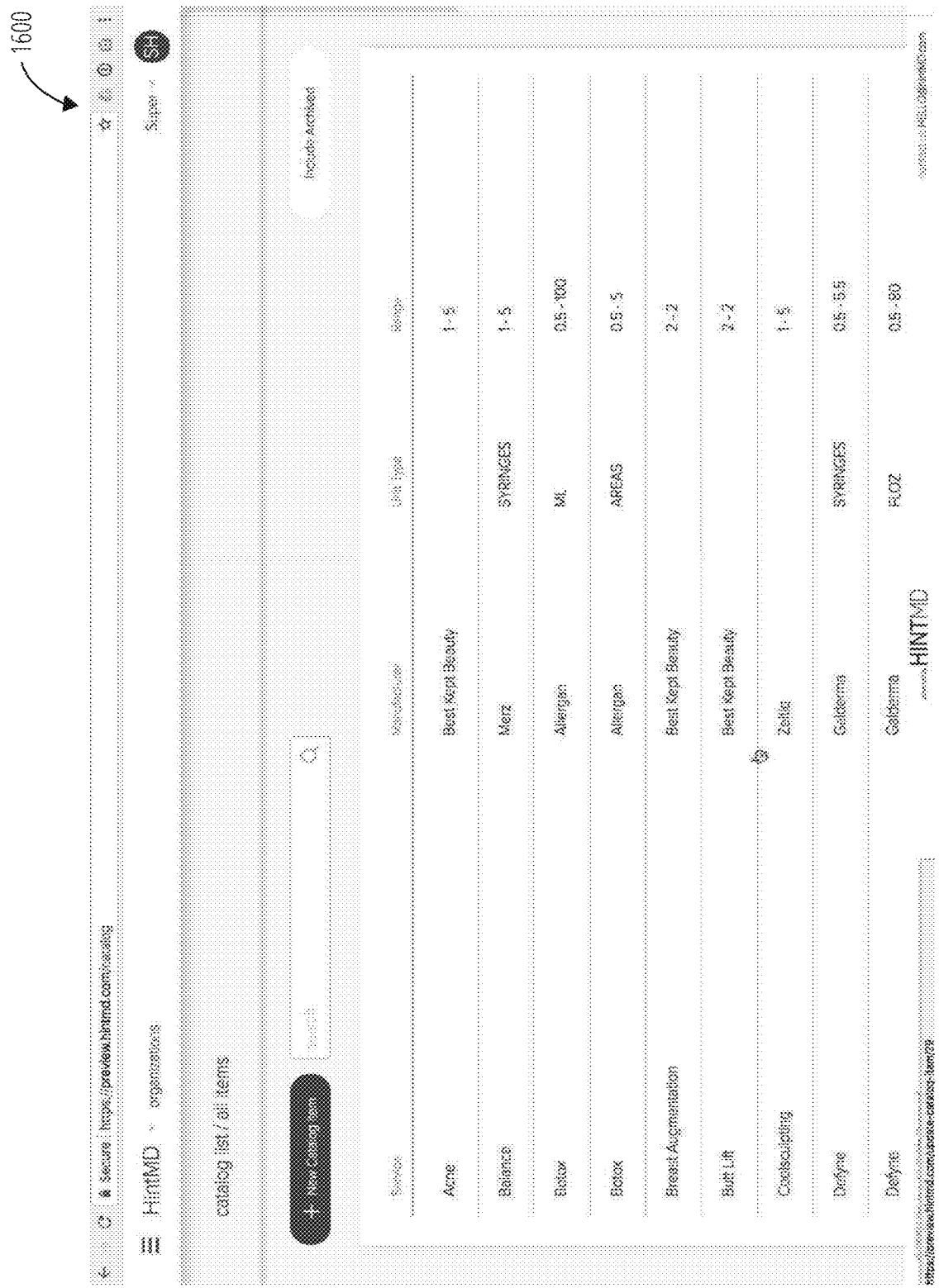
FIG. 16 illustrates a user interface in accordance with one embodiment.
Figure 17:
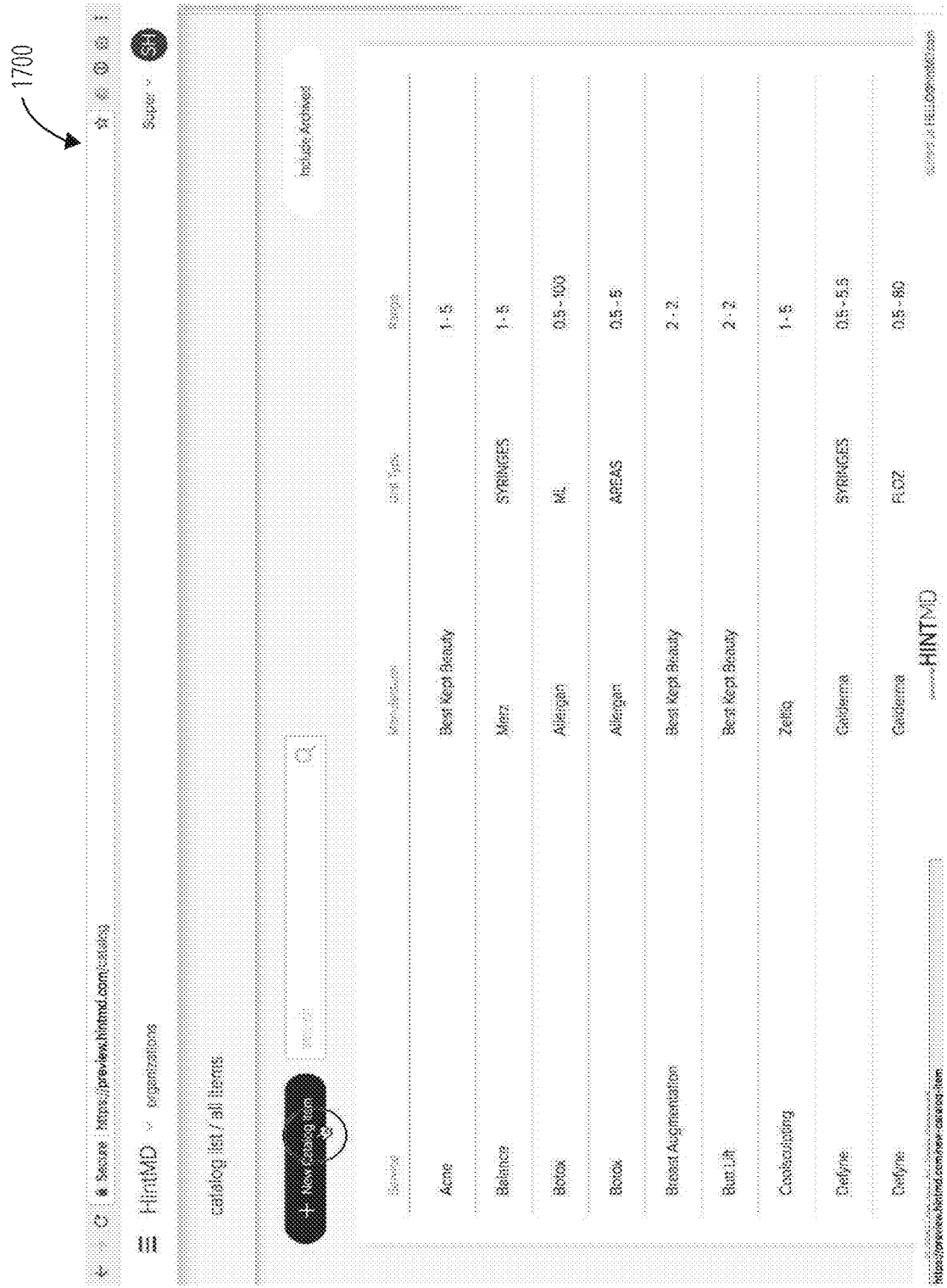
FIG. 17 illustrates a user interface in accordance with one embodiment.

FIG. 12 is a flowchart illustrating a method, according to some example embodiments, of presenting combined one-time payment and subscription payment information to a user of a subscription engine.

The method 1200 commences at operation 1202 with the receipt, by the subscription engine 128, of order data relating to a first subscription. The order data is inputted into an expert system 124 by a user (e.g., a customer in collaboration with expert, or by an expert alone) and specifies various attributes with respect to a subscription (e.g., a product or service) that is being presented for purchase to a customer. Attributes of a subscription that may be included within the order data are reflected in the subscription table, offering table and catalog_item table of FIG. 8. As shown in FIG. 8, a particular subscription may also inherit various attributes of an offering in the offering table and a catalog item in the catalog_item table.

At operation 1204, the subscription engine 128 may receive further order data relating to a second subscription that a particular customer wishes to purchase. Again, this further order data may be entered into the expert system 124 by a user, and specifies various attributes with respect to a second subscription.

Together, the first and second subscription may constitute a bundle of products and/or services that the customer wishes to purchase using either a one-time payment or a subscription payment plan.

After receiving the order data from a customer at operation 1202 and operation 1204, the expert system 124 operationally presents several subscription choices to a customer. The examples discussed herein with respect to subsequent figures show a process in which various cosmetic and/or beauty products and services are presented, by an appropriate expert system 124, to a user for selection. Multiple attributes of these subscriptions are specified in the order data received at operation 1202 and operation 1204, including attributes such as quantity (e.g., number of units), frequency or recurrence period (e.g., the period of time between the delivery of the respective quantity of products or services), and duration or cycles (e.g., the number of deliveries of the respective quantity or services).

At operation 1206, the subscription engine 128 combines the first and second order data into a subscription data structure (e.g., see FIG. 7), which is stored in a database and presented via a user interface to a user (e.g., an expert or consumer).

At operation 1208, the subscription engine 128 calculates a combined one-time payment amount for both the first and second subscriptions, based on quantity data included in the respective first and second order data.

At operation 1210, the subscription engine 128 calculates combined periodic monthly subscription payment amounts for both first and second offerings, based on the quantity, recurrence, and duration information included in both the first and second order data.

Figure 28:
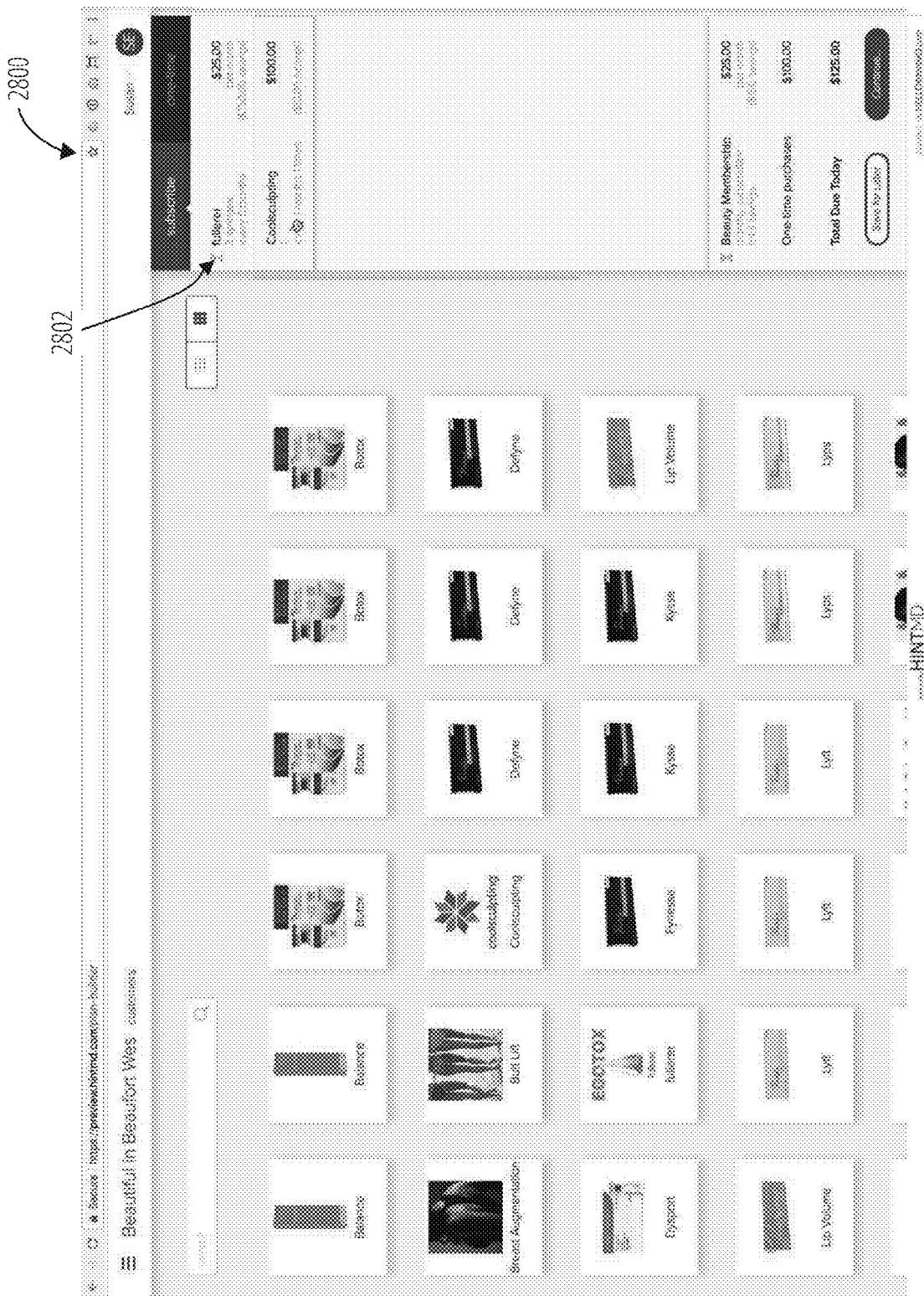
FIG. 28 illustrates a user interface in accordance with one embodiment.
Figure 29:
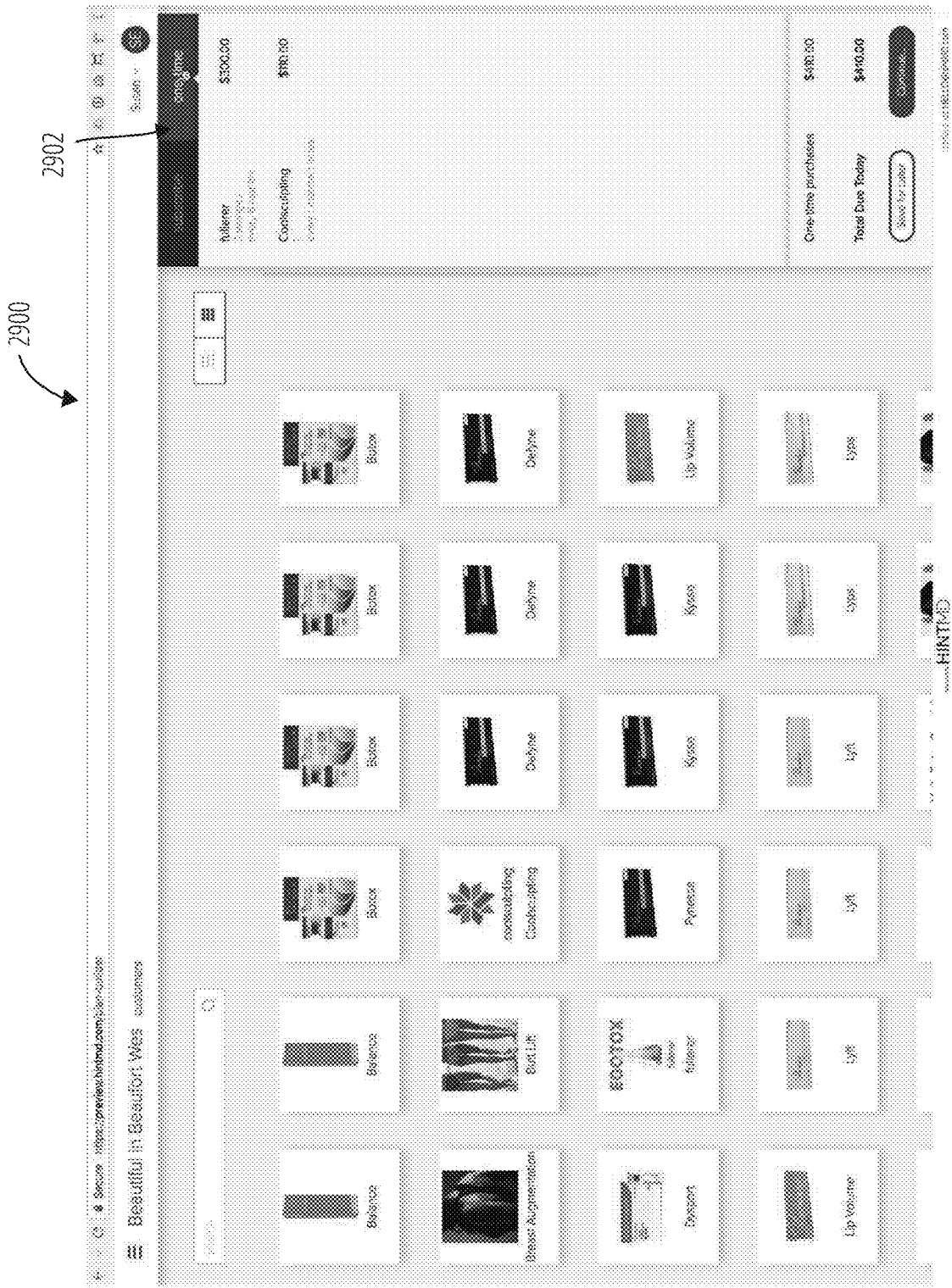
FIG. 29 illustrates a user interface in accordance with one embodiment.

At operation 1212, the subscription engine 128 causes presentation of both the combined one-time payment amount, and the combined periodic monthly subscription payment amount, within a single user interface (see FIG. 28 and FIG. 29).

The user interface includes a first user element to present the combined one-time payment amount (FIG. 29) and a second user element to present the combined monthly subscription payment amount (FIG. 28). The user interface further includes a toggle feature or element to enable a user to toggle between the presentations of the first user interface element (presenting the combined one-time payment amount) and the second user interface element (presenting the combined monthly subscription payment amount). By presenting this toggle feature, the user interface conveniently allows a user (e.g., an expert or consumer) to compare and contrast payment options in a convenient way, while maintaining the ability of the user to select one of these options without navigating away from the primary interface within which the first and second user interface elements are contained.

While the combination of only first and second subscription offerings has been described above for the sake of clarity, multiple offerings subscriptions can be included in the subscription data structure. For example, third order data, relating to a third subscription offering, may be received via a user interface of an expert system 124 and communicated to the subscription engine 128. The subscription engine 128 may then combine the first, second and third order data into the subscription data structure.

At operation 1216, the subscription engine 128 receives the user selection of one of the payment options (e.g., a one-time payment or subscription payment), and dynamically creates a financial data structure related to the subscription bundle, based on the selected payment option. The financial data structure, which includes the subscription plan a data structure discussed above at operation 1106, is then used to initiate the financial checkout process (operation 1108).

The method 1200 then terminates at done block 1218.

FIG. 13-FIG. 21 show a sequence of user interfaces that a user (e.g., an expert or supplier) may be presented via a subscription engine, and which the user may manipulate to create and update a master catalog of subscription offerings (e.g., products or services).

A master catalog is a catalog of brand products and services that a specific supplier can choose from and modify to populate a user-specific and customized catalog. Following a login operation (FIG. 13) and selection of a particular organization (FIG. 14), a user is presented with a "new catalog item creation" sequence.

The creation of a new catalog item commences with the selection of the "create new item" menu item (FIG. 16-FIG. 17), responsive to which the user is presented with an interface (FIG. 18) into which the user inputs a service (or product) name, as well as a manufacturer designation. A user-selectable radio button enables the user to identify the catalog item as being a service (as opposed to the default of a product). In a different embodiment, a "product" radio button may be presented to a user to enable the user to designate the catalog item as a product specifically. In yet other embodiments, other type radio buttons may be presented to enable other offering type designations.

Figure 18:
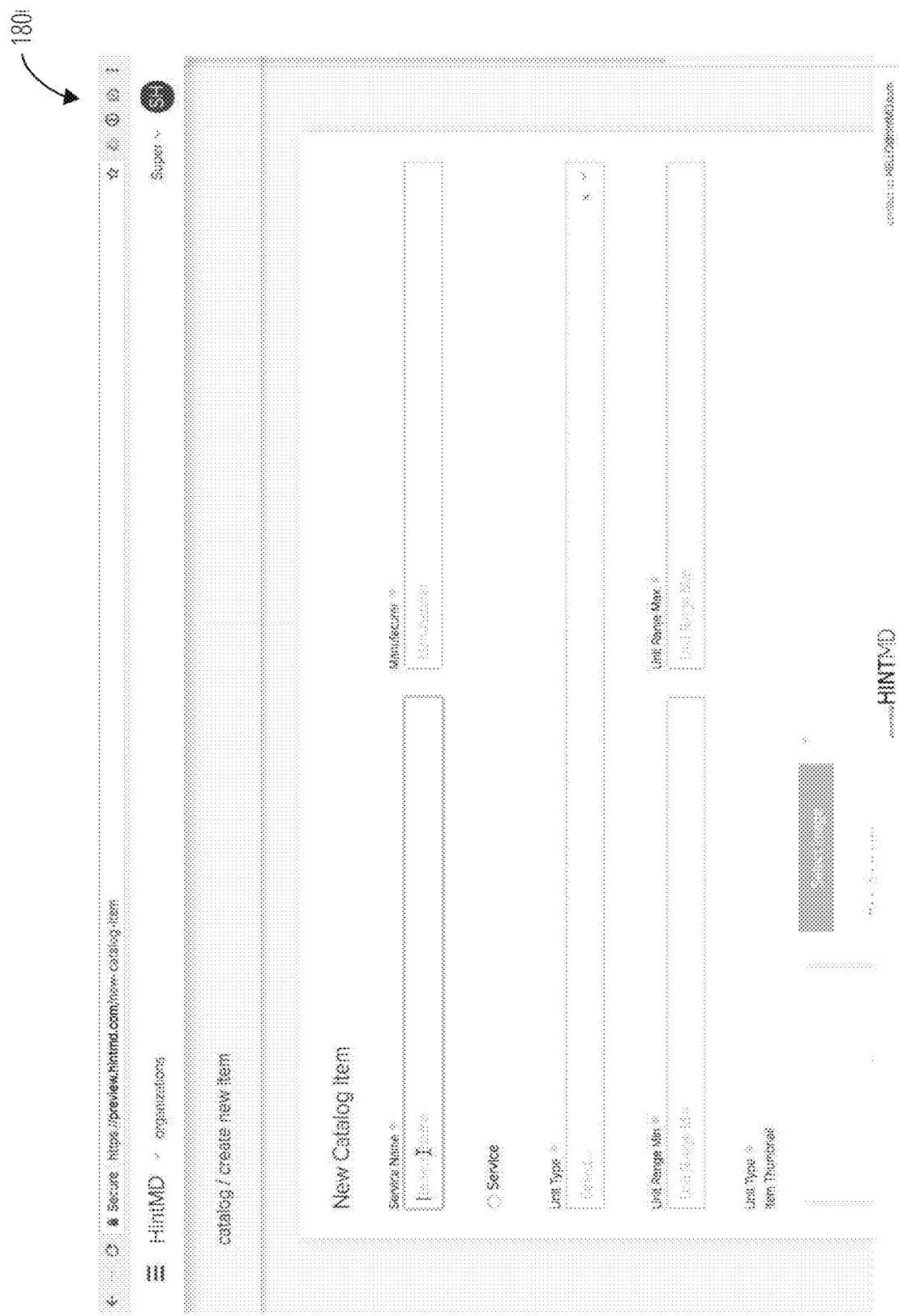
FIG. 18 illustrates a user interface in accordance with one embodiment.
Figure 19:
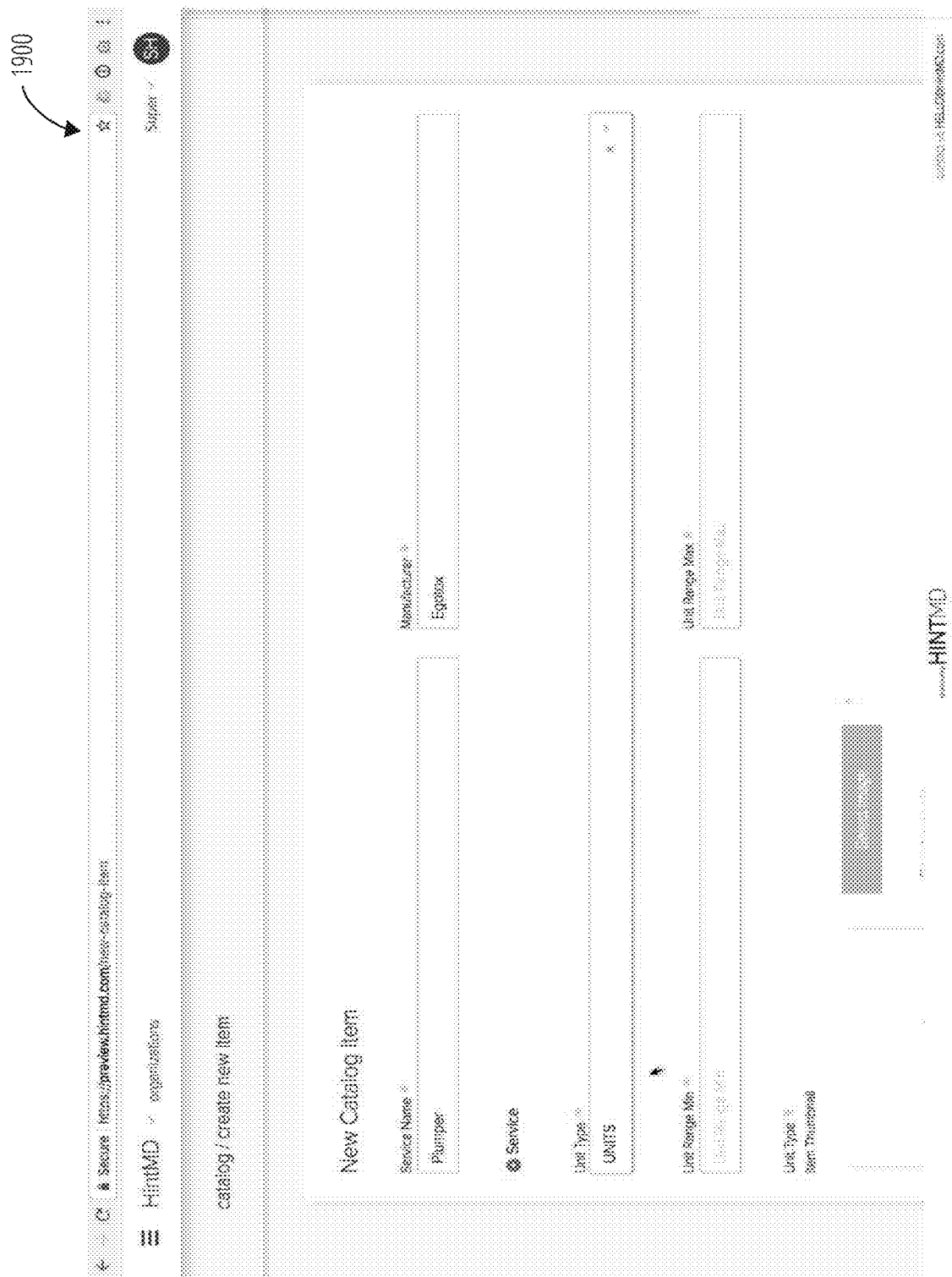
FIG. 19 illustrates a user interface in accordance with one embodiment.
Figure 20:
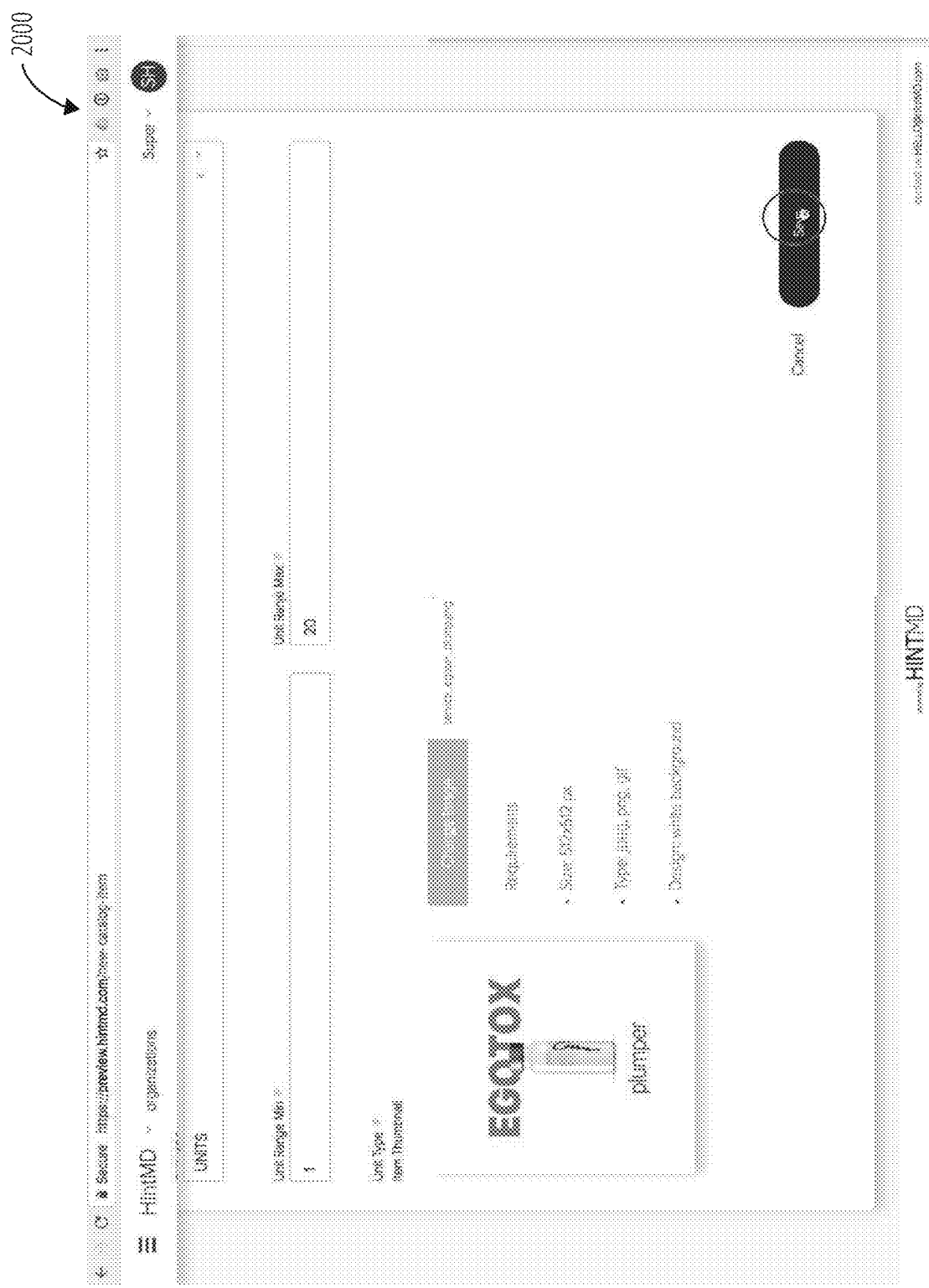
FIG. 20 illustrates a user interface in accordance with one embodiment.

A user may then, from a drop-down menu, specify a unit type for the new catalog item (FIG. 18). Example selections from the unit type menu include unitless, units, syringes, etc. A user is then able to specify a minimum and maximum range for the specified unit type, which determines the number of increments displayed on a slider selector interface element presented in a plan creation user interface.

A user then specifies a thumbnail image (FIG. 20) to be displayed for the relevant catalog item (e.g., this may be uploaded from the user's computer or uploaded from a third-party Internet location). The user then selects the "save button" to save the specification for the new catalog item.

The above-described creation of a new catalog item for the master catalog is something that would typically only need to be performed one time to populate the master catalog. A user may furthermore review and edit a newly created master catalog item by selecting a within the "catalog list/all items" user interface.

Figure 21:
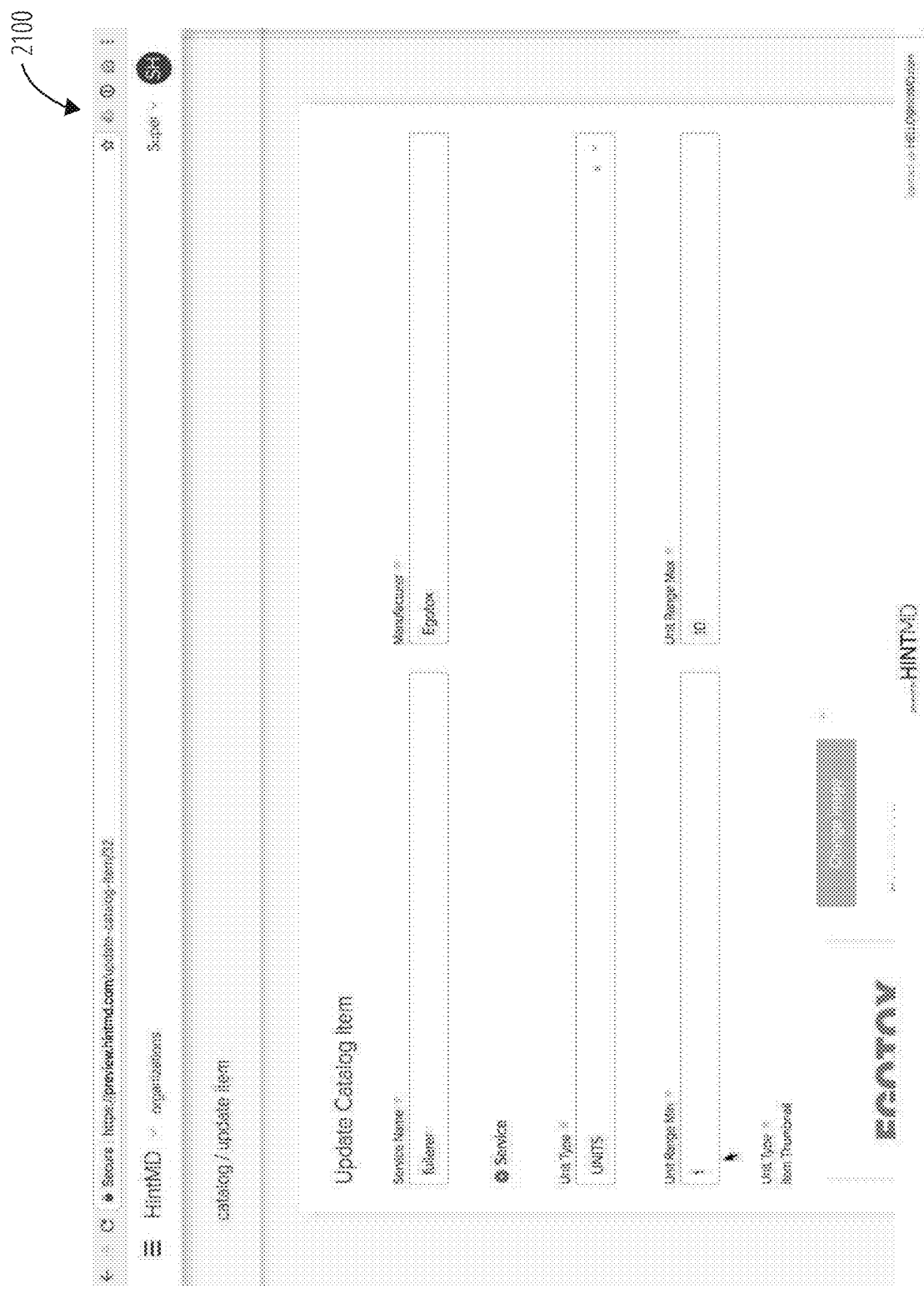
FIG. 21 illustrates a user interface in accordance with one embodiment.

FIG. 21 is a screenshot for user interfaces that enable a user to edit a catalog item, according to some example embodiments. As a first step, the user selects, from the list of master catalog items, a particular catalog item that the user wishes to edit.

Any of the information described above (e.g., the JPEG image, units, etc.) may conveniently be modified. A change or edit made to a single catalog item for a particular brand or manufacturer may, in some embodiments, automatically be propagated to other catalog items from the same brand or manufacturer. For example, a change to the thumbnail image of a particular catalog item from a particular brand may result in the thumbnail images for other catalog items from that same brand of manufacturer also being changed.

FIG. 22-FIG. 41 are screenshots of user interfaces that may be presented to a user, by an expert system, as part of a new customer creation process. The new customer creation process will typically be performed by an expert (e.g., a physician at a cosmetic beauty practice) identified by a name in the top right-hand corner of the interface (e.g., Susan with the practice "Beautiful in Beaufort Wes"). The default view is the customer list, from which the expert can select a "create new customer" icon, which initiates display of a plan builder interface (e.g., the "new customer plan" interface (see FIG. 23)).

Figure 23:
FIG. 23 illustrates a user interface in accordance with one embodiment.

FIG. 23 illustrates a user interface presenting a matrix of user-selectable offering elements, each including a thumbnail image and title that are selectable to add an associated offering to a plan. Selection of a specific offering element invokes an overlaid sub-interface—e.g., a "choose quantity, period and treatments" interface—for the specific offering (e.g., either a product or a service). In the illustrated example of FIG. 24, the product "FULLERER" is selected from the matrix, and an associated slider sub-interface 2402 is presented in an overlaid manner over the primary "matrix" interface. The slider sub-interface 2402 presents a graphical user interface data input element in the form of a respective slider for each of two attributes of the offering, namely a quantity attribute ("how many"), and a recurrence period attribute ("how often').

Each slider has a series of demarcations or intervals between a minimum value and a specified maximum value specified for the attribute. For example, a quantity slider 2404 has several demarcations representing a number or quantity of offerings that can be provided as part of the plan. Similarly, a recurrence period slider 2406 has a number of demarcations representing the number of months between each scheduled supply/delivery of the offering in terms of the plan.

Each slider also has a movable selection element in the form of a circle or dot, within which is displayed a number representing the value for the attribute that the expert wishes to specify as part of the plan. By sliding the movable selection item to the left and right, the expert is able to specify an input value for the respective attribute. This number is displayed as a numeric value within the movable selection item. Visually, the selection element is empty when located at the 0 value (the default position). Upon user selection, the selection element visually raises from a locked vertical position, to a move vertical position just above the slider line. When in the move vertical position, the slider element is movable horizontally left and right along the slider line. The selection element is filled (or otherwise graphically distinguished) as it is moved from the default horizontal position. Further, a number or value is displayed within the selection element to represent the aligned value on the slider line. For example, in FIG. 24, the respective selection elements display the numbers "3" and "6" respectively. Graphically, the selection element drops back down (relative to the selection line) to a locked vertical position on a selected value to complete the value selection process.

As noted above, defining the quantity and frequency of delivery of a product or service offering under subscription plan is tricky and presents technical challenges to a user. This is particularly so where the product or service offering is being subscribed to as a bundle of offerings or services that are all being included within a single subscription plan. For example, defining the quantity and frequency of delivery requires typing numerical data into appropriate fields and then calculating variables to display a monthly cost of the subscription plan. Because the slider sub-interface 2402 is frequently used on a touchscreen tablet device while the customer is watching, there is a need to have a fast friction free device to enter the data.

Figure 24:
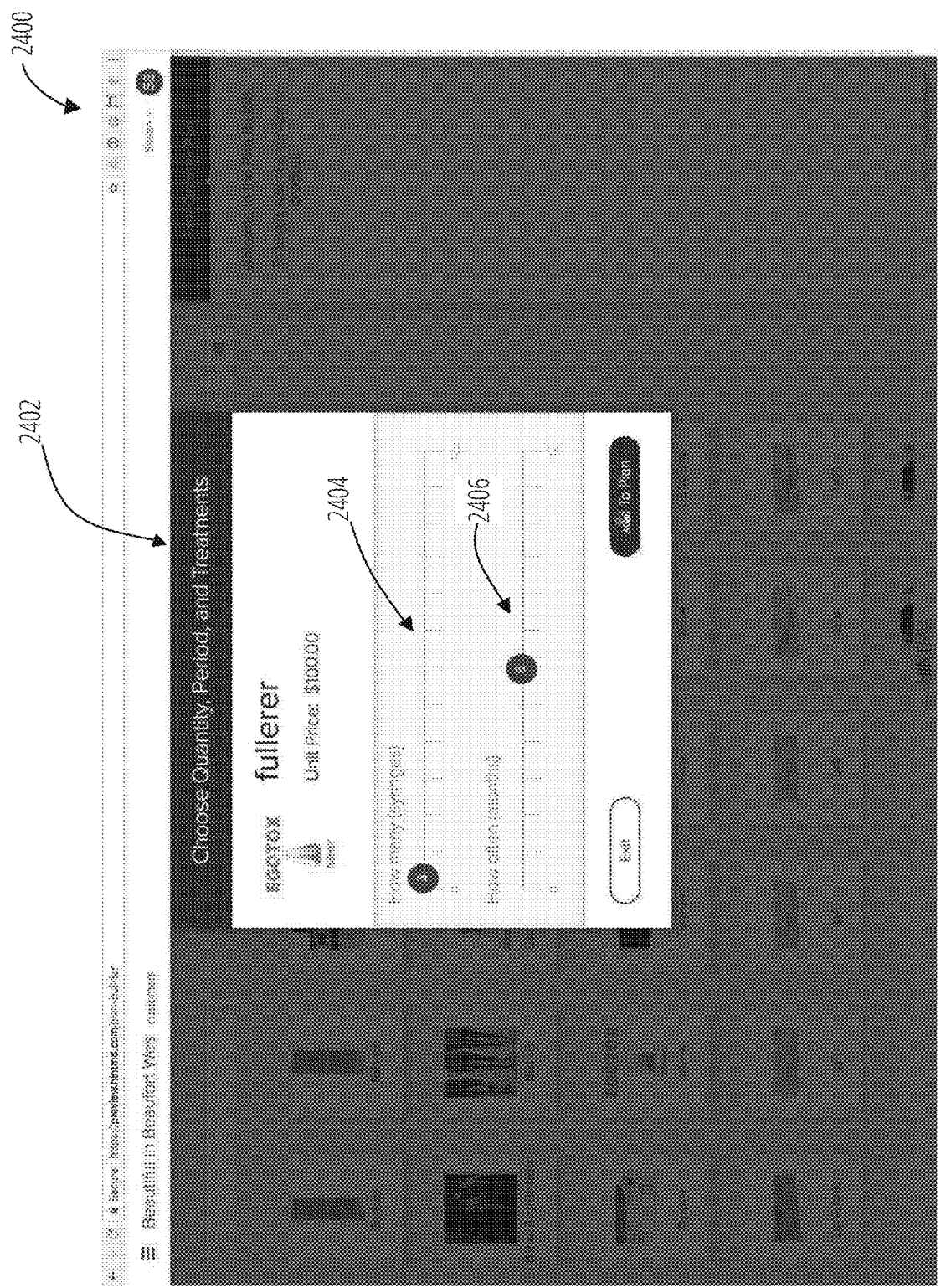
FIG. 24 illustrates a user interface in accordance with one embodiment.
Figure 26:
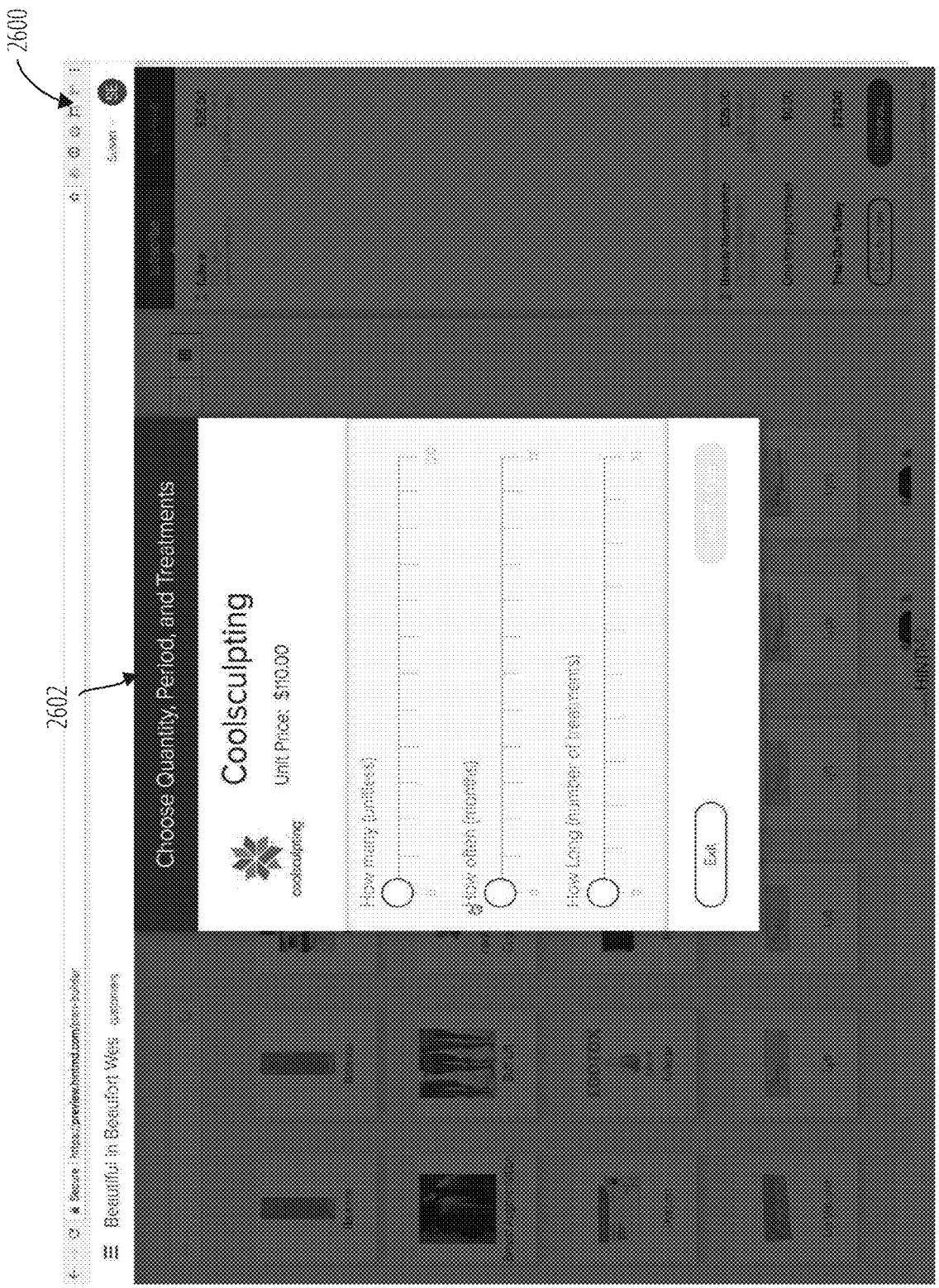
FIG. 26 illustrates a user interface in accordance with one embodiment.
Figure 27:
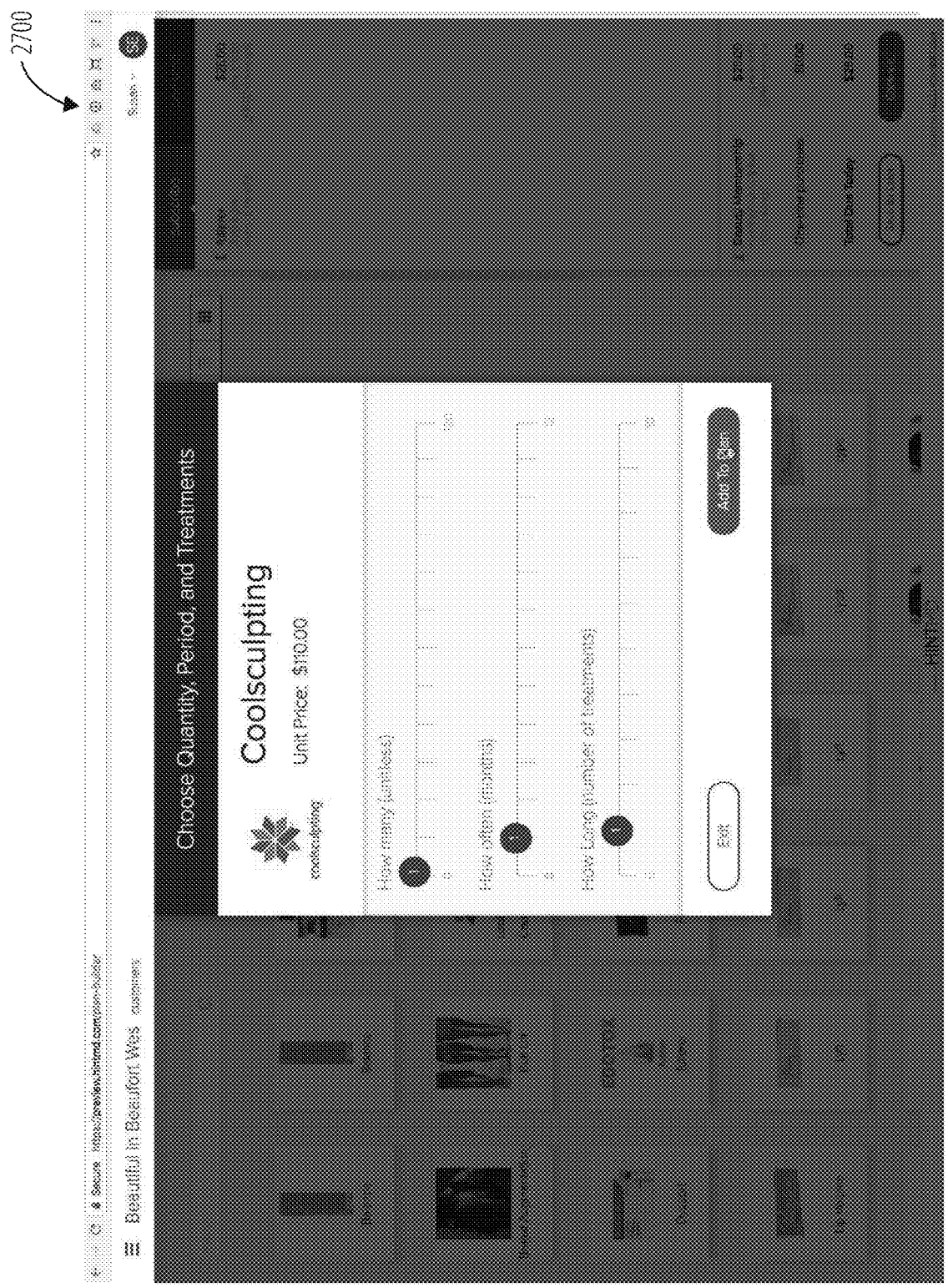
FIG. 27 illustrates a user interface in accordance with one embodiment.

The slider sub-interface 2402 described with reference to FIG. 24 (as well as those illustrated and described with reference to FIG. 26 and FIG. 27) present a user interface that uses sliders to specify input values for subscription variables. In one embodiment, this allows a user (e.g., an expert or a customer) to avoid using the keyboard on touchscreen devices. However, in a further embodiment, for personal computer users who have a keyboard, the slider sub-interface provides fast text entry which is seamlessly integrated into the user interface.

The slider sub-interface 2402 also calculates and displays a monthly (or other periodic) cost dynamically as the respective sliders are manipulated. This function further increases the efficiency of the input and lets the user (e.g., the beauty expert or physician) and customer (e.g., patient) quickly adjust the sliders interactively to arrive at the desired cost.

This tool also allows for a volume discount model, so prices are adjusted accordingly without further interaction from the user. The base price for an offering (e.g., a service or product) is set in an offering table (see FIG. 8). Any number of markup tiers then describe a percentage markup or markdown for a given volume of product. For example:

Offering→Base $100 per unit
Markup_tier[0]→at 10 units, discount 5%
Markup_tier[1]→At 20 units, discount 10%
So 25 units→25×100-10%=$2250

Figure 25:
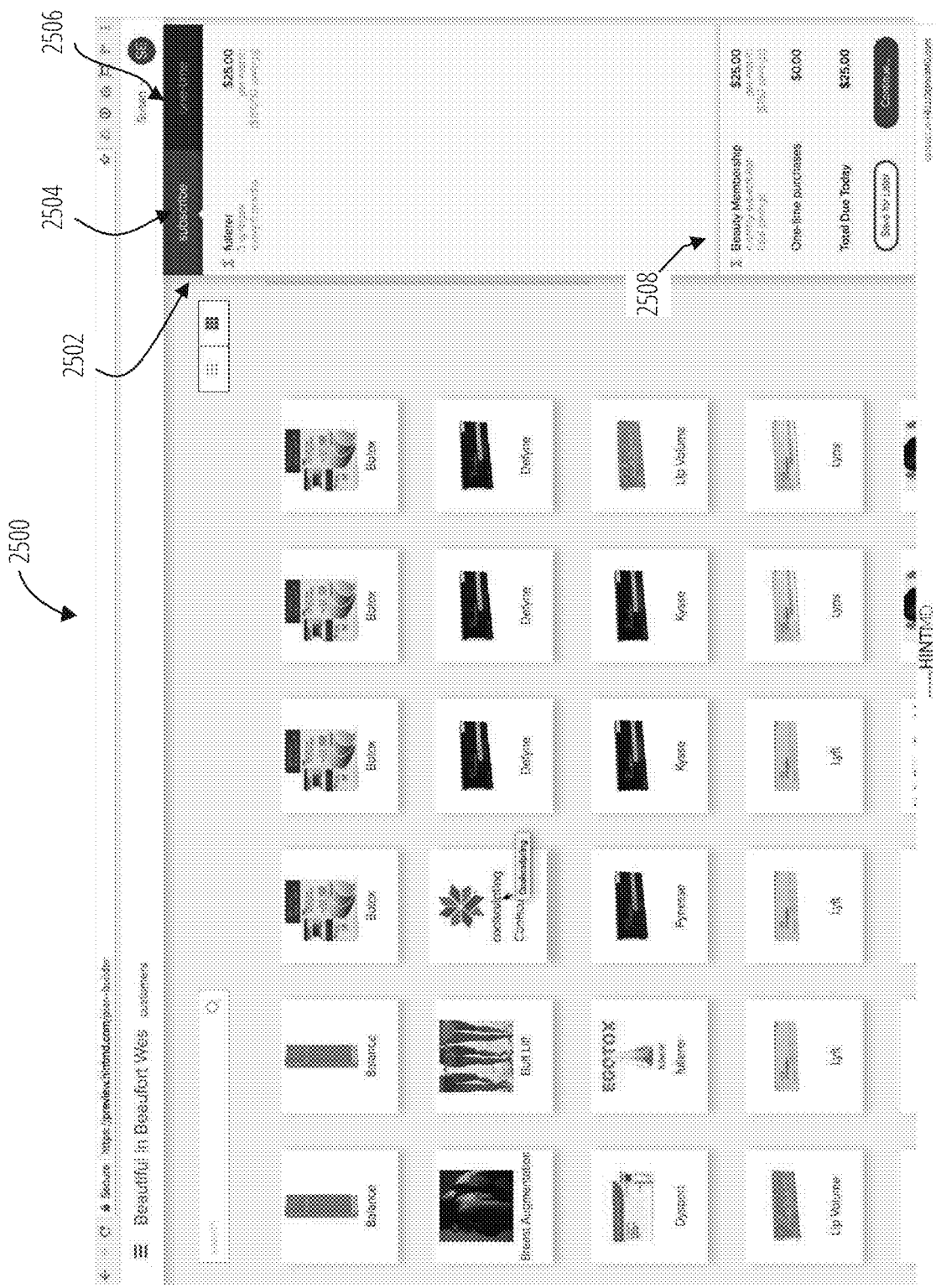
FIG. 25 illustrates a user interface in accordance with one embodiment.

In the illustrated example of FIG. 25, the FULLERER product is added to a cart sub-interface 2502 of the interface on the right. Because of the relevant product is identified as a subscription-option product, a subscribe tab 2504 of a toggle element at the top of the cart sub-interface 2502 is flagged or highlighted to reflect that the product is payable by way of a subscription. Specifically, the subscribe tab 2504 indicates that the relevant product is available for a subscription of $25 per month part of a "beauty membership" monthly subscription. On the other hand, should the relevant product have been identified within the master catalog as a one-time purchase only option product, a one-time tab 2506 of the toggle element would not have been highlighted or activated within the ca subsection of the interface.

It will further be noted that the cart sub-interface 2502 includes all details regarding the subscription to the relevant product—e.g., three syringes, delivered every six months, and a subscription cost of $25 per month, with a $150 saving.

A lower part 2508 of the cart sub-interface 2502 provides a summary of offerings within the cart and shows a combined a subscription total of $25 a month, and a combined one-time purchase total of zero dollars, with a total payment due today in order to activate the subscription.

In the illustrated example of FIG. 25, the user may then also select a COOLSCULPTING product from the offering matrix to add to the "cart" or subscription bundle, in the same manner as described above. Specifically, the user selects the relevant product from the matrix activates the sub-interface associated with the COOLSCULPTING product. As shown in FIG. 26, the selection sub-interface 2602 presents three attribute sliders, namely a quantity attribute slider, a recurrence period attribute slider, and a duration attribute slider. By selecting a value of 1 for each of these attributes, the user can specify that this is a one-time purchase of the COOLSCULPTING product (see FIG. 27). User selection of the "add to plan" button then results in the COOLSCULPTING product being added to the cart (e.g., displayed within the cart sub-interface of the interface) (see FIG. 28).

As shown in FIG. 28, it will be noted that there is no "hourglass" indicator displayed next to the data for the COOLSCULPTING product in the cart sub-interface of the interface, thus indicating that this product is not part of the recurring membership (or subscription). Rather, the COOLSCULPTING product is a one-time purchase of $100, as reflected in the summary section of the cart sub-interface. The FULLERER product is however identified by an hourglass indicator 2802 as a subscription offering.

Referring to FIG. 29, should the user wish to pay for both the products in the "cart" as a one-time purchase, a user may select the one-time payment tab 2902 within the toggle element at the top of the cart sub-interface. This toggle element then causes the hourglass indicator adjacent the FULLERER product to disappear, and the summary section is also modified to show a total for the one-time purchases of $410.

In this way, a user (e.g., an expert) can conveniently present both the subscription option by selecting the subscription tab of the toggle element and the one-time payment option by selecting the one-time payment tab of the toggle element. Each of these tabs causes the presentation of the payment information to be updated and displayed in accordance with the selected payment option. A user (e.g., an expert) can thus conveniently communicate payment options to a customer (e.g., at a checkout) without having to perform any modification to the content of the cart.

Figure 30:
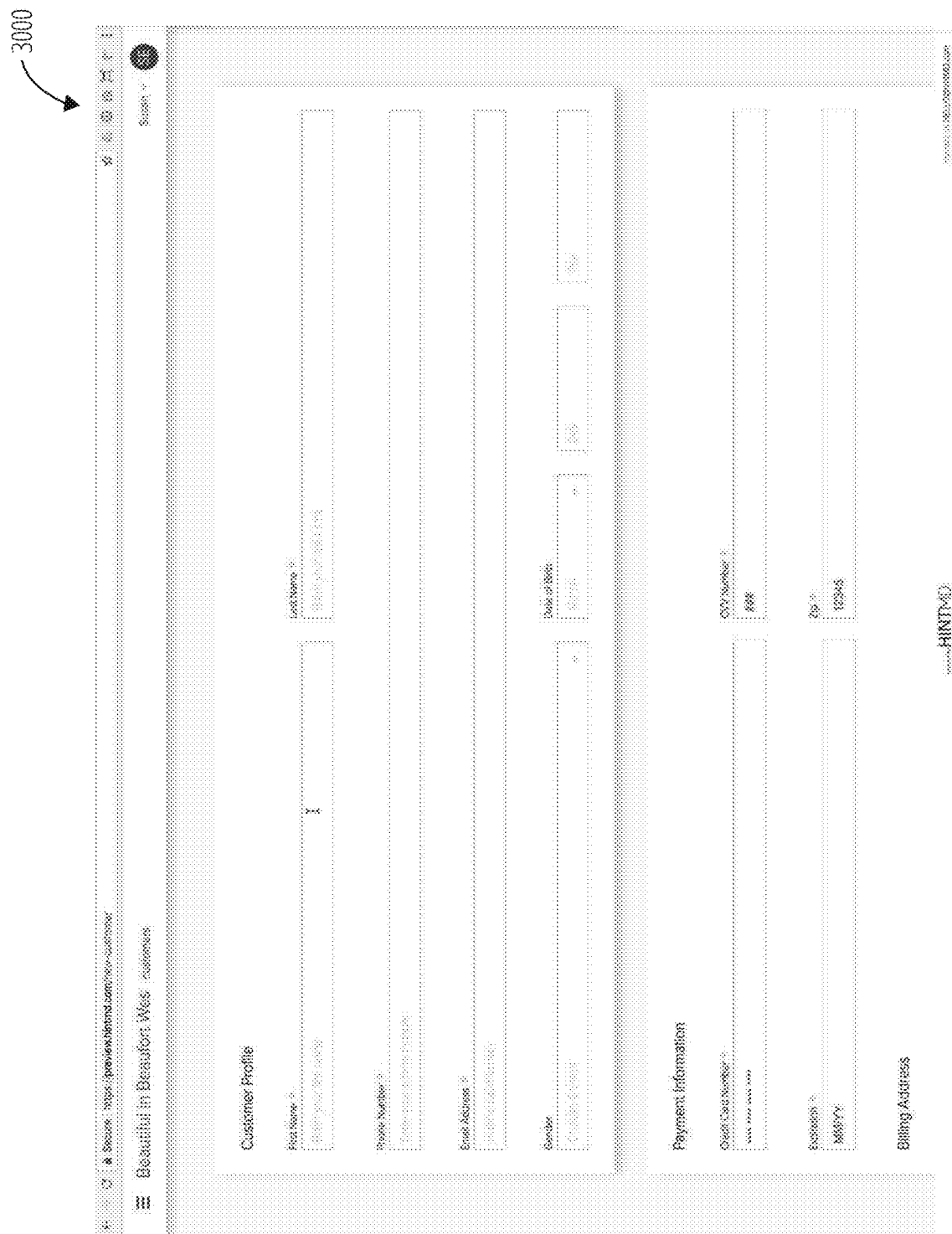
FIG. 30 illustrates a user interface in accordance with one embodiment.
Figure 31:
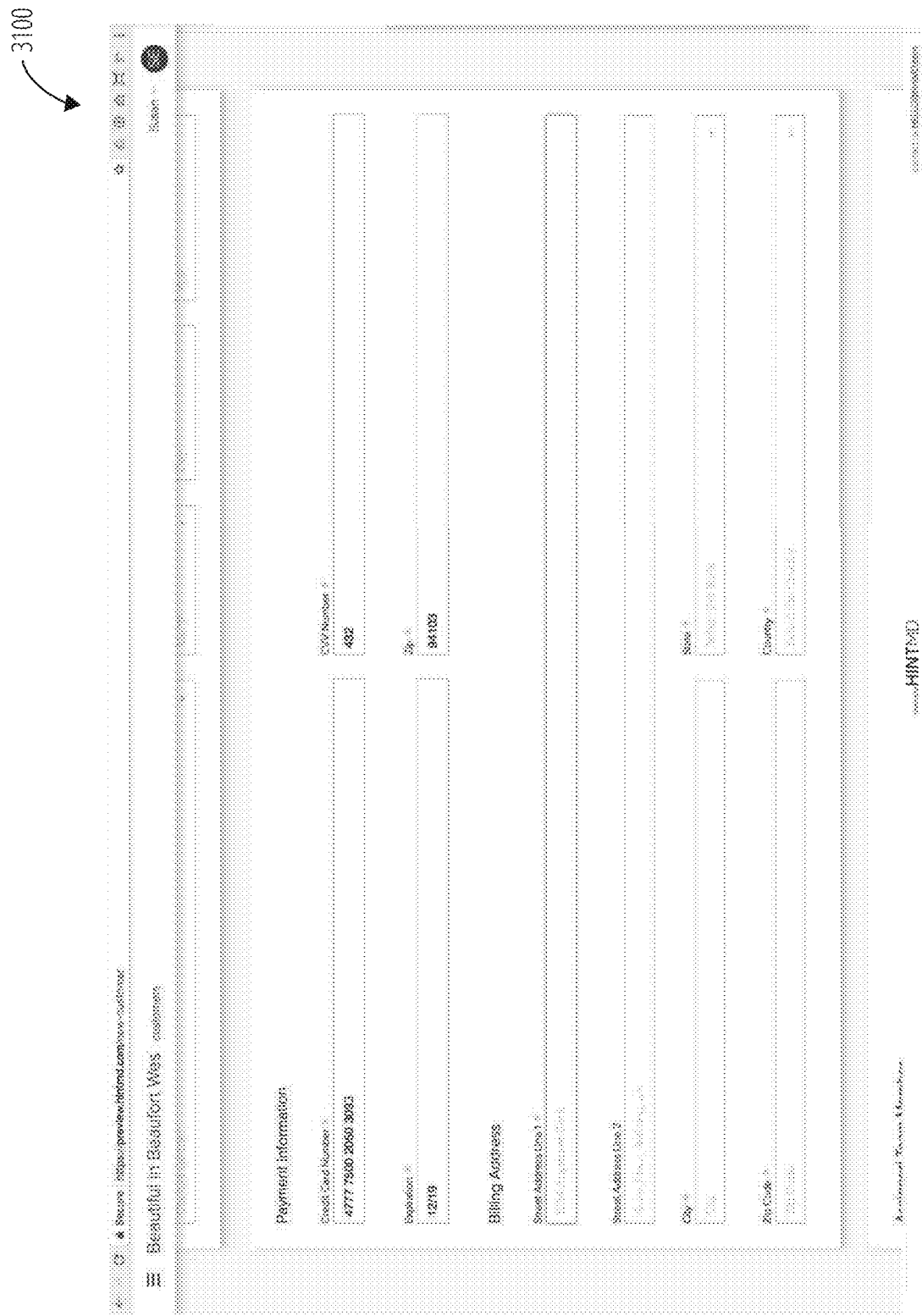
FIG. 31 illustrates a user interface in accordance with one embodiment.
Figure 32:
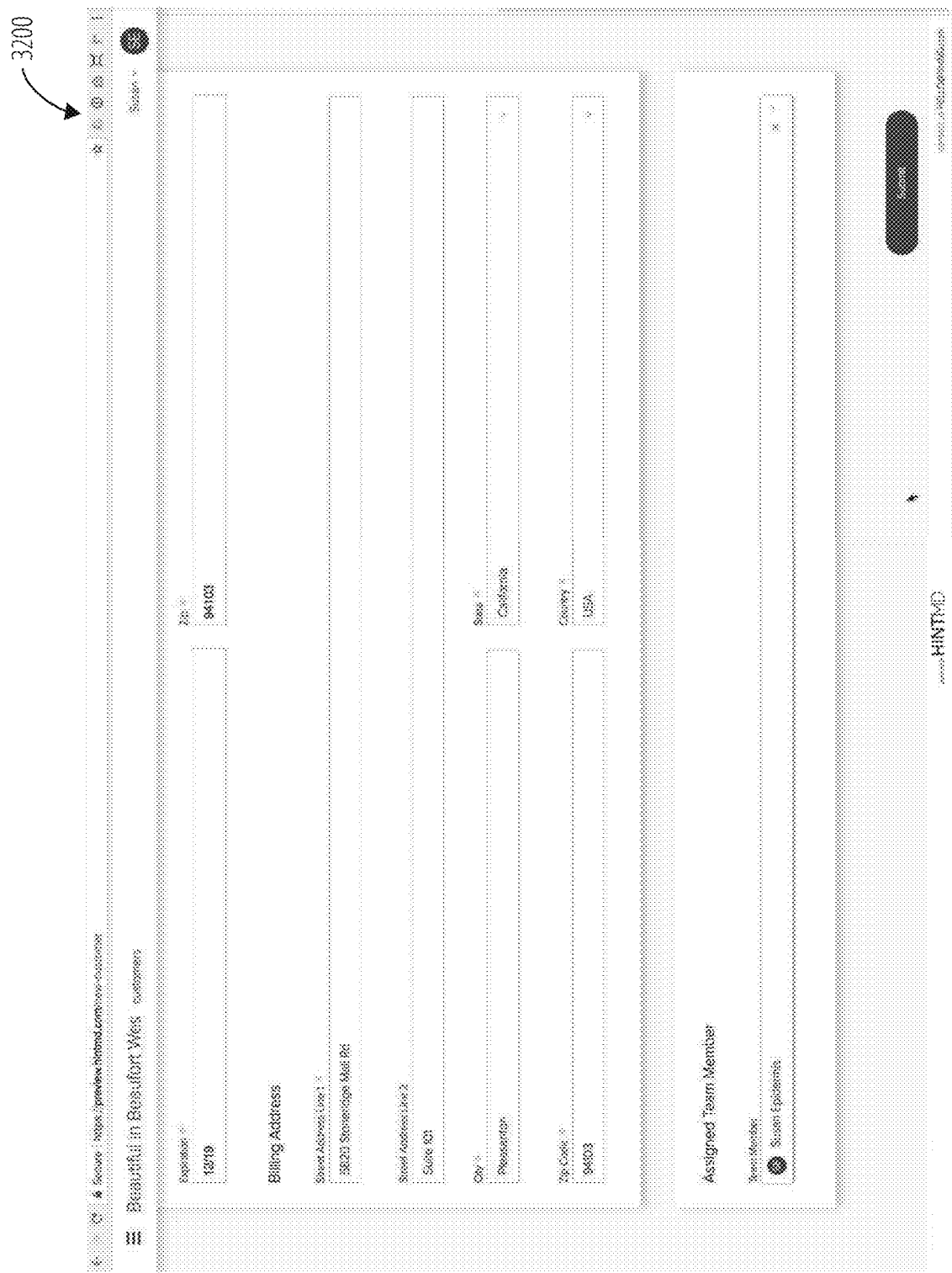
FIG. 32 illustrates a user interface in accordance with one embodiment.

Referring to FIG. 29, if the customer wishes to proceed with the subscription option, a "continue" button on the cart sub-interface is selected, which then invokes a customer sign-up flow and the presentational of corresponding interfaces. As shown in FIG. 30-FIG. 32, the customer sign-up interface includes a customer profile section, a payment information section, and an assigned team member section. The "assigned team member", in one embodiment, may be the expert that has been responsible for signing up the customer, and the subscription engine 128 may allocate appropriate credit to the relevant expert for performing the customer sign-up.

Figure 33:
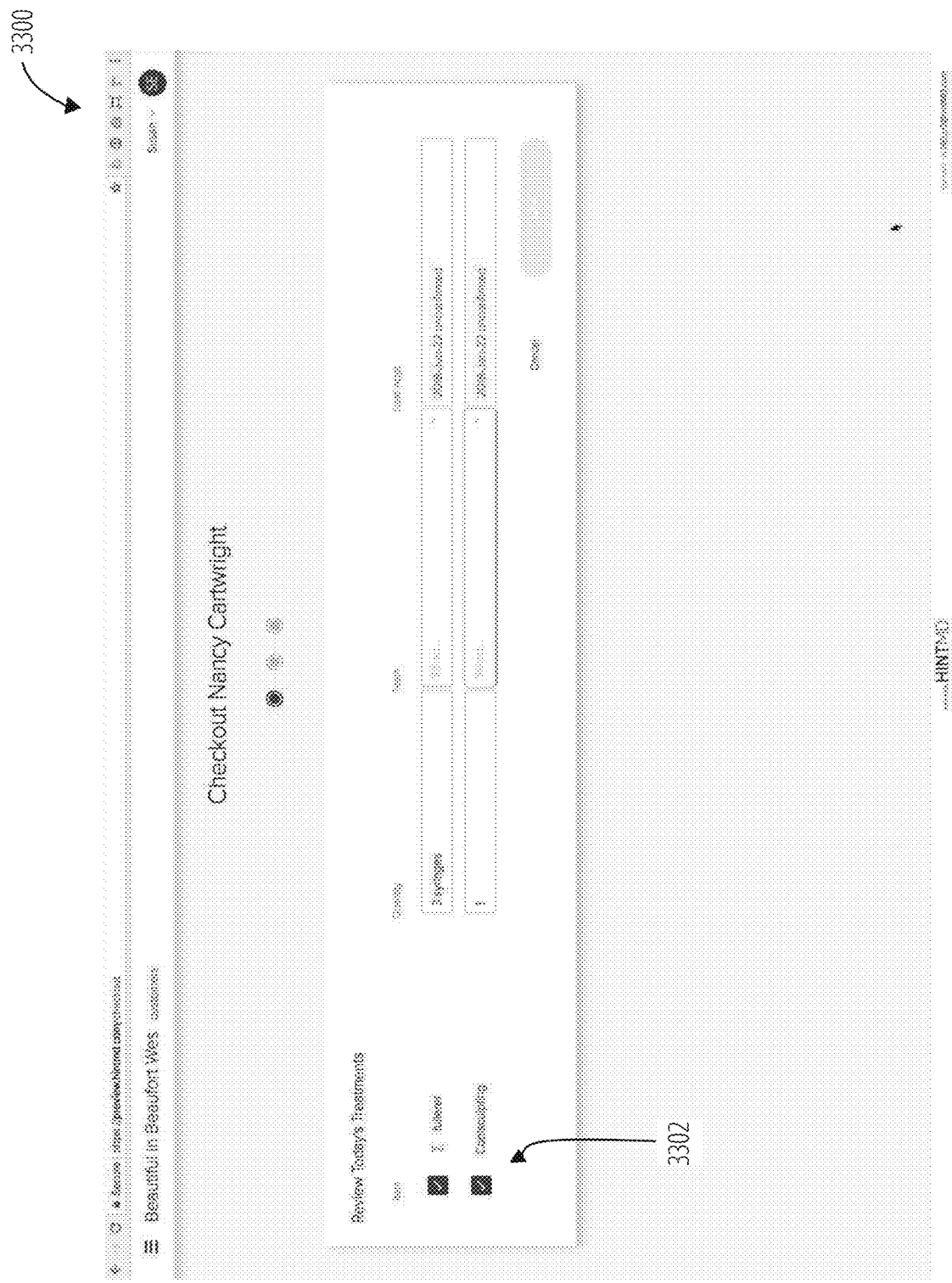
FIG. 33 illustrates a user interface in accordance with one embodiment.
Figure 34:
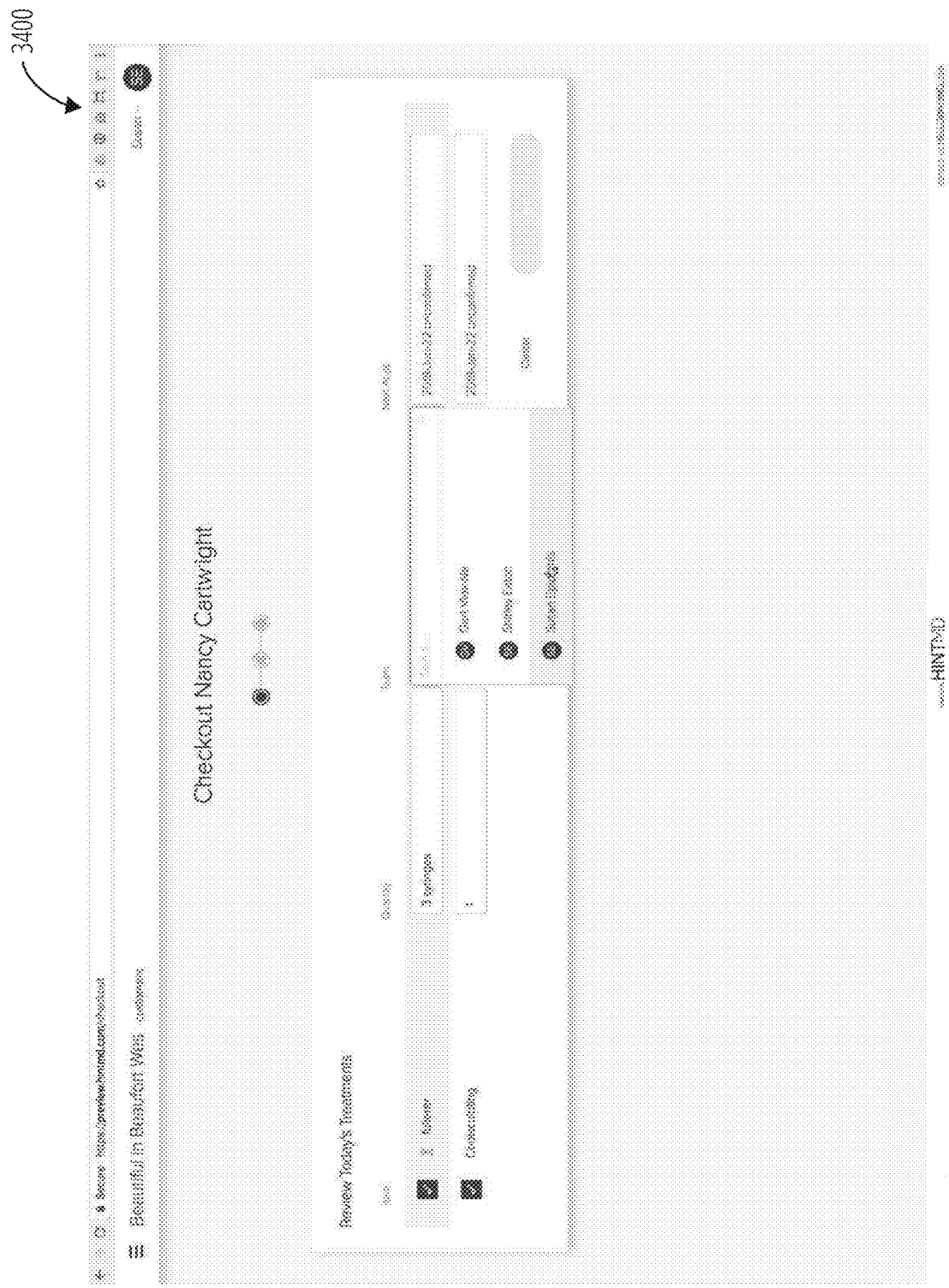
FIG. 34 illustrates a user interface in accordance with one embodiment.
Figure 35:
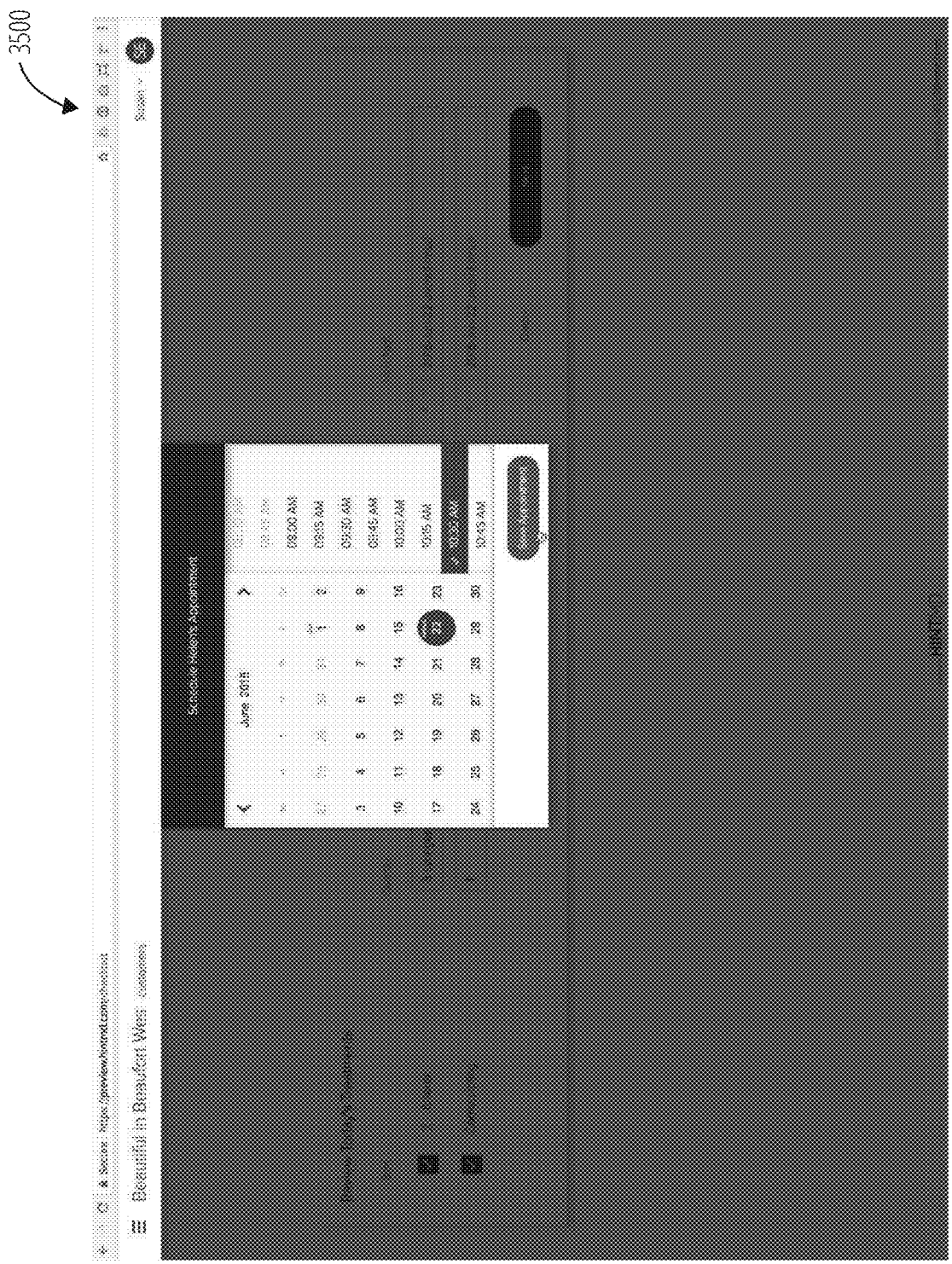
FIG. 35 illustrates a user interface in accordance with one embodiment.
Figure 36:
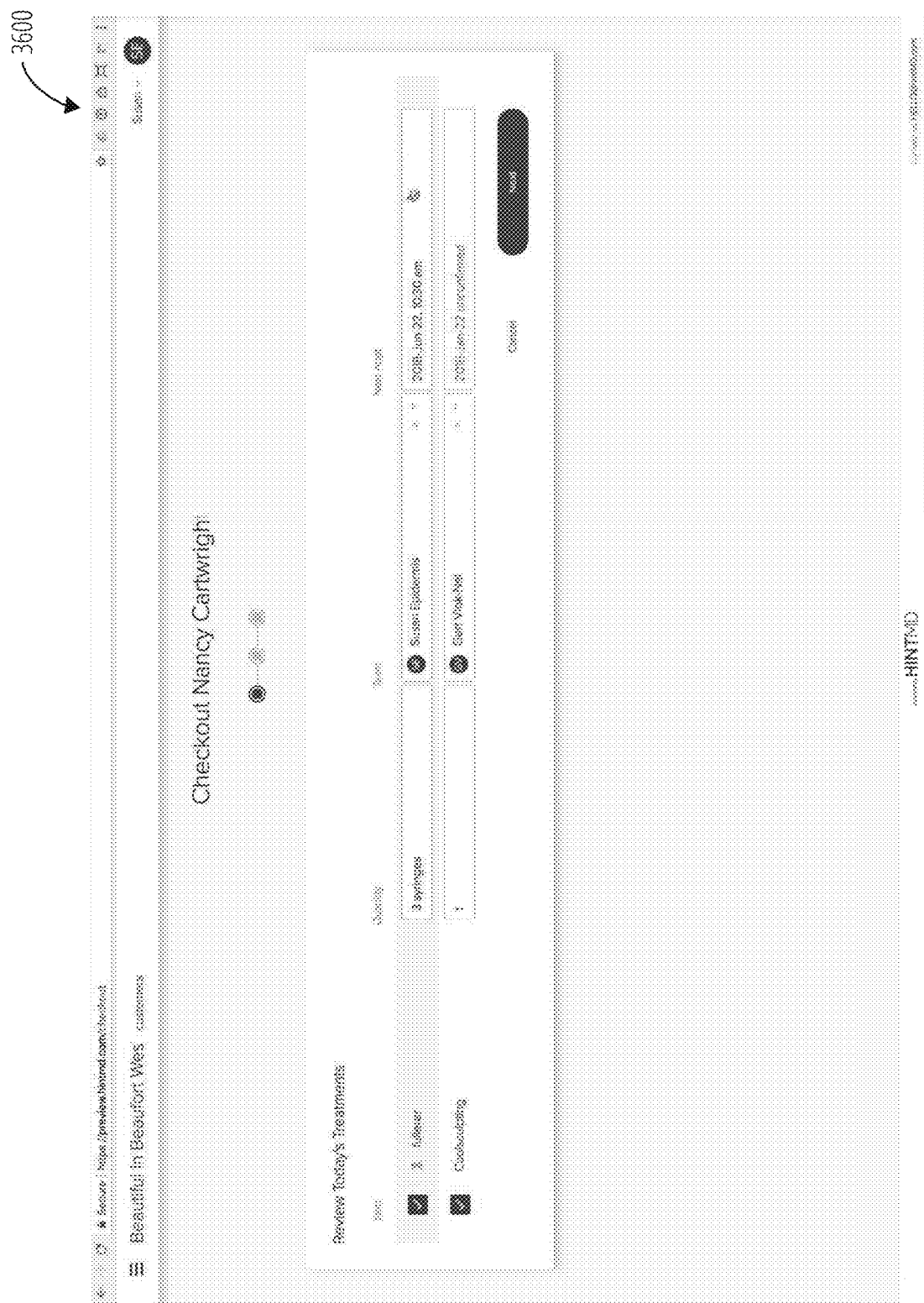
FIG. 36 illustrates a user interface in accordance with one embodiment.

Once the user is satisfied with the customer information, a "submit" button is selected, which then invokes a "review today's treatments" interface (FIG. 33). In the illustrated example, the customer, Nancy Cartwright, has elected to a first treatment on the day of the sign-up. Checkboxes 3302 on the left of the review section are user selectable to indicate and record delivery are the relevant treatments (both products and services) to the customer on the current date. In addition, the quantities of the delivery are recorded within this interface. While the default values are typically pre-populated into the quantity fields of the centers, these values are modifiable in case a deviation from the default quantities occurred. In addition, drop-down menus (see FIG. 34) are provided to enable input all the names of the team members that deliver the product and/or provided the services (again so that these team members may be appropriately compensated or that their performance may be evaluated).

Further, "next appointment" fields for each offering may be populated to include a date for the next appointment (or delivery are an appropriate product and/or service). To this end, a convenient calendar drop-down (see FIG. 35-FIG. 36) may be presented using which of the user can select a date and time for the next appointment for each offering.

From the offering review interface, the sequence moves on to the payment information interface 3700 (FIG. 37) which is automatically pre-populated with the customer's credit card information is extracted from their user profile. Further, the "amount" field is automatically populated with an amount that is due at checkout on a relevant day.

The payment information interface 3700 conveniently also allows a user to split the payment over multiple payment types, and accordingly input that only a portion of the payment total that is to be applied to a credit card, with the rest of the payment being paid in cash (or by check or other credit instruments). Once the payment information has been collected, the user selection of "next" button invokes the "payment received" interface 3800 (see FIG. 38). A "print for signature" button is user selectable to generate a printable version of a receipt (see FIG. 39), which again includes details on the plan, the payment made on the day, and how it was paid (i.e., which instruments were used to make the payments). The printable receipt also indicates a "next billing date" on which of the next subscription payment will become payable. A signature line is also included.

Figure 41:
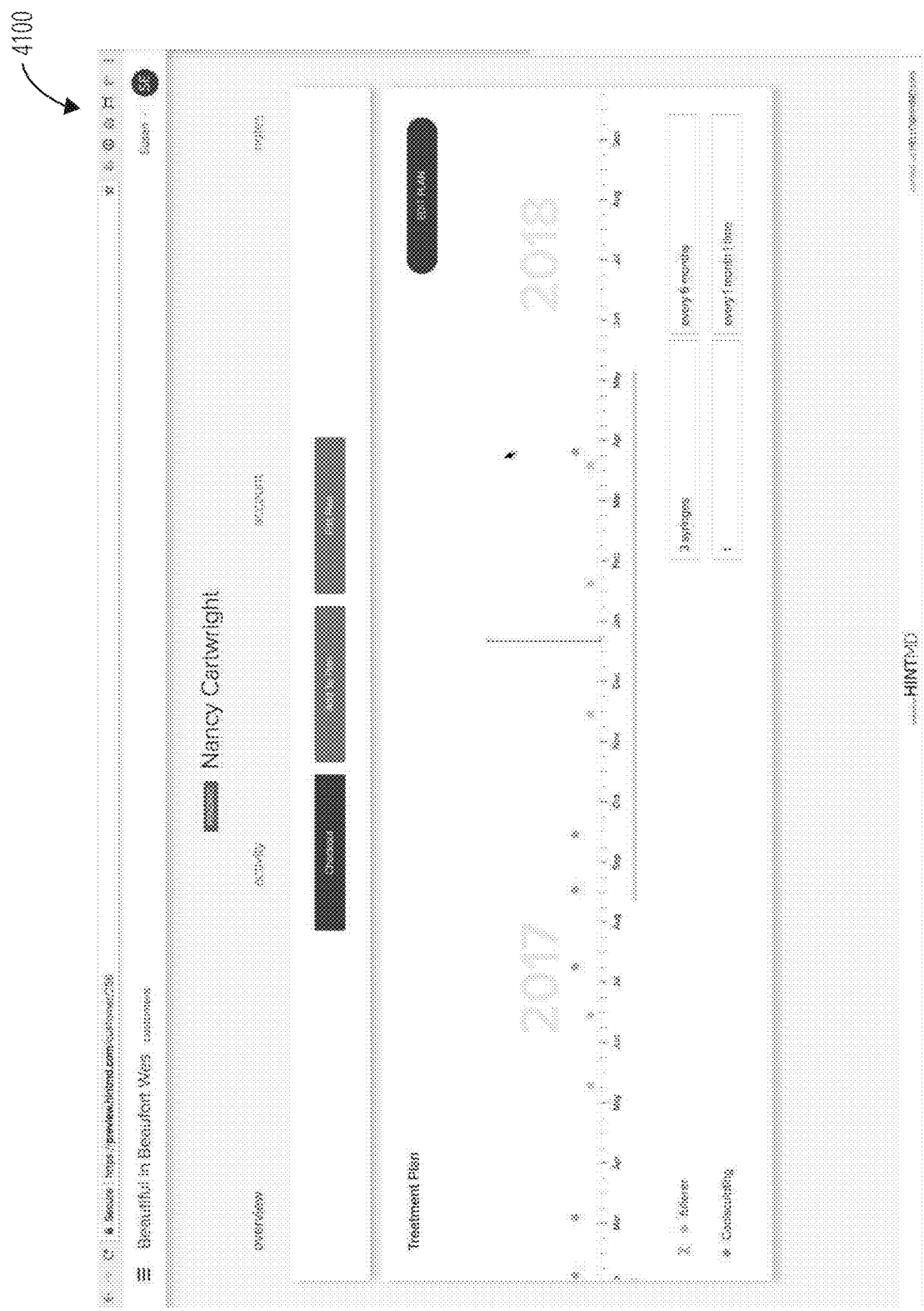
FIG. 41 illustrates a user interface in accordance with one embodiment.

A user has the option of going back to the client list interface (see FIG. 40) and searching for the relevant customer to invoke a customer account overview interface 4100 (see FIG. 41). The customer account overview interface 4100 presents a timeline on which are indicated graphical representations of specific offering delivery events according to the plan. Offering-specific icons are displayed on a timeline adjacent or proximate dates on which the offerings are scheduled to be delivered, in accordance with the plan. The customer account overview interface 4100 thus provides a convenient graphical representation of the customer's plan. The plan can also be edited directly from the customer account overview interface 4100 for example, any of the quantity, recurrence period or duration of a particular offering can be modified from the overview interface. The recalculation of the monthly (or periodic) payment amounts will also automatically occur and be displayed within the overview interface responsive to any modifications made to the plan.

Figure 42:
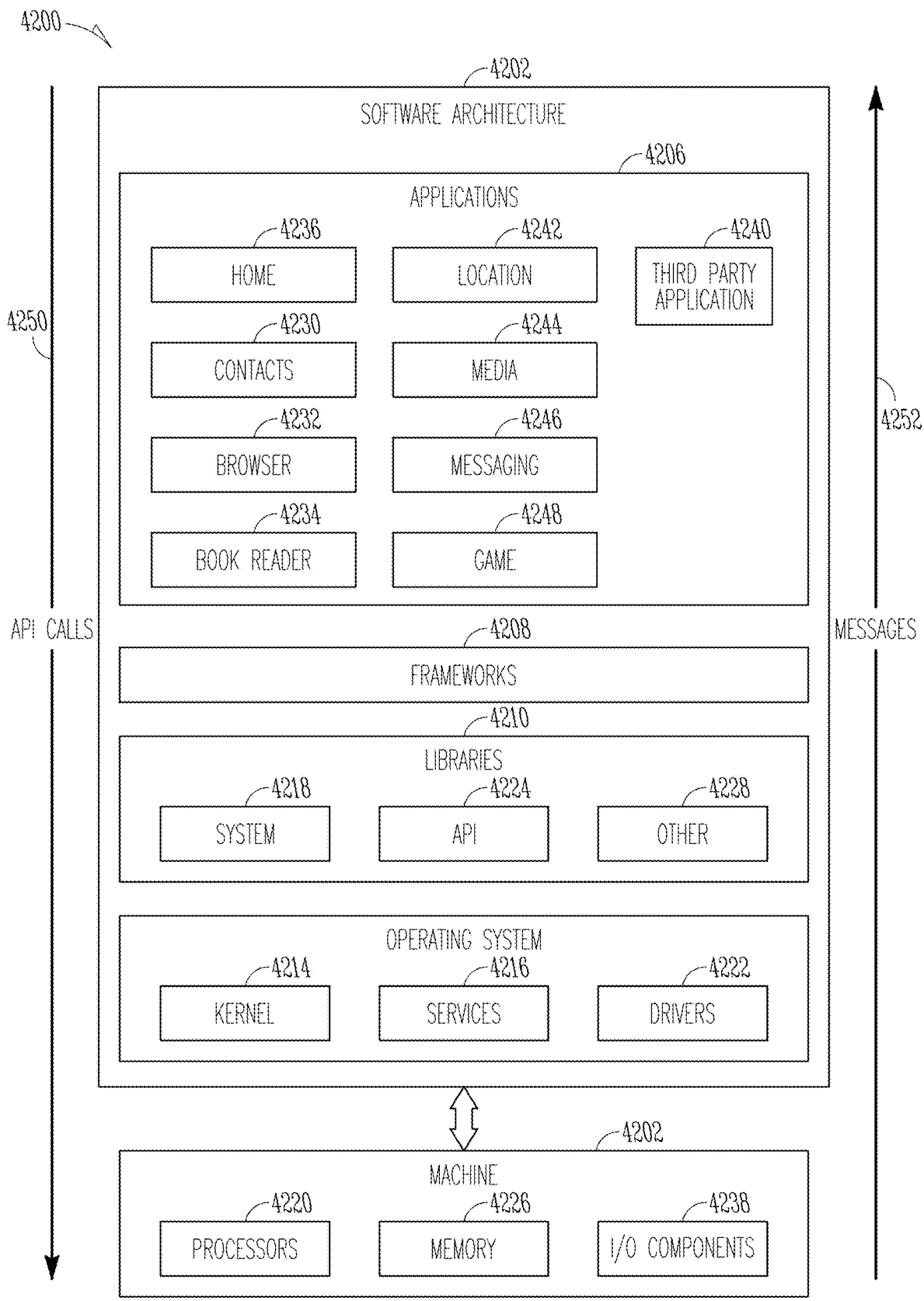
FIG. 42 illustrates a block diagram of a software architecture, according to some example embodiments.

FIG. 42 is a block diagram 4200 illustrating a software architecture 4204, which can be installed on any one or more of the devices herein. FIG. 42 is merely a non-limiting example of a software architecture, and it will be appreciated that many other architectures can be implemented to facilitate the functionality described herein. In various embodiments, the software architecture 4204 is implemented by hardware such as a machine 4202 of FIG. 2 that includes processors 4220, memory 4226, and I/O components 4238. In this example architecture, the software can be conceptualized as a stack of layers where each layer may provide particular functionality. For example, the software includes layers such as an operating system 4212, libraries 4210, frameworks 4208, and applications 4206. Operationally, the applications 4206 invoke application programming interface (API) calls 4250 through the software stack and receive messages 4252 in response to the API calls 4250, consistent with some embodiments.

In various implementations, the operating system 4212 manages hardware resources and provides common services. The operating system 4212 includes, for example, a kernel 4214, services 4216, and drivers 4222. The kernel 4214 acts as an abstraction layer between the hardware and the other software layers, consistent with some embodiments. For example, the kernel 4214 provides memory management, processor management (e.g., scheduling), component management, networking, and security settings, among other functionality. The services 4216 can provide other common services for the other software layers. The drivers 4222 are responsible for controlling or interfacing with the underlying hardware, according to some embodiments. For instance, the drivers 4222 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 4210 provide a common low-level infrastructure utilized by the applications 4206. The libraries 4210 can include system libraries 4218 (e.g., C standard library) that can provide functions such as memory allocation functions, string manipulation functions, mathematic functions, and the like. In addition, the libraries 4210 can include API libraries 4224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 4210 can also include a wide variety of other libraries 4228 to provide many other APIs to the applications 4206.

The frameworks 4208 provide a common high-level infrastructure that can be utilized by the applications 4206, according to some embodiments. For example, the frameworks 4208 provide various graphical user interface (GUI) functions, high-level resource management, high-level location services, and so forth. The frameworks 4208 can provide a broad spectrum of other APIs that can be utilized by the applications 4206, some of which may be specific to a particular operating system or platform.

In an example embodiment, the applications 4206 include a home application 4236, a contacts application 4230, a browser application 4232, a book reader application 4234, a location application 4242, a media application 4244, a messaging application 4246, a game application 4248, and a broad assortment of other applications such as a third-party application 4240. According to some embodiments, the applications 4206 are programs that execute functions defined in the programs. Various programming languages can be employed to create one or more of the applications 4206, structured in a variety of manners, such as object-oriented programming languages (e.g., Objective-C, Java, or C++) or procedural programming languages (e.g., C or assembly language). In a specific example, the third-party application 4240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 4240 can invoke the API calls 4250 provided by the operating system 4212 to facilitate functionality described herein.

FIG. 43 illustrates a diagrammatic representation of a machine 4300 in the form of a computer system within which a set of instructions may be executed for causing the machine to perform any one or more of the methodologies discussed herein, according to example embodiments. Specifically, FIG. 43 shows a diagrammatic representation of the machine 4300 in the example form of a computer system, within which instructions 4308 (e.g., software, a program, an application, an applet, an app, or other executable code) for causing the machine 4300 to perform any one or more of the methodologies discussed herein may be executed. The instructions 4308 transform the general, non-programmed machine 4300 into a particular machine 4300 programmed to carry out the described and illustrated functions in the manner described. In alternative embodiments, the machine 4300 operates as a standalone device or may be coupled (e.g., networked) to other machines. In a networked deployment, the machine 4300 may operate in the capacity of a server machine or a client machine in a server-client network environment, or as a peer machine in a peer-to-peer (or distributed) network environment. The machine 4300 may comprise, but not be limited to, a server computer, a client computer, a personal computer (PC), a tablet computer, a laptop computer, a netbook, a set-top box (STB), a PDA, an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 4308, sequentially or otherwise, that specify actions to be taken by the machine 4300. Further, while only a single machine 4300 is illustrated, the term "machine" shall also be taken to include a collection of machine 4300 that individually or jointly execute the instructions 4308 to perform any one or more of the methodologies discussed herein.

The machine 4300 may include processors 4302, memory 4304, and I/O components 4342, which may be configured to communicate with each other such as via a bus 4344. In an example embodiment, the processors 4302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 4306 and a processor 4310 that may execute the instructions 4308. The term "processor" is intended to include multi-core processors that may comprise two or more independent processors (sometimes referred to as "cores") that may execute instructions contemporaneously. Although FIG. 43 shows multiple processors 4302, the machine 4300 may include a single processor with a single core, a single processor with multiple cores (e.g., a multi-core processor), multiple processors with a single core, multiple processors with multiples cores, or any combination thereof.

The memory 4304 may include a main memory 4312, a static memory 4314, and a storage unit 4316, both accessible to the processors 4302 such as via the bus 4344. The main memory 4304, the static memory 4314, and storage unit 4316 store the instructions 4308 embodying any one or more of the methodologies or functions described herein. The instructions 4308 may also reside, completely or partially, within the main memory 4312, within the static memory 4314, within machine-readable medium 4318 within the storage unit 4316, within at least one of the processors 4302 (e.g., within the processor's cache memory), or any suitable combination thereof, during execution thereof by the machine 4300.

The I/O components 4342 may include a wide variety of components to receive input, provide output, produce output, transmit information, exchange information, capture measurements, and so on. The specific I/O components 4342 that are included in a particular machine will depend on the type of machine. For example, portable machines such as mobile phones will likely include a touch input device or other such input mechanisms, while a headless server machine will likely not include such a touch input device. It will be appreciated that the I/O components 4342 may include many other components that are not shown in FIG. 43. The I/O components 4342 are grouped according to functionality merely for simplifying the following discussion, and the grouping is in no way limiting. In various example embodiments, the I/O components 4342 may include output components 4328 and input components 4330. The output components 4328 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 4330 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 4342 may include biometric components 4332, motion components 4334, environmental components 4336, or position components 4338, among a wide array of other components. For example, the biometric components 4332 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 4334 may include acceleration sensor components (e.g., accelerometer), gravitation sensor components, rotation sensor components (e.g., gyroscope), and so forth. The environmental components 4336 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 4338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 4342 may include communication components 4340 operable to couple the machine 4300 to a network 4320 or devices 4322 via a coupling 4324 and a coupling 4326, respectively. For example, the communication components 4340 may include a network interface component or another suitable device to interface with the network 4320. In further examples, the communication components 4340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 4322 may be another machine or any of a wide variety of peripheral devices (e.g., a peripheral device coupled via a USB).

Moreover, the communication components 4340 may detect identifiers or include components operable to detect identifiers. For example, the communication components 4340 may include Radio Frequency Identification (RFID) tag reader components, NFC smart tag detection components, optical reader components (e.g., an optical sensor to detect one-dimensional barcodes such as Universal Product Code (UPC) barcode, multi-dimensional bar codes such as Quick Response (QR) code, Aztec code, Data Matrix, Dataglyph, MaxiCode, PDF417, Ultra Code, UCC RSS-2D barcode, and other optical codes), or acoustic detection components (e.g., microphones to identify tagged audio signals). In addition, a variety of information may be derived via the communication components 4340, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., memory 4304, main memory 4312, static memory 4314, and/or memory of the processors 4302) and/or storage unit 4316 may store one or more sets of instructions and data structures (e.g., software) embodying or utilized by any one or more of the methodologies or functions described herein. These instructions (e.g., the instructions 4308), when executed by processors 4302, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 4320 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 4320 or a portion of the network 4320 may include a wireless or cellular network, and the coupling 4324 may be a Code Division Multiple Access (CDMA) connection, a Global System for Mobile communications (GSM) connection, or another type of cellular or wireless coupling. In this example, the coupling 4324 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 4308 may be transmitted or received over the network 4320 using a transmission medium via a network interface device (e.g., a network interface component included in the communication components 4340) and utilizing any one of a number of well-known transfer protocols (e.g., hypertext transfer protocol (HTTP)). Similarly, the instructions 4308 may be transmitted or received using a transmission medium via the coupling 4326 (e.g., a peer-to-peer coupling) to the devices 4322. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 4308 for execution by the machine 4300, and includes digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A method comprising:

performing operations to implement a user interface for managing a bundle of offerings in at least near real time, the operations including:

receiving, via the user interface, first order data, the first order data relating to a first offering of the bundle of offerings, the first order data including a first set of attributes, the user interface presenting the bundle of offerings in a matrix, the user interface presenting a first slider sub-interface in an overlaid manner over the matrix for receiving input data for the first set of attributes;

receiving, via the user interface, second order data, the second order data relating to a second offering of the bundle of offerings, the second order data including a second set of attributes, the user interface presenting a second slider sub-interface in an overlaid manner over the matrix for receiving input data for the second set of attributes;

using at least one processor, generating a subscription data structure based on the first and second order data, the subscription data structure including quantity data and period data for each of the first offering and the second offering;

using the at least one processor, calculating a combined periodic subscription payment amount for the first offering and the second offering based on the quantity data and the period data;

using the at least one processor, calculating a combined one-time payment amount for the first offering and the second offering based on the quantity data;

including a toggle feature in the user interface, the toggle feature allowing toggling between presentations of the combined one-time payment amount in a first user interface element of the user interface and the combined monthly subscription payment amount in a second user interface element of the user interface;

based on a selection of the combined one-time payment amount or the combined monthly subscription payment amount via the toggle feature, dynamically creating a financial data structure related to the bundle of offerings and using the financial data structure to request one or more financing offers for the bundle of offerings from one or more financial exchanges; and in response to receiving the one or more financing offers, facilitating a financial checkout process for the bundle of the offerings in the user interface in at least near real time, the facilitating of the financial checkout process including applying a rule to pick a financing offer from the one or more financing offers for accepting or rejecting via the user interface.

2. The method of claim 1, the operations further comprising:
  receiving, via the user interface, third order data, the third order data relating to a third offering, the third offering having a one-time payment option only; and
  causing presentation of a one-time payment amount related to the third offering in conjunction with the presentations of the combined one-time payment amount in the first user interface element and the combined periodic subscription payment amount in the second user interface element.

3. The method of claim 1, wherein each of the first and second set of attributes comprises a recurring attribute identifying the respective offering as being a recurring offering, and wherein the calculating of the combined periodic subscription payment amount is performed based on each of the first and second subscription offerings being identified, using the at least at least one processor, as recurring offerings.

4. The method of claim 1, wherein the initiating of the checkout process includes communication of the combined periodic subscription payment amount to a financial exchange system and further information pertaining to each of the first and second subscription offerings, the further information including identification information for a provider of the relevant subscription offering and identification information for a consumer of the relevant subscription offering.

5. The method of claim 1, the operations further comprising: presenting, in the user interface, a financing offer received from a financial exchange system, wherein the financing offer includes a first financing offer pertaining to the first subscription offering and a second financing offer pertaining to the second subscription offering.

6. The method of claim 1, operations further comprising:
  communicating the combined periodic subscription payment amount to a financial exchange system;
  receiving a financing offer related to the combined periodic subscription payment amount from the financial exchange system;
  causing presentation of the combined periodic subscription payment amount in the user interface; and
  causing presentation of the financing offer in the user interface.

7. The method of claim 1, wherein:
  the first order data is associated with a first expert system of a collective of expert systems, the first expert system providing a guided process for creation of the first set of attributes, the first expert system associated with a first vertical; and
  the second order data is associated with a second expert system of the collective of expert systems, the second expert system providing a guided process for creation of the second set of attributes, the second expert system associated with a second vertical.

8. The method of claim 1, wherein the selection is performed without navigating away from the user interface.

9. A system comprising:
  one or more processors;
  one or more memories;
  a set of instructions stored in the one or more memories, the set of instructions configuring the one or more processors to perform operations to implement a user interface for managing a bundle of offerings in at least near real time, the operations including:
  receiving, via the user interface, first order data, the first order data relating to a first offering of the bundle of offerings, the first order data including a first set of attributes, the user interface presenting the bundle of offerings in a matrix, the user interface presenting a first slider sub-interface in an overlaid manner over the matrix for receiving input data for the first set of attributes;
  receiving, via the user interface, the second order data relating to a second offering of the bundle of offerings, the second order data including a second set of attributes, the user interface presenting a second slider sub-interface in an overlaid manner over the matrix for receiving input data for the second set of attributes;
  generating a subscription data structure based on the first and second order data, the subscription data structure including quantity data and period data for each of the first offering and the second offering;
  calculating a combined periodic subscription payment amount for the first offering and the second offering based on the quantity data and the period data;
  calculating a combined one-time payment amount for the first offering and the second offering based on the quantity data;
  including a toggle feature in the user interface, the toggle feature allowing toggling between presentations of the combined one-time payment amount in a first user interface element of the user interface and the combined monthly subscription payment amount in a second user interface element of the user interface;
  based on a selection of the combined one-time payment amount or the combined monthly subscription payment amount via the toggle feature, dynamically creating a financial data structure related to the bundle of offerings and using the financial data structure to request one or more financing offers for the bundle of offerings from one or more financial exchanges; and
  in response to receiving the one or more financing offers, facilitating a financial checkout process for the bundle of the offerings in the user interface in at least near real time, the facilitating of the financial checkout process including applying a rule to pick a financing offer from the one or more financing offers for accepting or rejecting via the user interface.

10. The system of claim 9,
  receiving, via the user interface, third order data, the third order data relating to a third offering, the third offering having a one-time payment option only; and
  causing presentation of a one-time payment amount related to the third offering in conjunction with the presentations of the combined one-time payment amount in the first user interface element and the combined periodic subscription payment amount in the second user interface element.

11. The system of claim 9, wherein each of the first and second set of attributes comprises a recurring attribute identifying the respective offer as being a recurring offering, and wherein the calculating of the combined periodic subscription payment amount is performed based on each of the first and second subscription offerings being identified, using the at least at least one processor, as recurring offerings.

12. The system of claim 9, wherein initiating of the checkout process includes communication of the combined periodic subscription payment amount to a financial exchange system and further information pertaining to each of the first and second subscription offerings, the further information including identification information for a provider of the relevant subscription offering and identification information for a consumer of the relevant subscription offering.

13. The system of claim 9, the operations further comprising:
presenting, in the user interface, a financing offer received from a financial exchange system, wherein the financing offer includes a first financing offer pertaining to the first subscription offering and a second financing offer pertaining to the second subscription offering.

14. A non-transitory computer-readable storage medium, the computer-readable storage medium including instructions that, when executed by one or more computer processors, cause the one or more computer processors to perform operations to implement a user interface for managing a bundle of offerings in at least near real time, the operations comprising:
receiving, via the user interface, first order data, the first order data relating to a first offering of the bundle of offerings, the first order data including a first set of attributes, the user interface presenting the bundle of offerings in a matrix, the user interface presenting a first slider sub-interface in an overlaid manner over the matrix for receiving input data for the first set of attributes;
receiving, via the user interface, second order data, the second order data relating to a second offering of the bundle of offerings, the second order data including a second set of attributes, the user interface presenting a second slider sub-interface in an overlaid manner over the matrix for receiving input data for the second set of attributes;
generating a subscription data structure based on the first and second order data, the subscription data structure including quantity data and period data for each of the first offering and the second offering;
calculating a combined periodic subscription payment amount for the first offering and the second offering based on the quantity data and the period data;
calculating a combined one-time payment amount for the first offering and the second offering based on the quantity data;
including a toggle feature in the user interface, the toggle feature allowing toggling between presentations of the combined one-time payment amount in a first user interface element of the user interface and the combined monthly subscription payment amount in a second user interface element of the user interface;
based on a selection of the combined one-time payment amount or the combined monthly subscription payment amount via the toggle feature, dynamically creating a financial data structure related to the bundle of offerings and using the financial data structure to request one or more financing offers for the bundle of offerings from one or more financial exchanges; and
in response to receiving the one or more financing offers, facilitating a financial checkout process for the bundle of the offerings in the user interface in at least near real time, the facilitating of the financial checkout process including applying a rule to pick a financing offer from the one or more financing offers for accepting or rejecting via the user interface.

\* \* \* \* \*

UNITED STATES PATENT AND TRADEMARK OFFICE
CERTIFICATE OF CORRECTION

PATENT NO. : 11,587,051 B2
APPLICATION NO. : 16/434674
DATED : February 21, 2023
INVENTOR(S) : Nguyen et al.

It is certified that error appears in the above-identified patent and that said Letters Patent is hereby corrected as shown below:

In the Drawings

On sheet 1 of 43, Fig. 1, delete "10" and insert --100-- therefor

On sheet 18 of 43, Fig. 18, delete "180" and insert --1800-- therefor

Figure 37:
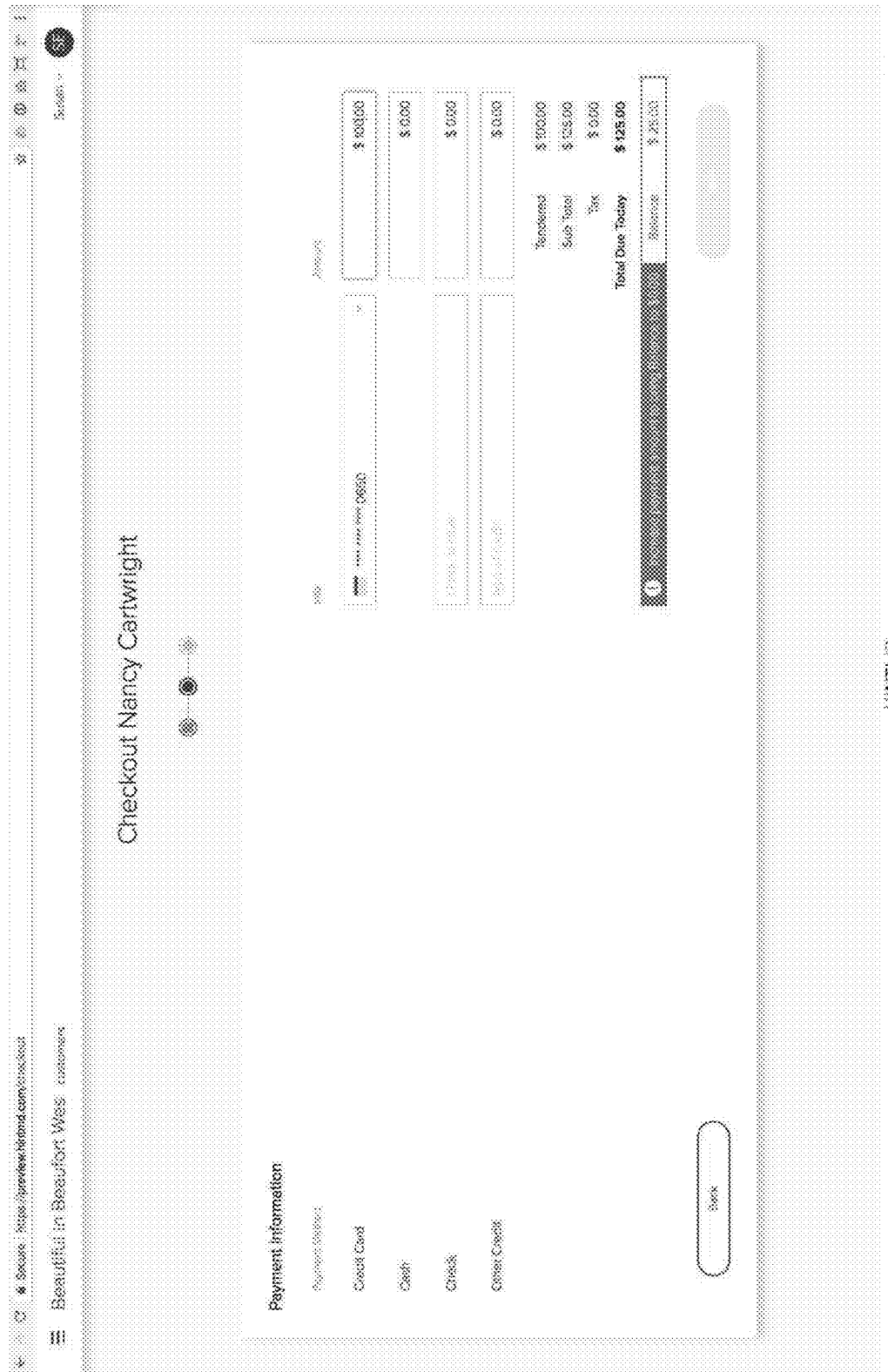
FIG. 37 illustrates a user interface in accordance with one embodiment.
Figure 38:
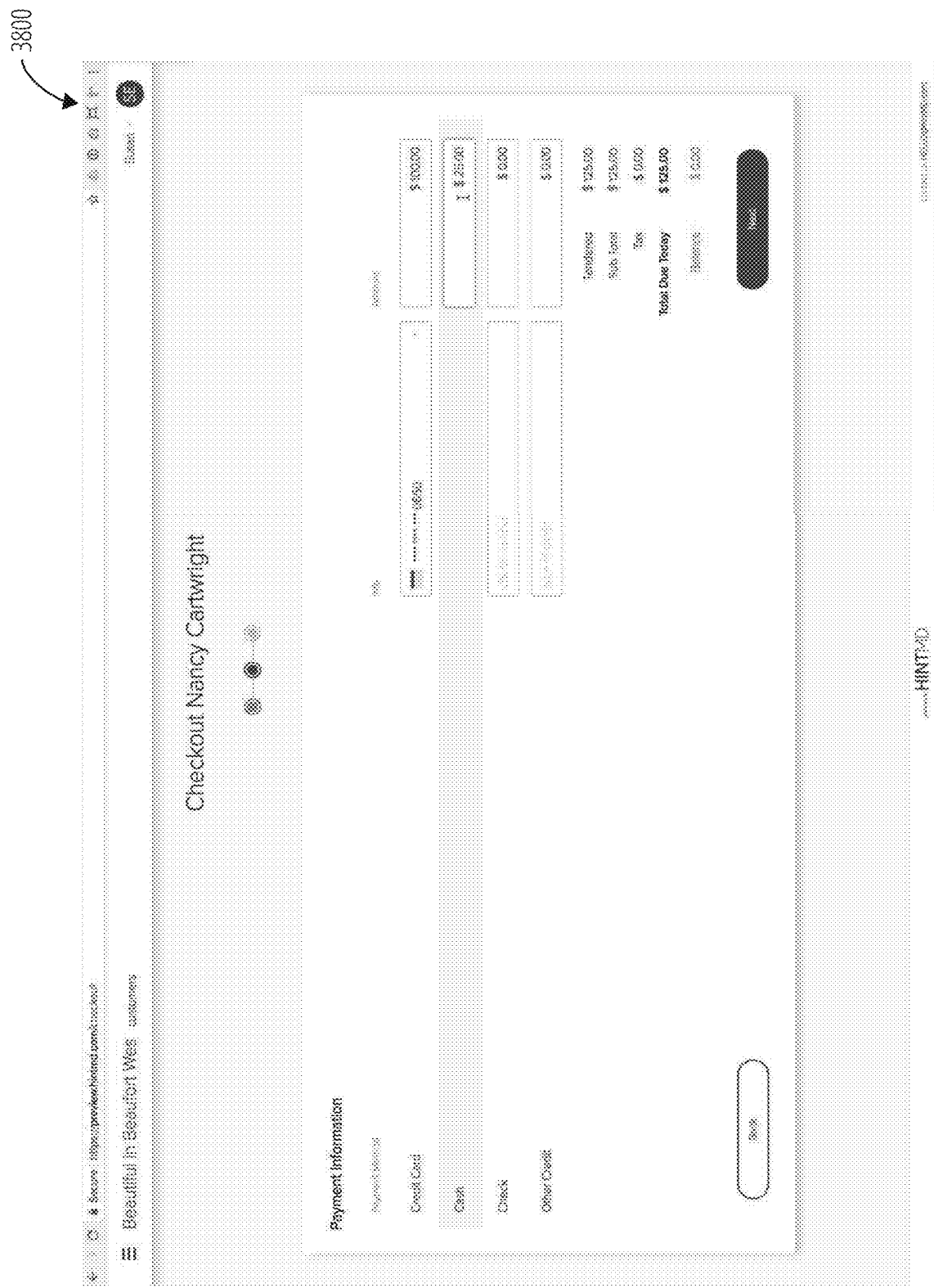
FIG. 38 illustrates a user interface in accordance with one embodiment.
Figure 39:
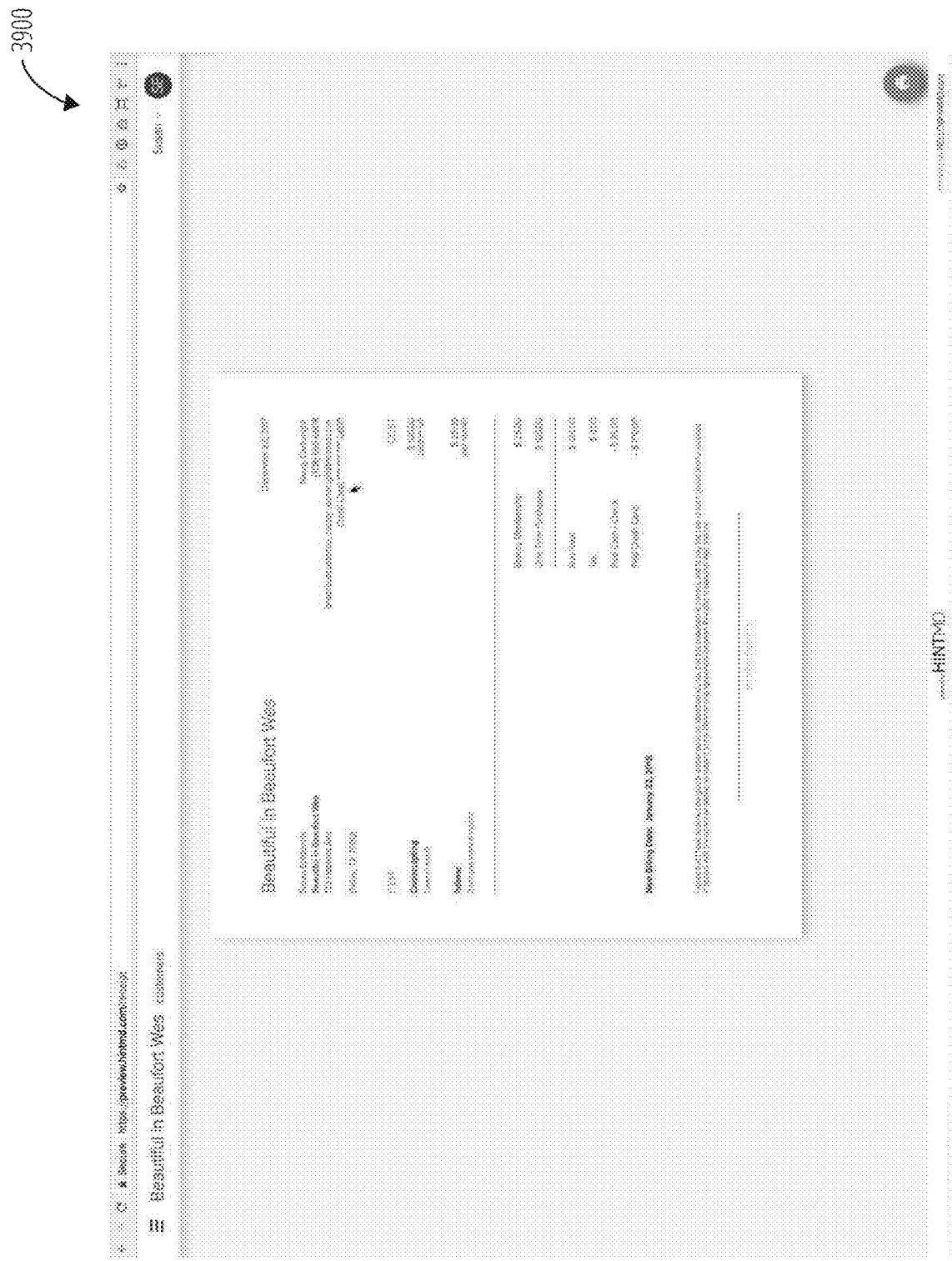
FIG. 39 illustrates a user interface in accordance with one embodiment.
Figure 40:
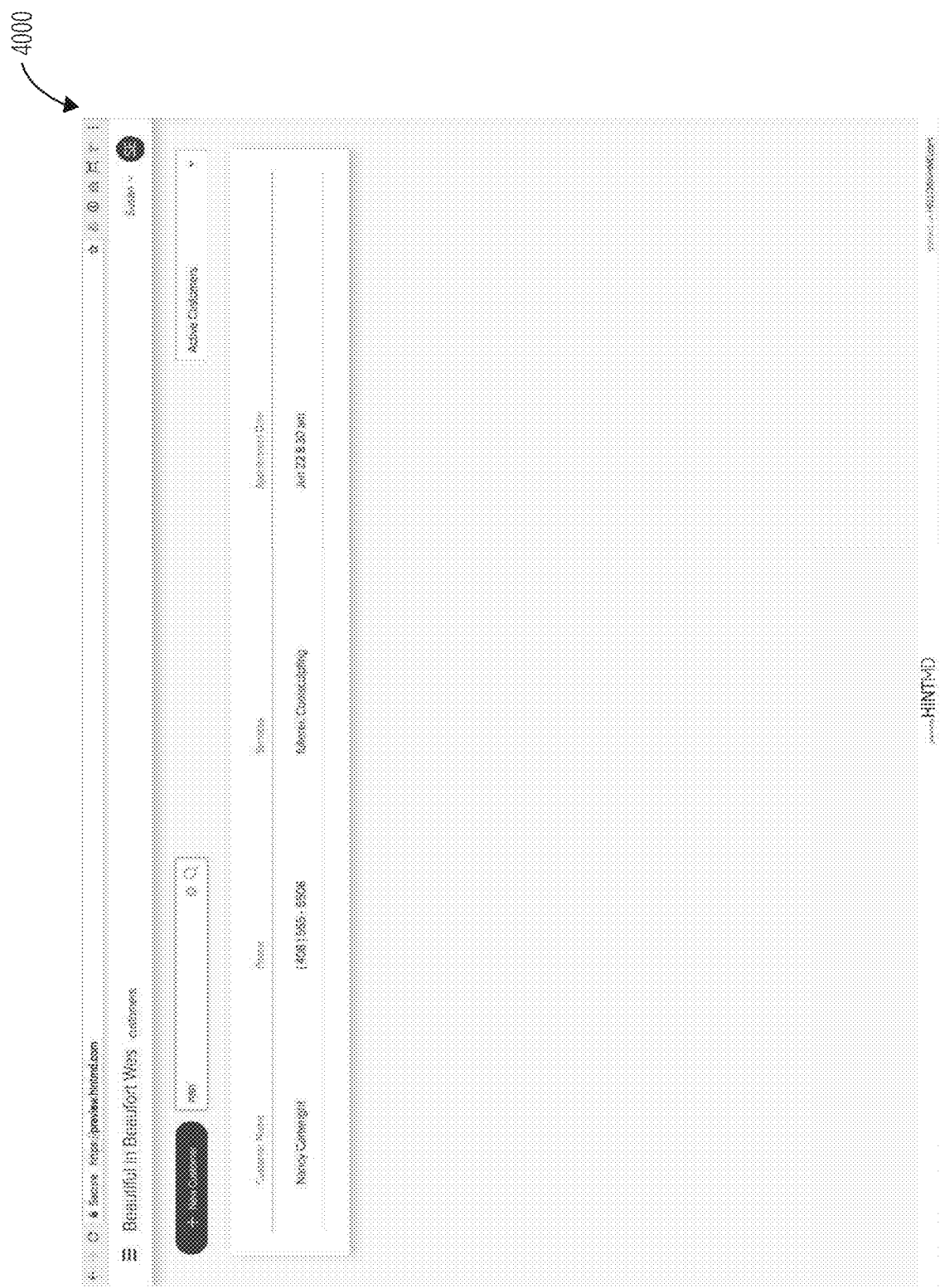
FIG. 40 illustrates a user interface in accordance with one embodiment.

On sheet 37 of 43, Fig. 37, delete "3702" and insert --3700-- therefor

On sheet 42 of 43, Fig. 42, delete "4202" and insert --4204-- therefor

In the Specification

In Column 6, Line 30, delete "112." and insert --128.-- therefor

In Column 8, Lines 27-28, delete "CouponRequestQCreate" and insert --CouponRequest()Create-- therefor In Column 8, Line 39, delete "Sub scriptionPlanRespon se sub scriptionPlanResponse=" and insert --SubscriptionPlanResponse subscriptionPlanResponse=-- therefor In Column 8, Lines 42-43, delete "sub scriptionResponse" and insert --subscriptionResponse-- therefor In the Claims In Column 23, Line 18, in Claim 3, delete "at least at least" and insert --at least-- therefor In Column 23, Lines 29-30, in Claim 5, after "comprising:", insert a linebreak Signed and Sealed this
Sixth Day of June, 2023

Katherine Kelly Vidal
*Director of the United States Patent and Trademark Office*

In Column 23, Line 35, in Claim 6, before "operations", insert --the--

In Column 24, Line 60, in Claim 11, delete "at least at least" and insert --at least-- therefor